(12) United States Patent
Suetou et al.

(10) Patent No.: US 10,087,812 B2
(45) Date of Patent: Oct. 2, 2018

(54) ENGINE DEVICE

(71) Applicant: YANMAR CO., LTD., Osaka-shi, Osaka (JP)

(72) Inventors: Hiroshi Suetou, Osaka (JP); Shinya Fukuyoshi, Osaka (JP)

(73) Assignee: YANMAR CO., LTD., Osaka-shi (JP)

( * ) Notice: Subject to any disclaimer, the term of this patent is extended or adjusted under 35 U.S.C. 154(b) by 34 days.

(21) Appl. No.: 15/270,988

(22) Filed: Sep. 20, 2016

(65) Prior Publication Data

US 2017/0009638 A1   Jan. 12, 2017

Related U.S. Application Data

(63) Continuation of application No. PCT/JP2015/058505, filed on Mar. 20, 2015.

(30) Foreign Application Priority Data

Mar. 20, 2014 (JP) .................................. 2014-059104
Mar. 20, 2014 (JP) .................................. 2014-059105
(Continued)

(51) Int. Cl.
*F01N 13/18* (2010.01)
*F01N 3/20* (2006.01)
(Continued)

(52) U.S. Cl.
CPC ....... *F01N 13/1855* (2013.01); *F01N 3/2066* (2013.01); *F01N 13/009* (2014.06);
(Continued)

(58) Field of Classification Search
CPC ... F01N 3/02; F01N 3/035; F01N 3/08; F01N 3/2066; F01N 13/009; F01N 13/18;
(Continued)

(56) References Cited

U.S. PATENT DOCUMENTS 5,711,387 A     1/1998  Murata et al.
6,591,935 B1 *  7/2003  Petley ..................... F01N 13/02
                                                    180/309
(Continued)

FOREIGN PATENT DOCUMENTS

EP         3064730 A1     9/2016
JP      H06-81649 A       3/1994
(Continued)

*Primary Examiner* — Audrey K Bradley
(74) *Attorney, Agent, or Firm* — Norton Rose Fulbright US LLP

(57) ABSTRACT

An engine device that includes the first case that removes particulate matter in the exhaust gas of the engine and the second case that removes nitride oxides in the exhaust gas of the engine and that connects the second case to the first case via a urea mixing pipe, an upper surface cover body is adhered on the upper portion of the engine via supporting leg bodies, and the upper portion of the engine is covered with the upper surface cover body, while any one or both of the first case and the second case are placed on the upper surface side of the upper surface cover body.

13 Claims, 36 Drawing Sheets

(30) Foreign Application Priority Data

Mar. 20, 2014 (JP) .................................. 2014-059106
Mar. 20, 2014 (JP) .................................. 2014-059108

(51) Int. Cl.
*F02M 55/02* (2006.01)
*F01N 13/00* (2010.01)
*F01N 3/021* (2006.01)
*F01N 11/00* (2006.01)

(52) U.S. Cl.
CPC .......... *F01N 13/18* (2013.01); *F01N 13/1805* (2013.01); *F01N 13/1811* (2013.01); *F01N 13/1822* (2013.01); *F02M 55/025* (2013.01); F01N 3/021 (2013.01); F01N 11/002 (2013.01); F01N 2260/08 (2013.01); F01N 2260/20 (2013.01); F01N 2560/06 (2013.01); F01N 2560/08 (2013.01); F01N 2590/08 (2013.01); F01N 2610/02 (2013.01); Y02T 10/24 (2013.01)

(58) Field of Classification Search
CPC ............. F01N 13/1805; F01N 2250/02; F01N 2340/04; F01N 2450/08; F01N 2590/10; F01N 2610/02; B01D 46/001; B01D 46/0027; B01D 53/9431; B01D 2279/30; B60K 13/04; E02F 9/0866; Y02T 10/20
See application file for complete search history.

(56) References Cited

U.S. PATENT DOCUMENTS

| | | | |
|---|---|---|---|
| 8,827,029 B1 | 9/2014 | Nakagami et al. | |
| 9,382,690 B2 * | 7/2016 | Okuda | ................... B60K 13/04 |
| 9,752,479 B2 * | 9/2017 | Fukuyoshi | .......... F01N 13/0097 |
| 2010/0000203 A1 | 1/2010 | Kowada | |
| 2010/0186394 A1 | 7/2010 | Harrison et al. | |
| 2010/0187383 A1 | 7/2010 | Olsen et al. | |
| 2010/0196219 A1 | 8/2010 | Endo et al. | |
| 2011/0079003 A1 * | 4/2011 | Sun | ....................... F01N 3/2066 |
| | | | 60/310 |
| 2012/0247861 A1 | 10/2012 | Mizuno et al. | |
| 2012/0273648 A1 | 11/2012 | Maske et al. | |
| 2013/0064725 A1 * | 3/2013 | Kageyama | ............ F01N 3/2892 |
| | | | 422/168 |
| 2013/0343853 A1 | 12/2013 | Sato et al. | |
| 2014/0291057 A1 | 10/2014 | Nakagami et al. | |
| 2015/0330056 A1 | 11/2015 | Himoto et al. | |
| 2016/0251997 A1 | 9/2016 | Sandou | |

FOREIGN PATENT DOCUMENTS

| | | | | |
|---|---|---|---|---|
| JP | 2006-070712 A | 3/2006 | | |
| JP | 2009-074420 A | 4/2009 | | |
| JP | 2010-007525 A | 1/2010 | | |
| JP | 2011-230522 A | 11/2011 | | |
| JP | 2012-021505 A | 2/2012 | | |
| JP | 2012-071743 A | 4/2012 | | |
| JP | 2012-177233 A | 9/2012 | | |
| JP | 2012-215022 A | 11/2012 | | |
| JP | 2012-104394 A | 5/2013 | | |
| JP | 2013-155706 A | 8/2013 | | |
| JP | 5296913 B1 * | 9/2013 | ............. B60K 13/04 |
| JP | 5409971 B1 | 11/2013 | | |
| JP | 5382669 B1 | 1/2014 | | |
| JP | 2014-025403 A | 2/2014 | | |
| WO | 2010/101018 A1 | 9/2010 | | |
| WO | 2011/152306 A1 | 12/2011 | | |
| WO | WO 2014007374 A1 * | 1/2014 | ......... F01N 13/0097 |

* cited by examiner

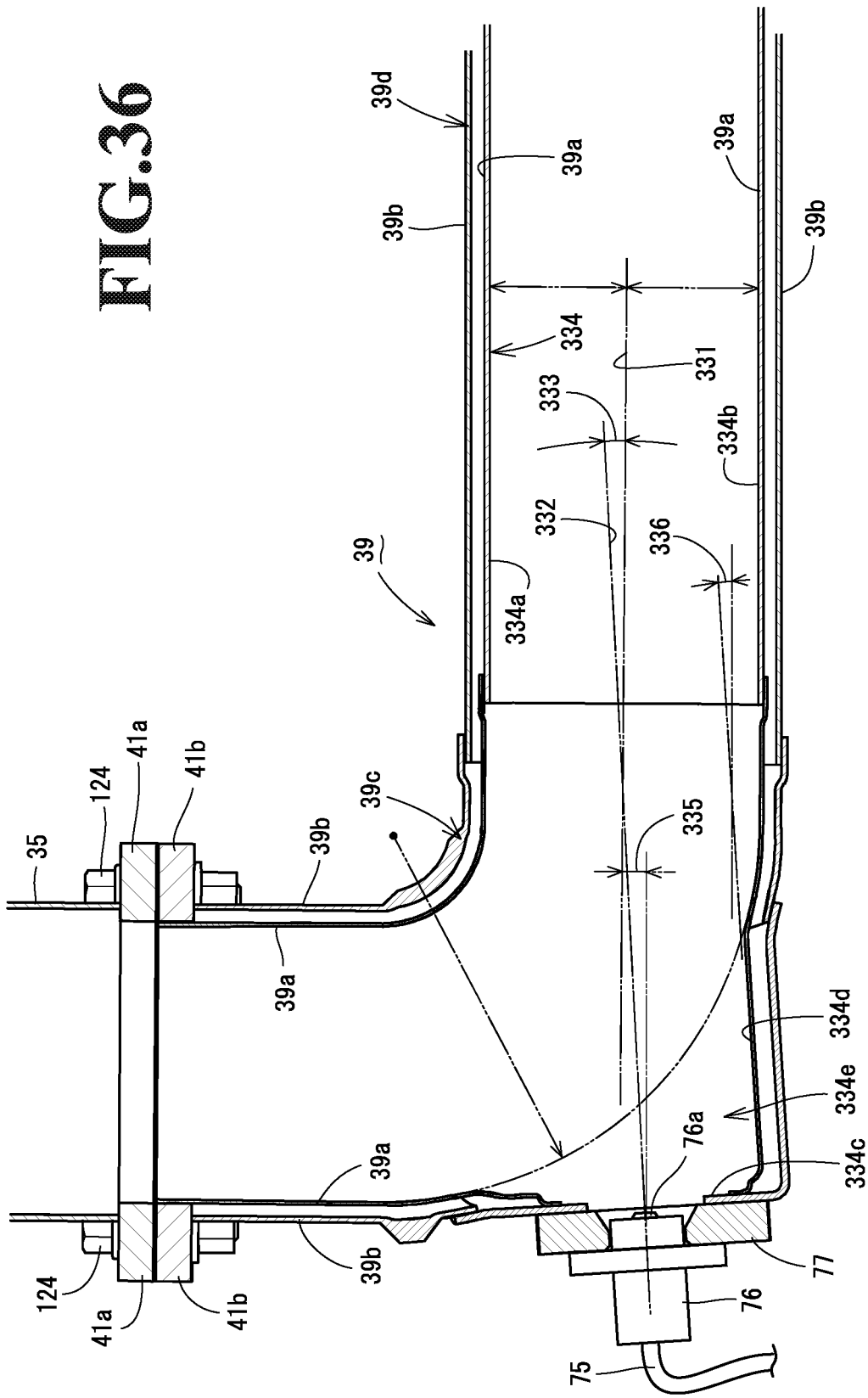

ENGINE DEVICE

CROSS-REFERENCE TO RELATED APPLICATIONS

The present application is a continuation application of International Application No. PCT/JP2015/58505, filed Mar. 20, 2015, which claims priority to Japanese Patent Application No. 2014-59104, filed Mar. 20, 2014, Japanese Patent Application No. 2014-59105, filed Mar. 20, 2014, Japanese Patent Application No. 2014-59106, filed Mar. 20, 2014, and Japanese Patent Application No. 2014-59108, filed Mar. 20, 2014. The contents of these applications are incorporated herein by reference in their entirety.

BACKGROUND OF THE INVENTION

The present invention of the instant application relates to an engine device.

Regarding work vehicles such as a tractor and a wheel loader, an opening/closing fulcrum shaft is arranged in the rear portion of a hood for covering an engine, and the hood is rotated about the opening/closing fulcrum shaft, for the purpose of improving the efficiency of maintenance work for the engine arranged in the front portion of a travelling vehicle body. Also, the technology of purification treatment has been known theretofore, wherein a case (hereinafter referred to as "DPF case") in which a diesel particulate filter is internally provided, and a case (hereinafter referred to as "SCR case") in which a urea selective reduction catalyst is internally provided are provided in the exhaust path of a diesel engine as an exhaust gas purification device (exhaust gas after-treatment device), and the exhaust gas is introduced into the DPF case and the SCR case, thereby purifying the exhaust gas discharged from the diesel engine (for example, see Japanese Unexamined Patent Application Publication 2009-74420, Japanese Unexamined Patent Application Publication 2012-21505, Japanese Unexamined Patent Application Publication 2012-177233, and Japanese Unexamined Patent Application Publication 2013-104394).

SUMMARY OF THE INVENTION

When the DPF case and the SCR case are assembled apart from the engine, the temperature of the exhaust gas supplied from the engine to the DPF case or the SCR case is reduced, and the reproduction of the diesel particulate filter or chemical reaction such as the action of selective catalyst reduction is defectively made, which leads to a problem that a specific device for maintaining the exhaust gas at a high temperature in the SCR case needs to be provided. Also, a technology has been disclosed that the DPF case and the SCR case are mounted on two parallel base frames, and the two base frames are fastened with an object to be installed, thereby mounting the DPF case and the SCR case. However, a mounting surface of the object to be installed needs to be formed horizontally (flat), and therefore there is a problem in that it is difficult to support the supporting posture of the DPF case and the SCR case at a predetermined posture due to machining errors of mounting components such as the base frame. Furthermore, when the diesel particulate filter (soot filter) in the DPF case is cleaned or replaced, it is necessary to detach the whole of the DPF case, disassemble the DPF case, and then detach the diesel particulate filter. Accordingly, there is a problem in that cleaning man-hour for the diesel particulate filter cannot be easily reduced.

On the other hand, when the DPF case and the SCR case are assembled in close proximity to the engine, the reduction in temperature of the exhaust gas supplied from the engine to the SCR case is suppressed, and the temperature of the exhaust gas in the SCR case is easily maintained at a high temperature, but it is necessary to secure an installation space for the SCR case on the lateral side of the engine, which leads to problems in that it is difficult to constitute a miniaturized engine room, and the DPF case, the SCR case, or the like cannot be supported in a compact way.

Accordingly, it is an object of the present invention of the instant application to provide an engine device, in which improvements are provided in the light of the current circumstances.

An engine device according to a first aspect of the present invention includes a first case that removes particulate matter in exhaust gas of an engine and a second case that removes nitride oxides in the exhaust gas of the engine and configured to connect the second case to the first case via a joining pipe, wherein a supporting stand is adhered on an upper portion of the engine via a supporting leg body, and the upper portion of the engine is covered with the supporting stand, and wherein any one or both of the first case and the second case are placed on an upper surface side of the supporting stand.

Regarding the engine device according to the first aspect of the present invention, the present invention according to a second aspect thereof may be such that the first case, the second case, and the joining pipe are adhered in parallel with a unit frame body, thereby forming an exhaust purification unit, and the exhaust purification unit is detachably placed on the upper surface side of the supporting stand.

Regarding the engine device according to the first aspect of the present invention, the present invention according to a third aspect thereof may be such that a common rail for supplying fuel to the engine is provided, and, regarding structure in which a fuel pipe or an engine control harness is extendedly installed on one side of the engine in which the common rail is arranged, a pipe protective cover body for coupling one side of the supporting stand is provided, and the pipe protective cover body is projectingly installed and directed upward on one side of the engine in which the fuel pipe or the engine control harness is arranged.

Regarding the engine device according to the first aspect of the present invention, the present invention according to a fourth aspect thereof may be such that the first case is formed in such a manner as to be divided into an exhaust intake side case and an exhaust discharge side case, and the exhaust discharge side case is configured to be separable in a state where the exhaust intake side case is supported on a side of the engine.

Regarding the engine device according to the second aspect of the present invention, the present invention according to a fifth aspect thereof may be such that one end portion or both end portions of the joining pipe are coupled with at least any one or both of the first case outlet side and a second case inlet side in such a manner that a coupling angle can be adjusted.

Regarding the engine device described in the according to the fifth aspect of the present invention, the present invention according to a sixth aspect thereof may be such that regarding structure in which the joining pipe is detachably coupled with a gas outlet side of the first case via a pipe joint body, the second case inlet side and an end portion of the joining pipe are coupled in such a manner that a coupling angle can be adjusted, via a spherical joint connecting body configured to be bendable in an axial direction of the joining pipe.

Regarding the engine device described in the according to the fifth aspect of the present invention, the present invention according to a seventh aspect thereof may be such that regarding structure in which the joining pipe is detachably coupled with a gas outlet side of the first case via a pipe joint body, the second case inlet side and an end portion of the joining pipe are coupled in such a manner that a coupling angle can be adjusted, via a V-band clamp joint body configured to be bendable in an axial direction of the joining pipe.

Regarding the engine device according to the first aspect of the present invention, the present invention according to an eighth aspect thereof may be such that a single connector bracket body is provided on the supporting stand on which the first case or the second case is arranged, and a plurality of harness connectors configured to be connected with an exhaust gas temperature sensor, an exhaust gas pressure sensor, or the like provided on the first case or the second case are collectively arranged on the connector bracket body.

Regarding the engine device according to the eighth aspect of the present invention, the present invention according to a ninth aspect thereof may be such that the connector bracket body is adhered to a lateral surface on outside of the device of the supporting stand.

Regarding the engine device according to the first aspect of the present invention, the present invention according to a tenth aspect thereof may be such that the joining pipe is integrally arranged on outside of any one of the first case or the second case, and the joining pipe is detachably coupled with a gas outlet of the first case or a gas inlet of the second case via a pipe joint body.

Regarding the engine device according to the tenth aspect of the present invention, the present invention according to an eleventh aspect thereof may be such that the joining pipe is integrally fixed on outside of the second case, and a urea water injection nozzle is arranged on one side of the joining pipe connected to the gas outlet of the first case, and one end side of the joining pipe is detachably coupled with the gas outlet of the first case via the pipe joint body.

Regarding the engine device according to the eleventh aspect of the present invention, the present invention according to a twelfth aspect thereof may be is such that the second case has cylindrical double pipe structure, which is formed with an inner side case and an outer side case, and an outer circumferential surface of the joining pipe is joined with an outer circumferential surface of the outer side case.

According to the embodiment of the present invention of the first aspect thereof, the engine device includes the first case that removes particulate matter in the exhaust gas of the engine and the second case that removes the nitride oxides in the exhaust gas of the engine and configured to connect the second case to the first case via the joining pipe, wherein the supporting stand is adhered on the upper portion of the engine via the supporting leg body, and the upper portion of the engine is covered with the supporting stand, and wherein any one or both of the first case and the second case are placed on the upper surface side of the supporting stand, so that the upper surface side of the engine can be protected with the supporting stand, and during the assembly and disassembly work of the first case or the second case, the accessory components of the engine can be easily prevented from being damaged by an operator with tools, and the radiant heat of the first case or the second case can be blocked with the supporting stand, and the accessory components on the upper surface side of the engine and the like can be easily prevented from being damaged due to the radiant heat of the first case or the second case.

According to the embodiment of the present invention of the second aspect thereof, the first case, the second case, and the joining pipe are adhered in parallel with the unit frame body, thereby forming the exhaust purification unit, and the exhaust purification unit is detachably placed on the upper surface side of the supporting stand, so that the exhaust purification unit can be mounted on the engine at a final assembly process in which the assembly work of the engine is completed, at the assembly plant of the engine and the like, and while the assembly workability of the engine and the like can be improved, the exhaust purification unit is detached, and the upper surface side of the engine can be widely opened, and the maintenance workability on the upper surface side of the engine and the like can be improved.

According to the embodiment of the present invention of the third aspect thereof, the common rail for supplying fuel to the engine is provided, and, regarding structure in which the fuel pipe or the engine control harness is extendedly installed on one side of the engine in which the common rail is arranged, the pipe protective cover body for coupling one side of the supporting stand is provided, and the pipe protective cover body is projectingly installed and directed upward on one side of the engine in which the fuel pipe or the engine control harness is arranged, so that during the assembly or detachment work of the first case or the second case, the fuel pipes or the engine control harnesses on one side of the engine can be protected with the pipe protective cover body, and maintenance (cleaning of soot filter) workability and the like in the interior of the first case can be improved.

According to the embodiment of the present invention of the fourth aspect thereof, the first case is formed in such a manner as to be divided into the exhaust intake side case and the exhaust discharge side case, and the exhaust discharge side case is configured to be separable in a state where the exhaust intake side case is supported on the side of the engine, so that during the maintenance work in the interior of the first case, it is not required to remove the whole of the first case, and the number of detachable components that are necessitated for the maintenance work in the interior of the exhaust discharge side case (the first case) can be easily reduced, and the soot filter internally installed in the exhaust discharge side case and the like can be easily detached, and the cleaning man-hour of the interior of the exhaust discharge side case or the soot filter, or the like can be reduced.

According to the embodiment of the present invention of the fifth aspect thereof, one end portion or both end portions of the joining pipe are coupled with at least any one or both of the first case outlet side and the second case inlet side in such a manner that a coupling angle can be adjusted, so that, in the assembly work of the first case and the second case, the parallelism of the first case or the second case with respect to the joining pipe or discrepancy in the direction intersected with the axial line of the joining pipe can be easily adjusted. The adjustment work of measurement errors during the assembly of the first case, the second case, or the joining pipe is simplified, thereby improving the assembly workability of the first case and the second case.

According to the embodiment of the present invention of the sixth aspect thereof, regarding structure in which the joining pipe is detachably coupled with the gas outlet side of the first case via the pipe joint body, the second case inlet side and the end portion of the joining pipe are coupled in such a manner that the coupling angle can be adjusted, via the spherical joint connecting body configured to be bendable in the axial direction of the joining pipe, so that the extension direction of the joining pipe can be arbitrarily set by the bending operation of the spherical joint connecting body, and the adjustment of measurement errors during the assembly of the first case and the second case can be simplified, and further the gas outlet side of the first case can be partially attached/detached by attaching/detaching the pipe joint body, and maintenance on the gas outlet side (soot filter and the like) in the interior of the first case can be easily executed only by partially detaching the gas outlet side of the first case.

According to the embodiment of the present invention of the seventh aspect thereof, regarding structure in which the joining pipe is detachably coupled with the gas outlet side of the first case via the pipe joint body, the second case inlet side and the end portion of the joining pipe are coupled in such a manner that the coupling angle can be adjusted, via the V-band clamp joint body configured to be bendable in the axial direction of the joining pipe, so that the extension direction of the joining pipe can be arbitrarily set by the bending operation of the V-band clamp joint body, and the adjustment of measurement errors during the assembly of the first case and the second case can be simplified, and further the gas outlet side of the first case can be partially attached/detached by attaching/detaching the pipe joint body, and maintenance on the gas outlet side (soot filter and the like) in the interior of the first case can be easily executed only by partially detaching the gas outlet side of the first case.

According to the embodiment of the present invention of the eighth aspect thereof, the single connector bracket body is provided on the supporting stand on which the first case or the second case is arranged, and the plurality of harness connectors configured to be connected with the exhaust gas temperature sensor, the exhaust gas pressure sensor, or the like provided on the first case or the second case are collectively arranged on the connector bracket body, so that the plurality of harness connectors can be supported in one place en masse at a position where the high temperature portions such as the engine, the first case, and the second case do not contact the sensor harnesses. The joining or detaching works of the sensor harnesses during the assembly or maintenance can be simplified.

According to the embodiment of the present invention of the ninth aspect thereof, the connector bracket body is adhered to the lateral surface on the outside of the device of the supporting stand, so that the connector bracket body protrudes from the supporting stand to the lateral direction on the outside of the device, thereby supporting the connector bracket body, and an increase in temperature of the connector bracket body can be easily suppressed by use of the cooling air of the engine. The harness connectors can be easily prevented from being abnormally heated by heat transmitted from the high temperature portions such as the engine, the first case, and the second case to the connector bracket body, and the durability of the harness connectors or the sensor harnesses can be improved.

According to the embodiment of the present invention of the tenth aspect thereof, the joining pipe is integrally arranged on the outside of any one of the first case or the second case, and the joining pipe is detachably coupled with the gas outlet of the first case or the gas inlet of the second case via the pipe joint body, so that any one of the first case or the second case and the joining pipe can be handled as one component at the assembly plant of the engine and the like, and the number of constituent components can be reduced. Also, even when a machining error occurs in the coupling portion of any one of the exhaust gas outlet of the first case or the exhaust gas inlet of the second case and one end side of the joining pipe, the machining error in the coupling portion can be easily solved, and an operating time required for the adjustment of position during assembly can be easily reduced, thereby improving the assembly workability. The joining pipe can be installed in close proximity to the outside of any one of the first case or the second case, and thermal insulation effect can be expected, and the crystallization of urea in the interior of the joining pipe can be reduced, and the vibration-proof structure of the joining pipe and the like can be simplified.

According to the embodiment of the present invention of the eleventh aspect thereof, the joining pipe is integrally fixed on the outside of the second case, and the urea water injection nozzle is arranged on one end side of the joining pipe connected to the gas outlet of the first case, and one end side of the joining pipe is detachably coupled with the gas outlet of the first case via the pipe joint body, so that the joining pipe can be separated from the exhaust gas outlet side of the first case with the disassembly of the pipe joint body, and the interior of the joining pipe can be easily cleaned on the installation side of the urea water injection nozzle, and the crystallization of urea in the interior of the joining pipe can be reduced. Also, the gas outlet side of the first case can be constituted in such a manner as to be partially detachable, so that the maintenance of the soot filter internally installed on the gas outlet side of the first case can be easily executed only by partially detaching the gas outlet side of the first case.

According to the embodiment of the present invention of the twelfth aspect thereof, the second case has cylindrical double pipe structure, which is formed with the inner side case and the outer side case, and the outer circumferential surface of the joining pipe is joined with the outer circumferential surface of the outer side case, so that the first case and the second case can be arranged in a small, narrow space by adhering the first case to the second case in close proximity to each other, and the vibration-proof structure of the joining pipe and the like can be eliminated, and the coupling structure of the first case and the second case can be simplified.

BRIEF DESCRIPTION OF THE DRAWINGS

FIG. 36 is an enlarged cross-sectional view of a coupling portion between the first case and the urea mixing pipe.

DESCRIPTION OF THE EMBODIMENTS

Figure 1:
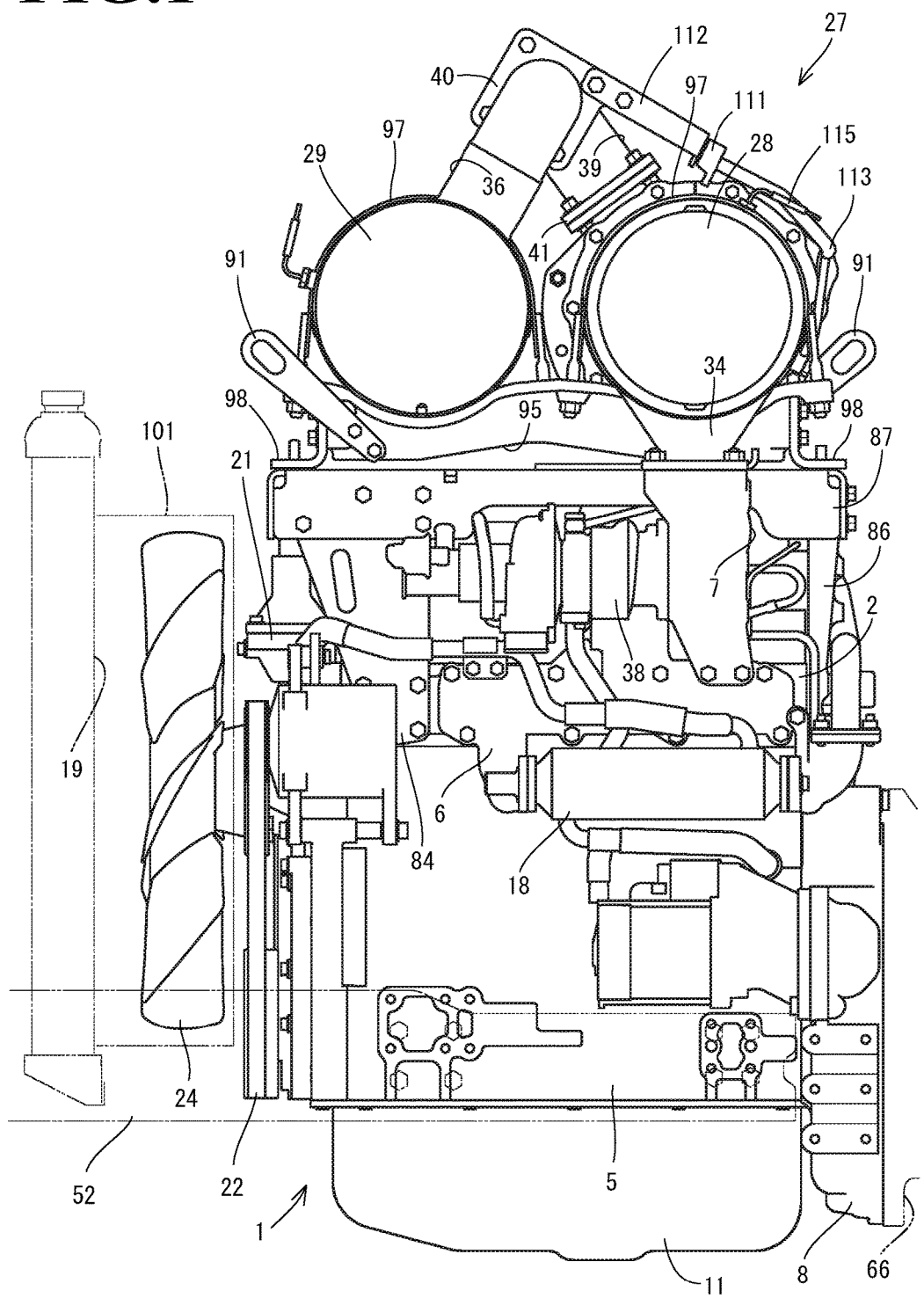
FIG. 1 is a left side view of a diesel engine illustrating a first embodiment.
Figure 2:
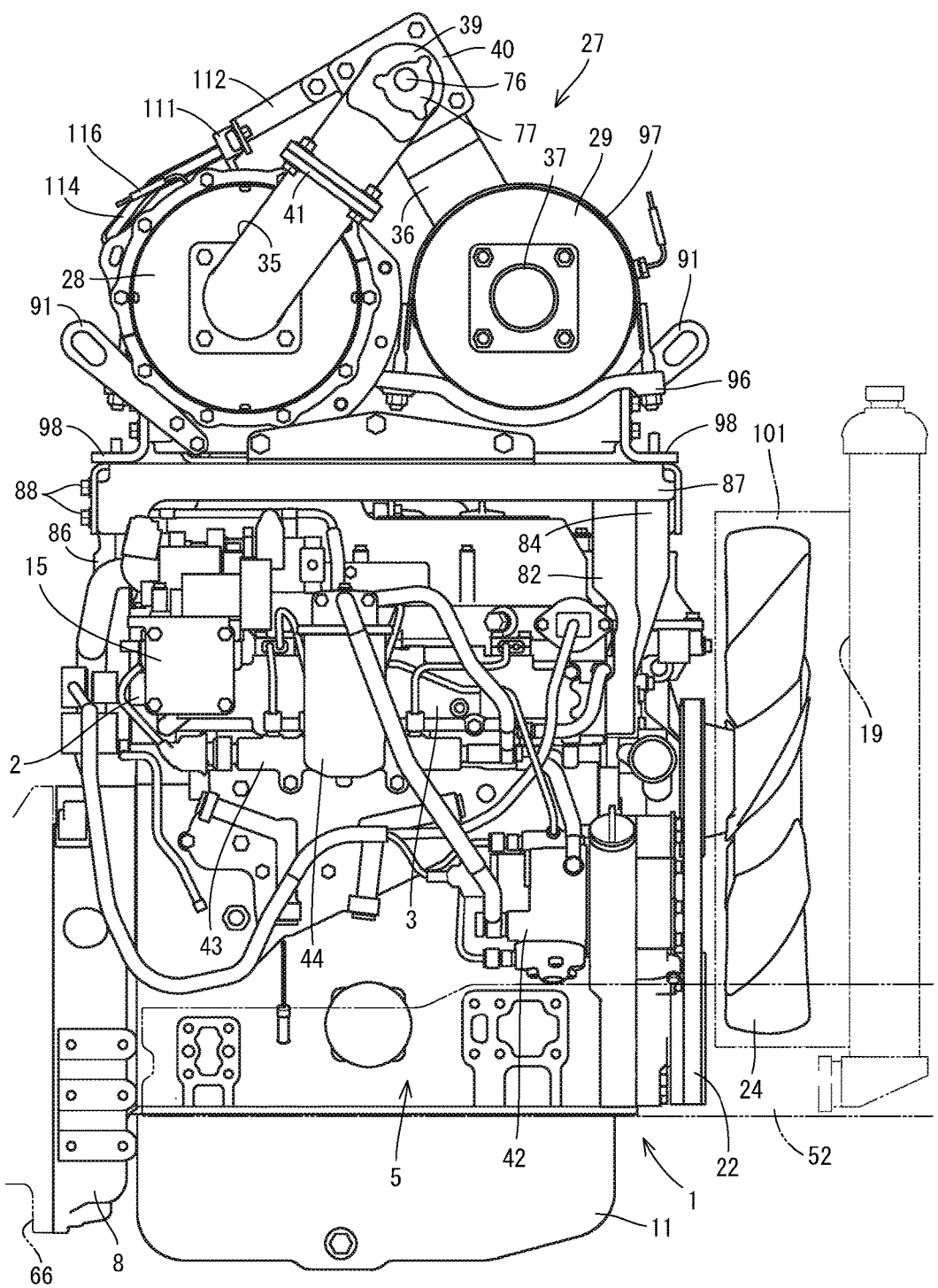
FIG. 2 is a right side view of the diesel engine.
Figure 3:
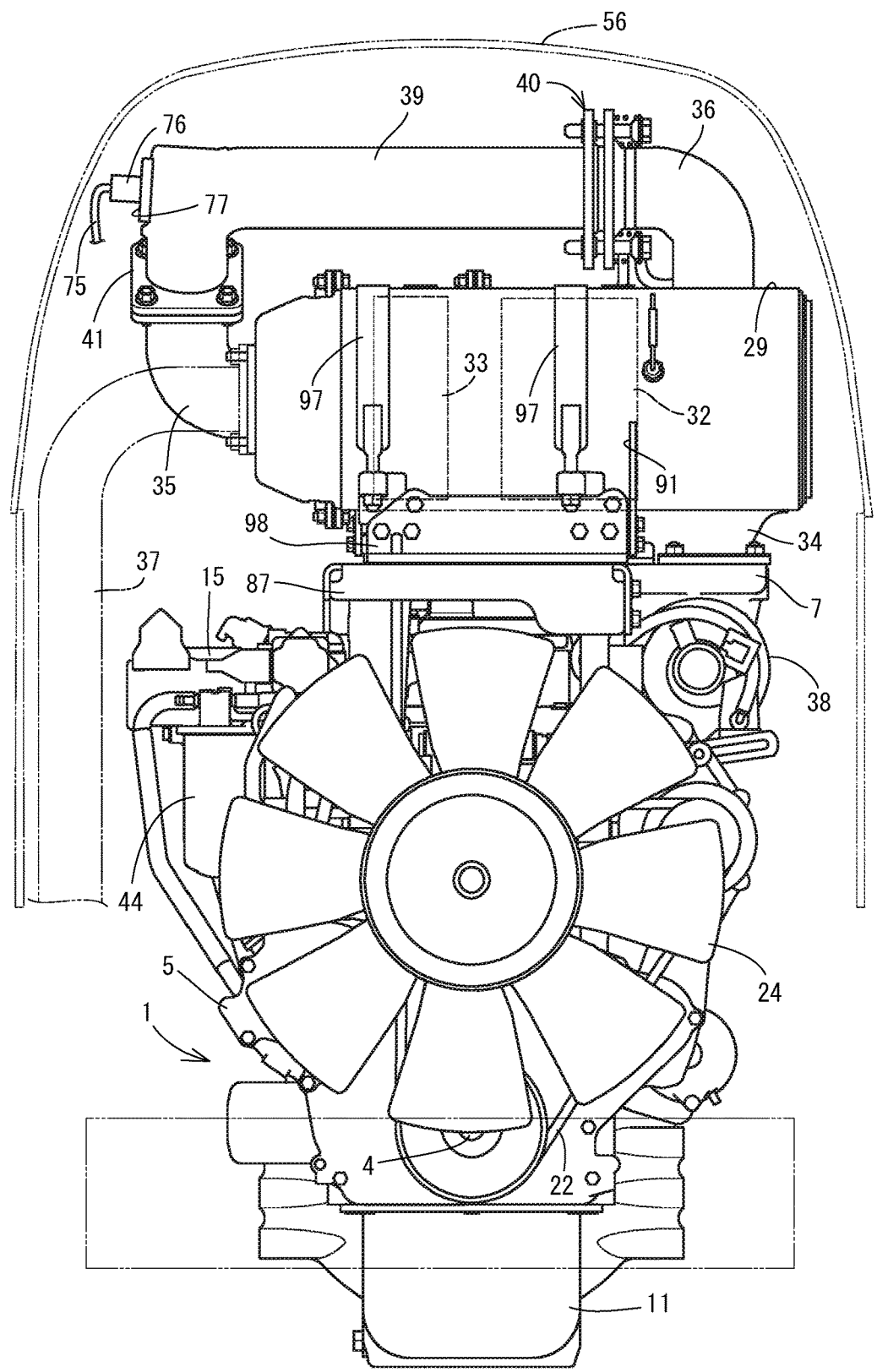
FIG. 3 is a front view of the diesel engine.

Hereinafter, a first embodiment, which is the embodiment of the present invention, will be described based on drawings (FIGS. 1 to 12). FIG. 1 is a left side view of a diesel engine 1 in which an exhaust manifold 6 is installed, and FIG. 2 is a right side view of the diesel engine 1 in which an intake manifold 3 is installed, and FIG. 3 is a front view of the diesel engine 1 in which a cooling fan 24 is installed. It is noted that the installation side of the exhaust manifold 6 is referred to as the left lateral surface of the diesel engine 1, and the installation side of the intake manifold 3 is referred to as the right lateral surface of the diesel engine 1, and the installation side of the cooling fan 24 is referred to as the front surface of the diesel engine 1. The entire structure of the diesel engine 1 will be described referring to FIGS. 1 to 8.

As illustrated in FIGS. 1 to 7, the intake manifold 3 is arranged on one side surface of a cylinder head 2 of the diesel engine 1. The cylinder head 2 is mounted on a cylinder block 5 in which an engine output shaft 4 (crankshaft) and pistons (not illustrated) are incorporated. An exhaust manifold 6 is arranged on the other side surface of the cylinder head 2. The front end and the rear end of the engine output shaft 4 protrude from the front surface and the rear surface of the cylinder block 5.

As illustrated in FIGS. 1 to 7, a flywheel housing 8 is adhered to the rear surface of the cylinder block 5. A flywheel 9 is provided in the flywheel housing 8. The flywheel 9 is pivotably supported on the rear end side of the engine output shaft 4. It is configured such that the motive power of the diesel engine 1 is taken out via the flywheel 9. Furthermore, an oil pan 11 is arranged on the lower surface of the cylinder block 5.

As illustrated in FIGS. 2 to 5, and 7, an exhaust gas recirculation device (EGR) 15 that takes in the exhaust gas for recirculation is arranged on the intake manifold 3. An air clearer 16 (see FIG. 13) is connected to the intake manifold 3. It is configured such that outside air that is purified by removing dust by means of the air cleaner 16 is delivered to the intake manifold 3 and supplied to each cylinder of the diesel engine 1.

With the aforementioned constitution, part of the exhaust gas discharged from the diesel engine 1 to the exhaust manifold 6 is recirculated from the intake manifold 3 into each cylinder of the diesel engine 1 via the exhaust gas recirculation device 15, thereby reducing the combustion temperature of the diesel engine 1, reducing the emissions of nitride oxides (NOx) from the diesel engine 1, and improving the fuel consumption of the diesel engine 1.

It is noted that a coolant pump 21 for circulating a coolant to the cylinder block 5 and a radiator 19 (see FIG. 13) is provided. The coolant pump 21 is arranged on the installation side of the cooling fan 24 of the diesel engine 1. The coolant pump 21 and the cooling fan 24 are coupled with the engine output shaft 4 via a V belt 22 and the like, thereby driving the coolant pump 21 and the cooling fan 24. It is configured such that the coolant is delivered from the coolant pump 21 into the cylinder block 5 via an EGR cooler 18 of the exhaust gas recirculation device 15, while the diesel engine 1 is cooled by the wind of the cooling fan 24.

As illustrated in FIGS. 1 to 8, the diesel engine 1 includes a first case 28 as a diesel particulate filter (DPF) that removes particulate matter in the exhaust gas of the diesel engine 1 and a second case 29 as a urea selective catalyst reduction (SCR) system that removes the nitride oxides in the exhaust gas of the diesel engine 1, as an exhaust gas purification device 27 for purifying the exhaust gas discharged from each cylinder of the diesel engine 1. As illustrated in FIGS. 1 and 2, an oxidation catalyst 30 and a soot filter 31 are internally provided in the first case 28 as a DPF case. An SCR catalyst 32 and an oxidation catalyst 33 for urea selective catalyst reduction are internally provided in the second case 29 as an SCR case.

The exhaust gas discharged from each cylinder of the diesel engine 1 to the exhaust manifold 6 is released to the outside via the exhaust gas purification device 27 and the like. It is configured such that carbon monoxide (CO), hydrocarbon (HC), particulate matter (PM), and nitride oxides (NOx) in the exhaust gas of the diesel engine 1 are reduced by means of the exhaust gas purification device 27.

Figure 4:
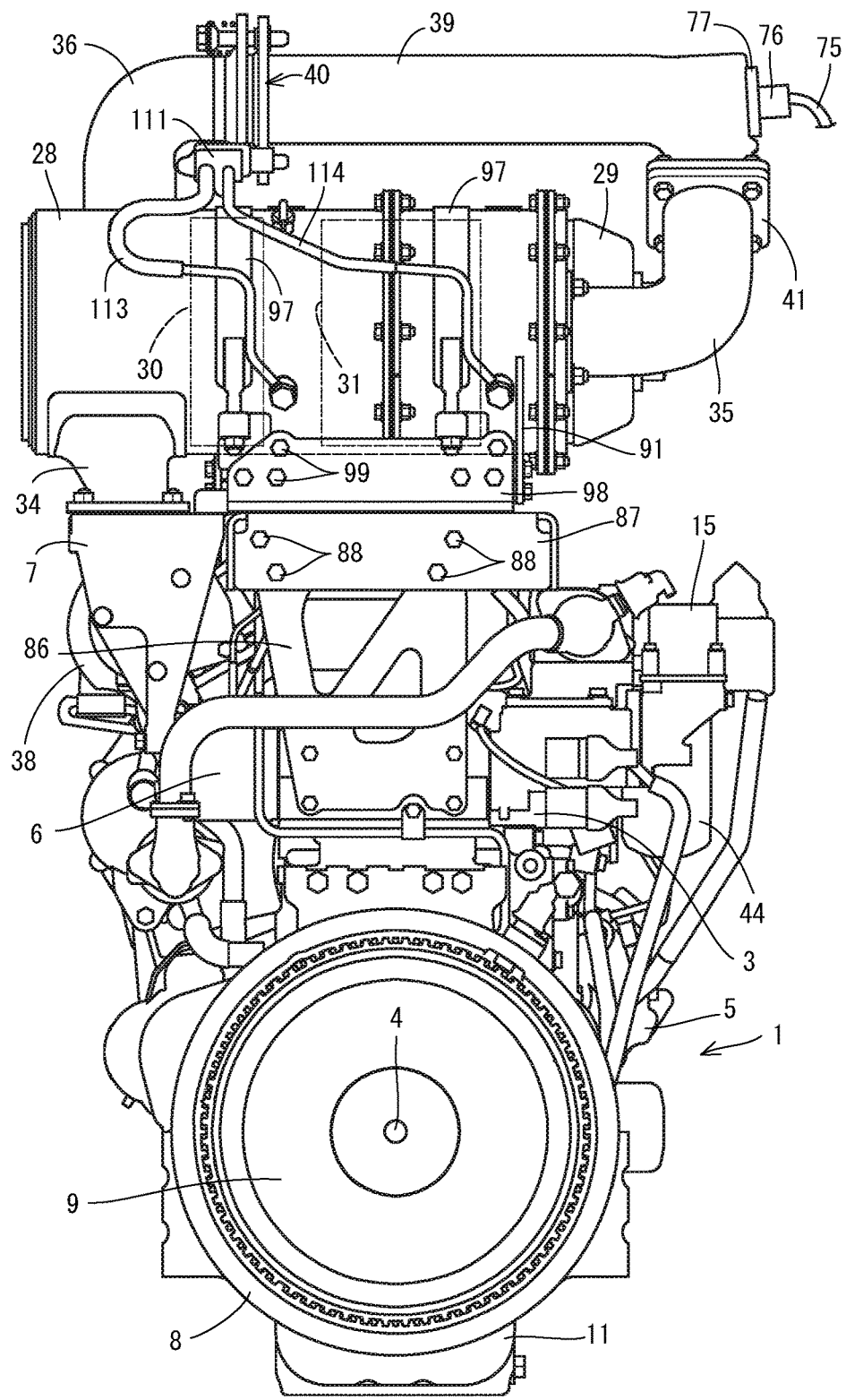
FIG. 4 is a rear view of the diesel engine.
Figure 5:
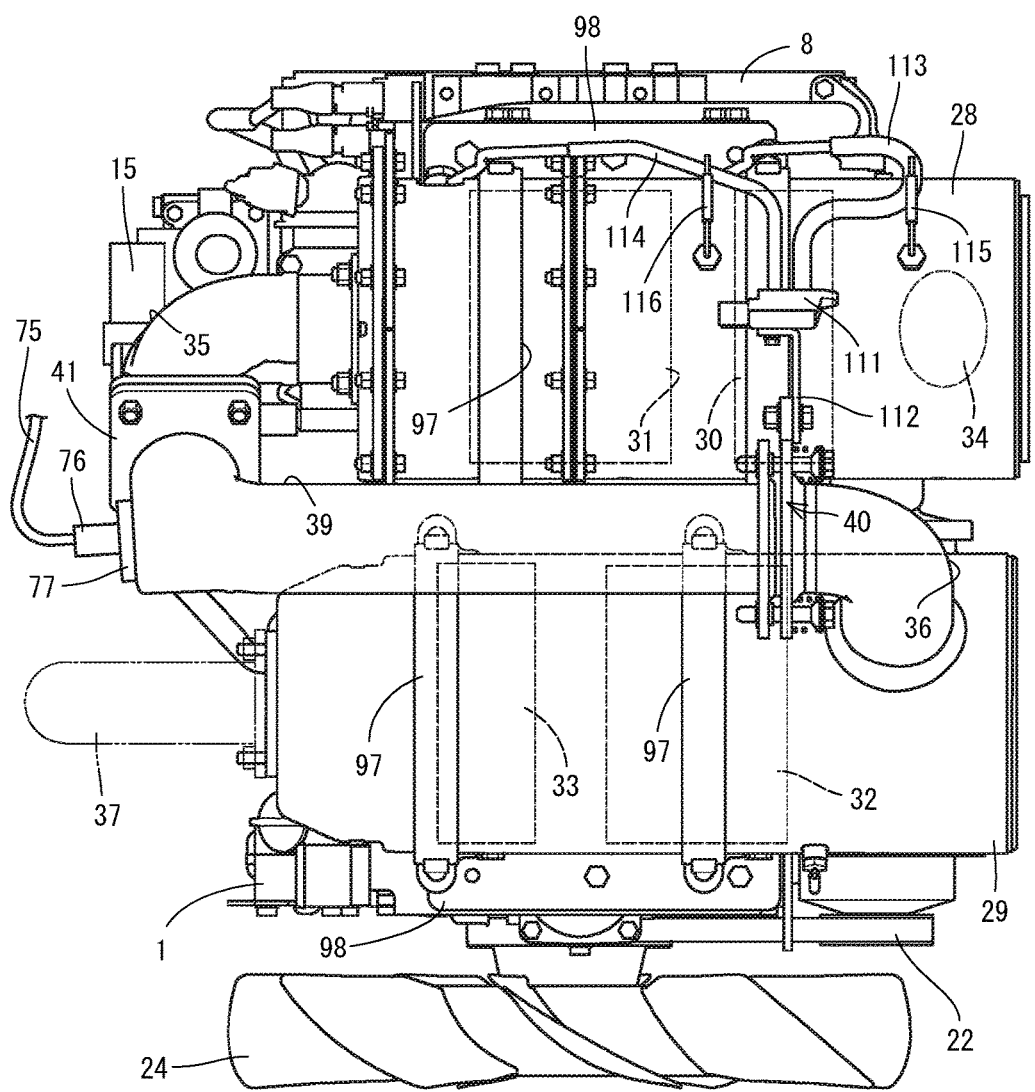
FIG. 5 is a plan view of the diesel engine.
Figure 6:
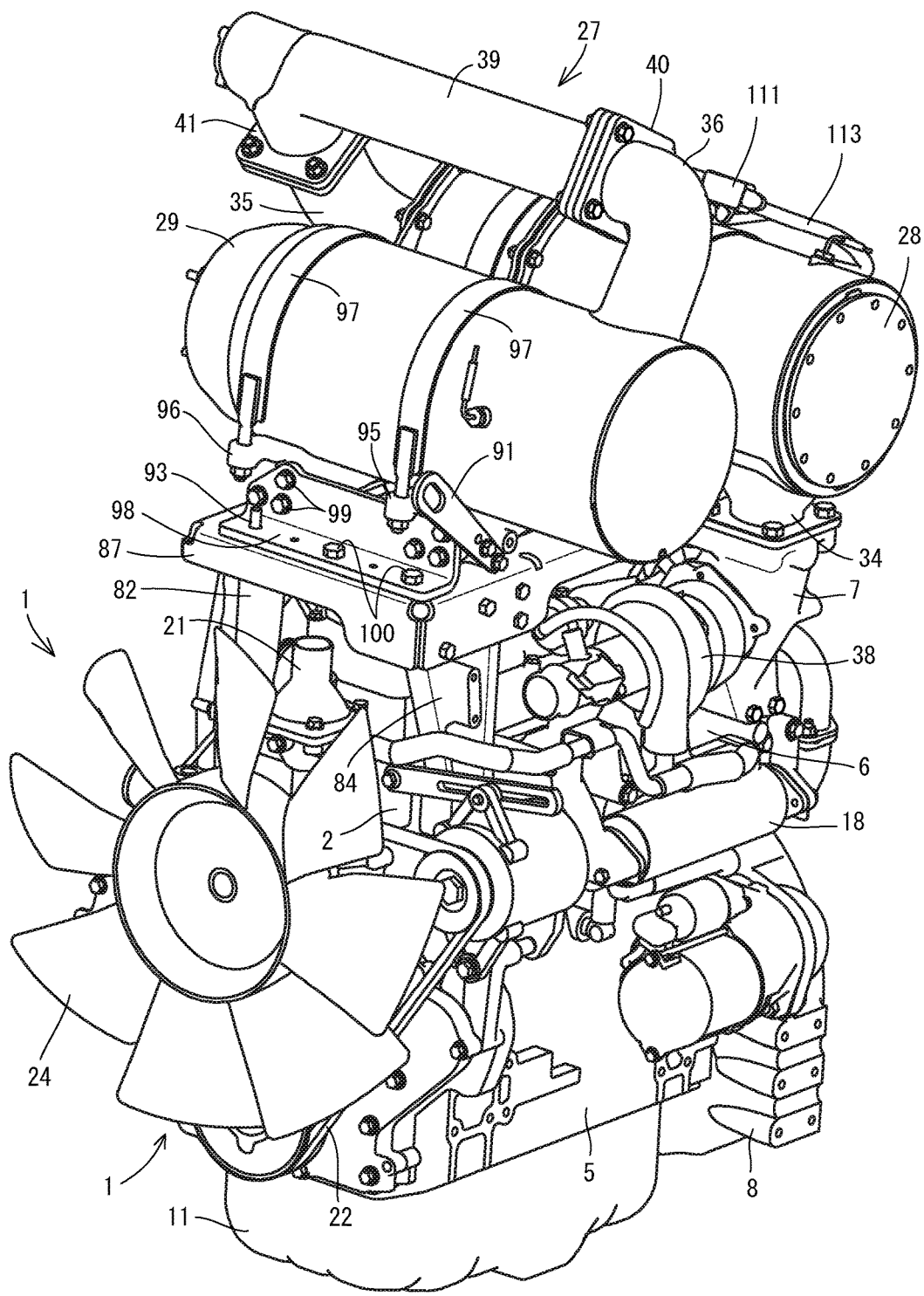
FIG. 6 is a perspective front view of the diesel engine.
Figure 7:
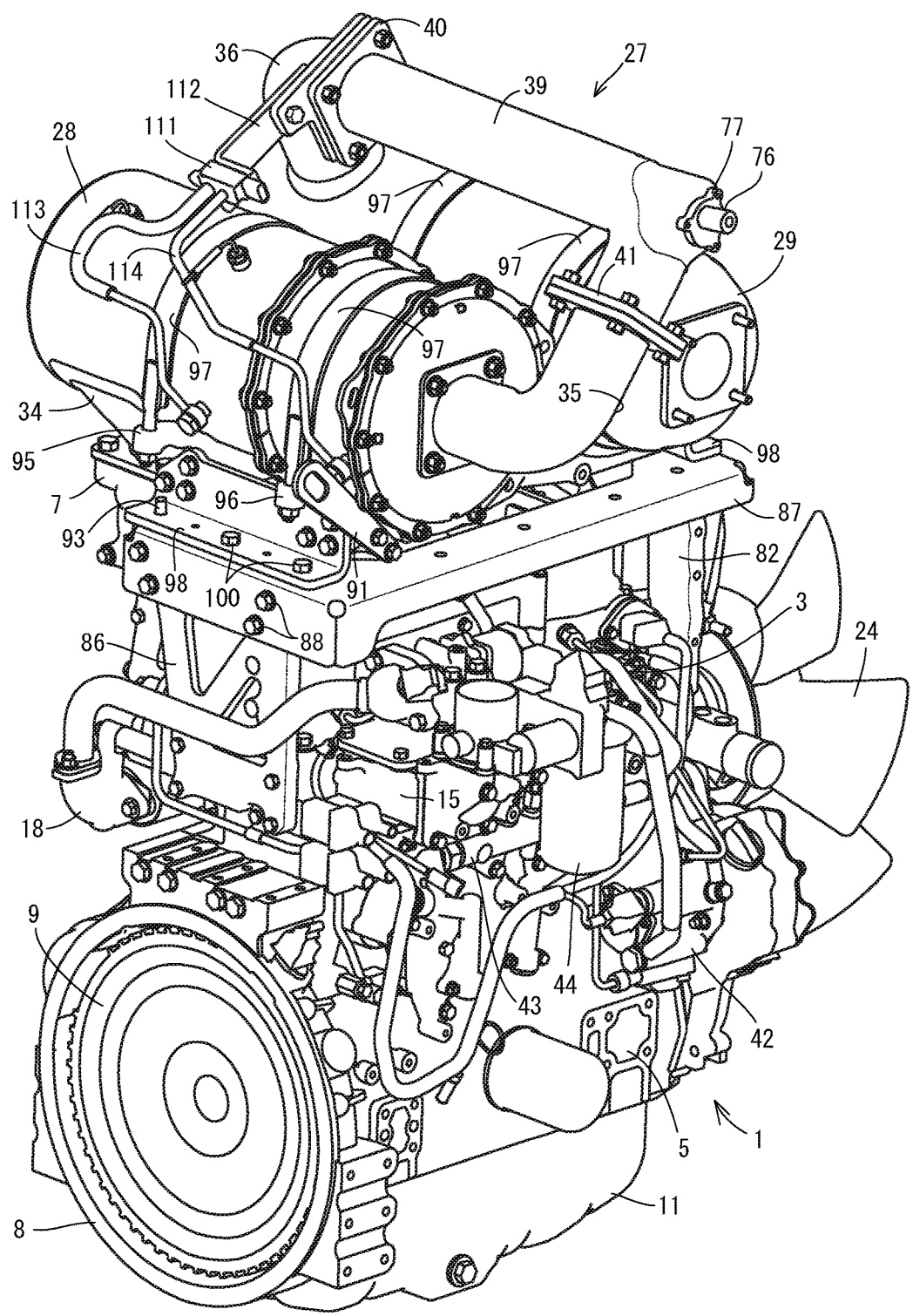
FIG. 7 is a perspective rear view of the diesel engine.
Figure 8:
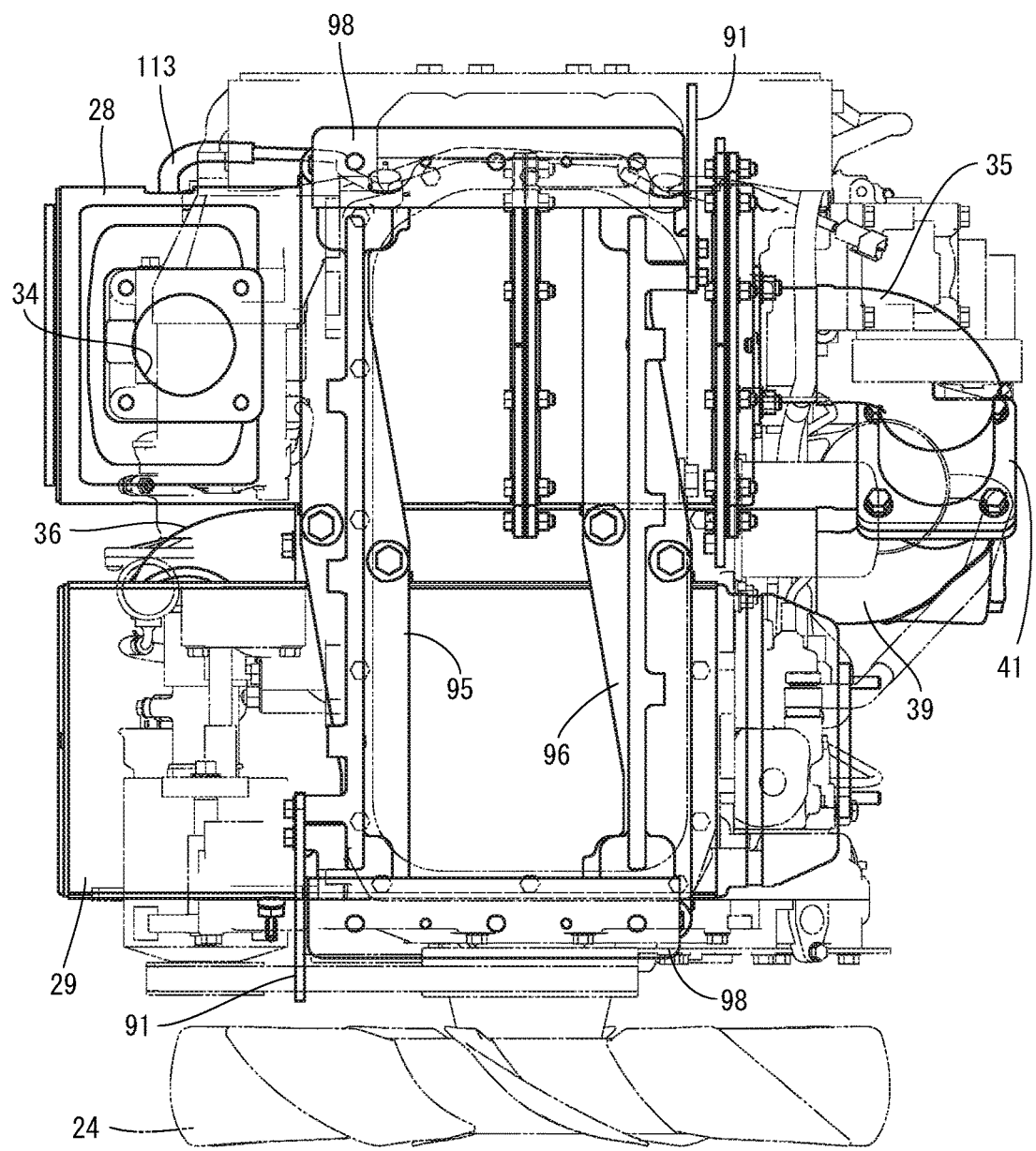
FIG. 8 is an explanatory bottom view of an exhaust gas purification unit body.
Figure 9:
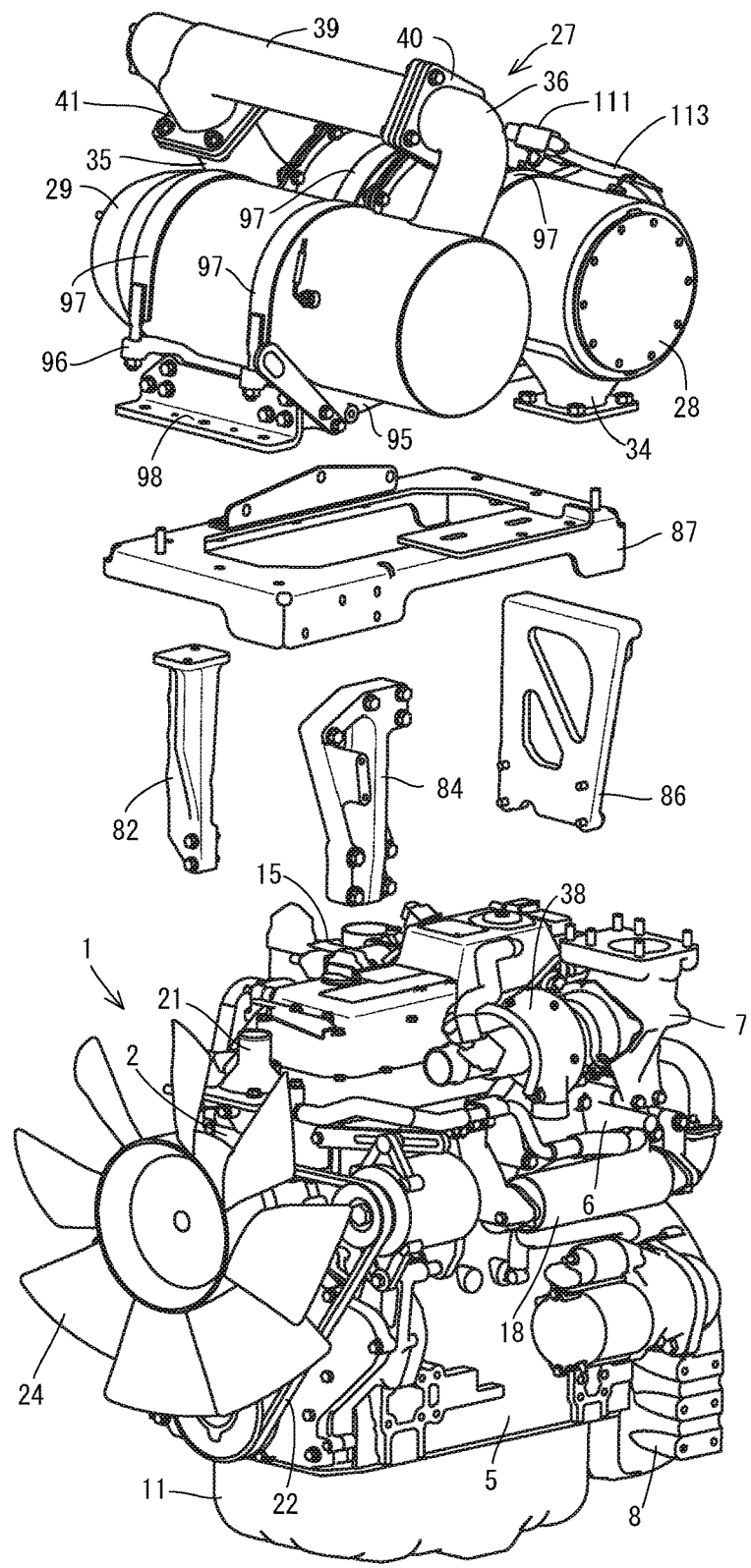
FIG. 9 is a perspective exploded front view of the exhaust gas purification unit body.
Figure 10:
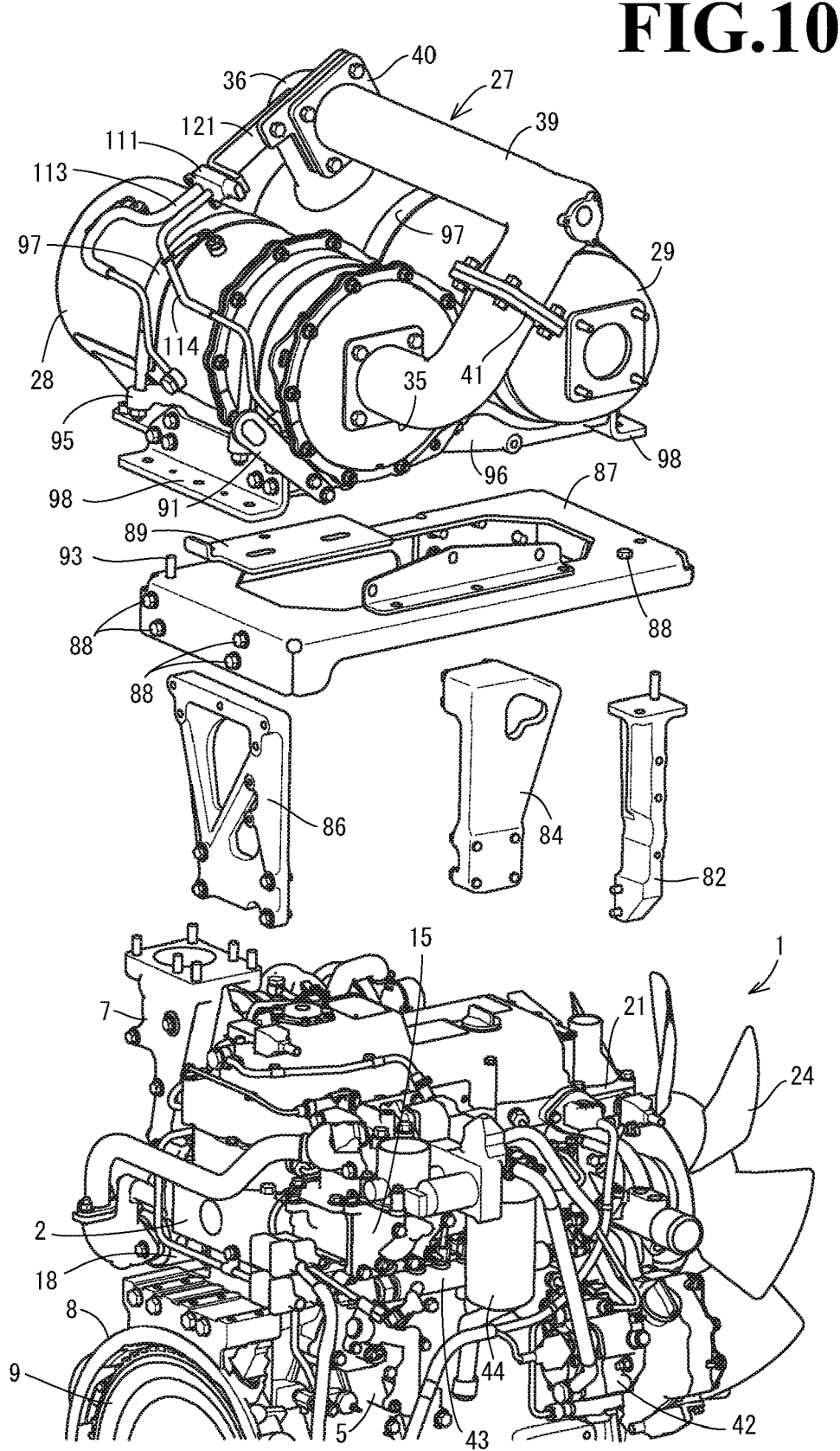
FIG. 10 is a perspective exploded rear view of the exhaust gas purification unit body.
Figure 11:
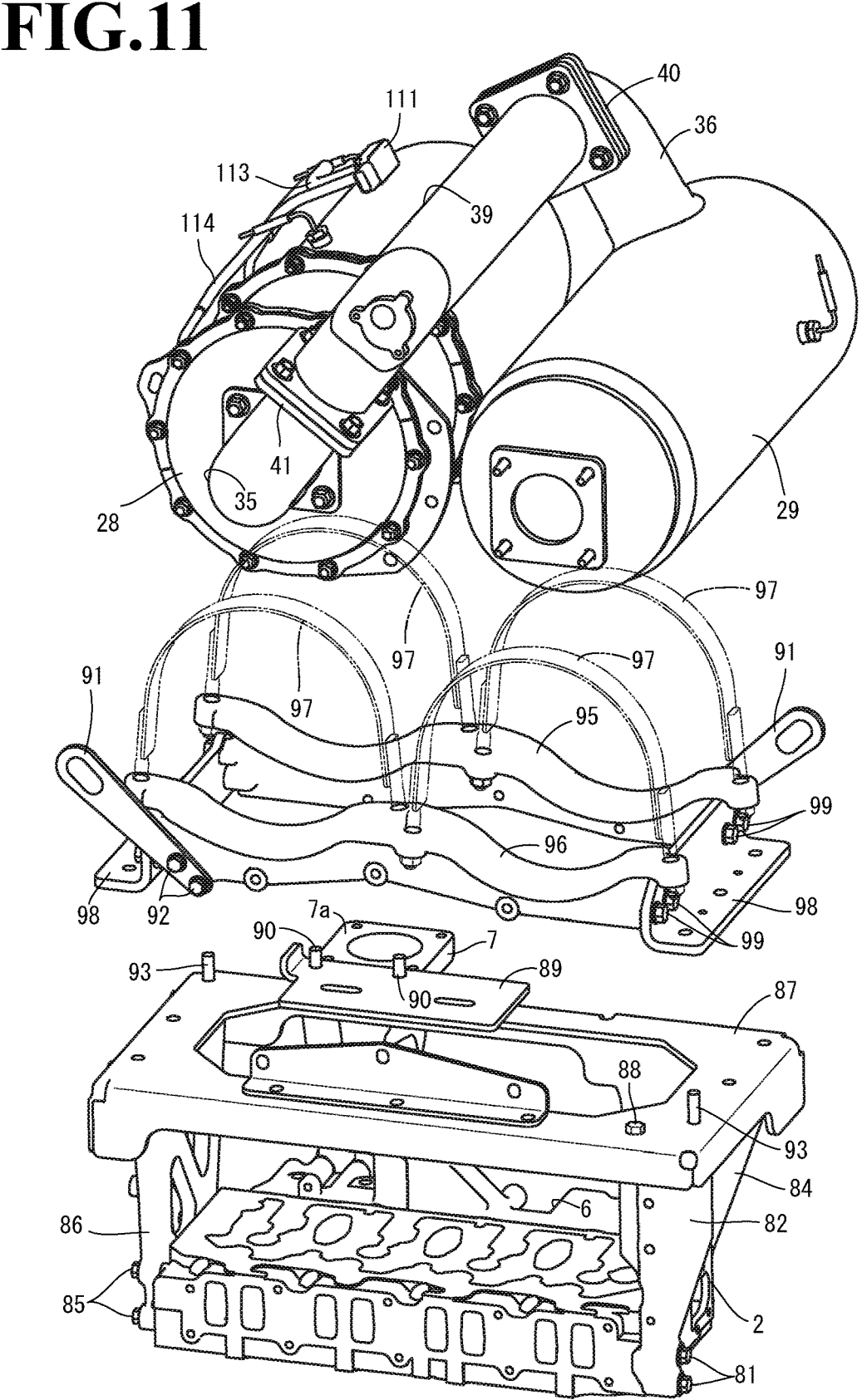
FIG. 11 is a perspective exploded right side view of the exhaust gas purification unit body.
Figure 12:
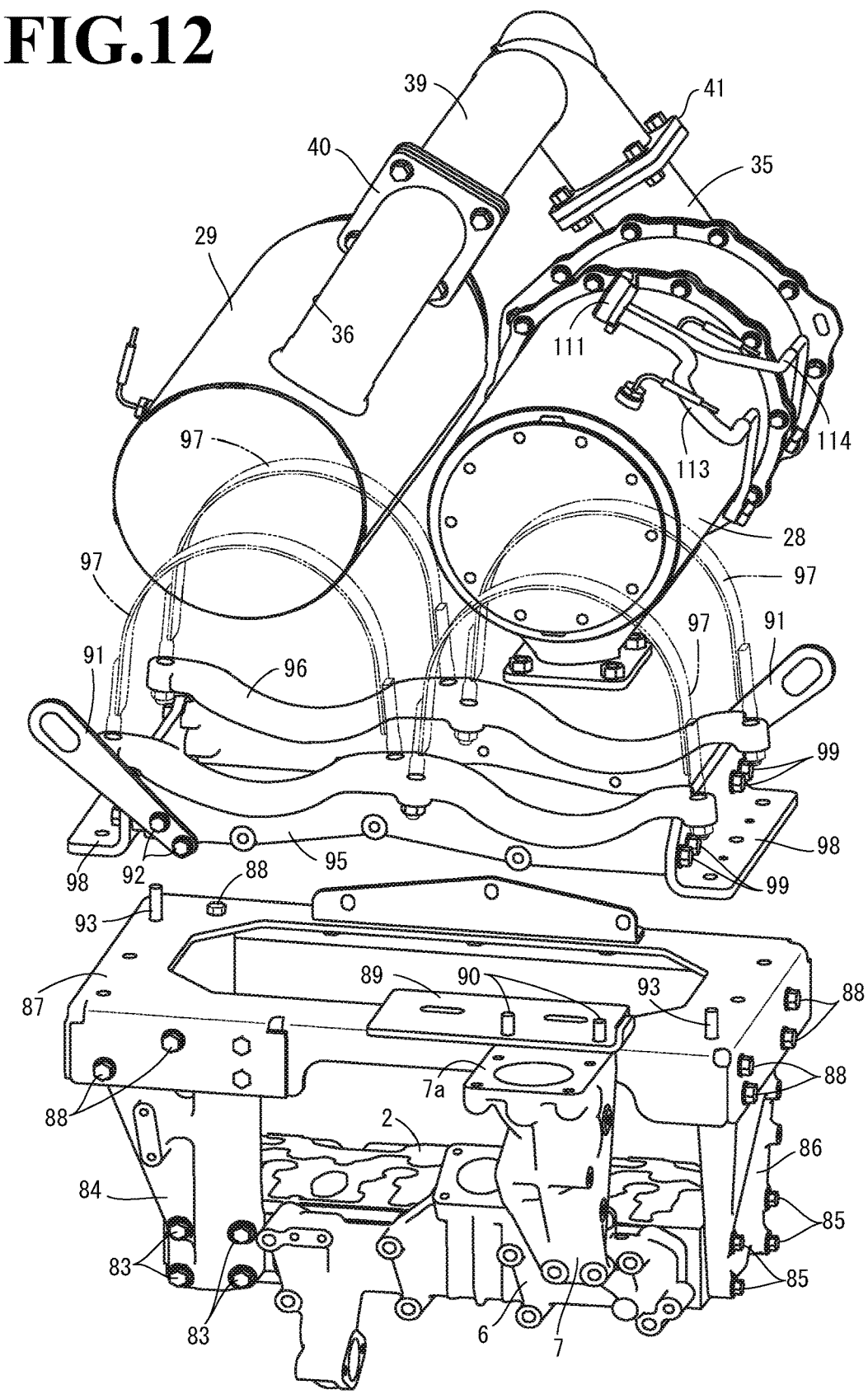
FIG. 12 is a perspective exploded left side view of the exhaust gas purification unit body.

The first case 28 and the second case 29 are constituted in a lateral, oblong cylindrical shape elongated in the orthogonal direction intersecting with the output shaft (crankshaft) 4 of the diesel engine 1 when viewed from a plane (see FIGS. 3 to 5). A DPF inlet pipe 34 that takes in the exhaust gas and a DPF outlet pipe 35 that discharges the exhaust gas are provided on the cylindrical bilateral sides (one end side and the other end side of the transfer direction of the exhaust gas) of the first case 28. Similarly, an SCR inlet pipe 36 that takes in the exhaust gas and an SCR outlet pipe 37 that discharges the exhaust gas are provided on the bilateral sides (one end side and the other end side of the transfer direction of the exhaust gas) of the second case 29.

Also, a supercharger 38 that forcibly feeds air into the diesel engine 1, and an exhaust gas outlet pipe 7 fastened with bolts to the exhaust manifold 6 are arranged at the exhaust gas outlet of the exhaust manifold 6. It is configured such that the DPF inlet pipe 34 communicates with the exhaust manifold 6 via the supercharger 38 and the exhaust gas outlet pipe 7, and the exhaust gas of the diesel engine 1 is introduced into the first case 28, while the SCR inlet pipe 36 is connected to the DPF outlet pipe 35 via a urea mixing pipe 39 as a joining pipe, and the exhaust gas in the first case 28 is introduced into the second case 29. In addition, the DPF outlet pipe 35 and the urea mixing pipe 39 are detachably connected by fastening with bolts on a DPF outlet-side flange body 41. It is noted that the SCR inlet pipe 36 and the urea mixing pipe 39 are detachably connected on an SCR inlet-side flange body 40 described later.

Figure 13:
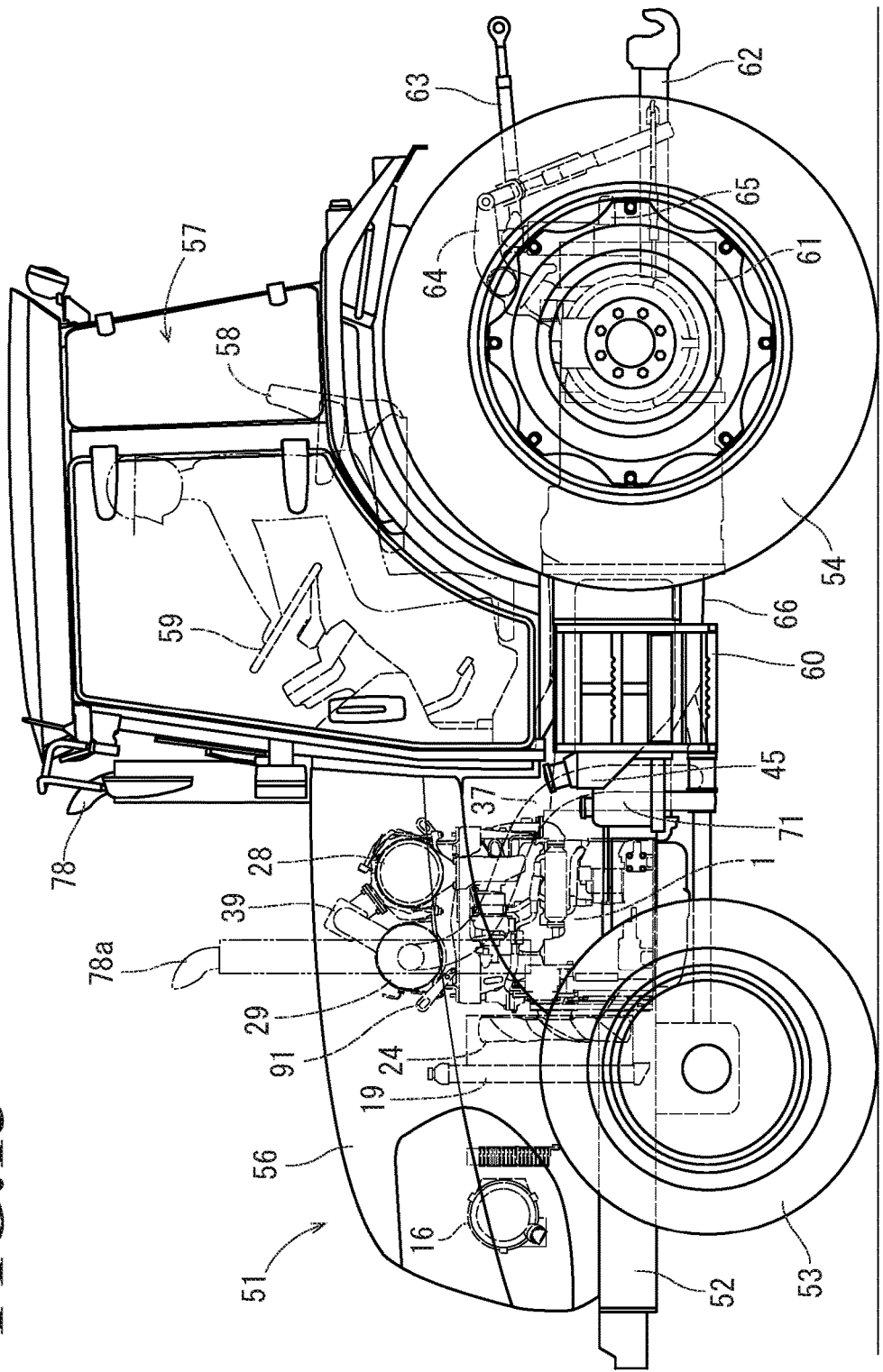
FIG. 13 is a left side view of a tractor in which the diesel engine is mounted.

As illustrated in FIG. 2, a fuel pump 42 and a common rail 43 that are connected to a fuel tank 45 illustrated in FIG. 13 (FIG. 14) are provided in respective injectors (not illustrated) corresponding to the multi cylinders of the diesel engine 1. The common rail 43 and a fuel filter 44 are arranged on the installation side of the intake manifold 3 of the cylinder head 2, and the fuel pump 42 is arranged in the cylinder block 5 below the intake manifold 3. It is noted that each injector includes a fuel injection valve (not illustrated) of an electromagnetic opening/closing control type.

The fuel in the fuel tank 45 is drawn in by the fuel pump 42 via the fuel filter 44, while the common rail 43 is connected to the discharge side of the fuel pump 42, and the cylindrical common rail 43 is connected to each injector of the diesel engine 1. It is noted that surplus fuel, out of the fuel that is pressure-fed from the fuel pump 42 to the common rail 43, is returned to the fuel tank 45, and the high-pressure fuel is temporarily retained in the common rail 43, and the high-pressure fuel in the common rail 43 is supplied into the interior of each cylinder (cylinder) of the diesel engine 1.

With the aforementioned constitution, the fuel in the fuel tank 45 is pressured-fed to the common rail 43 by means of the fuel pump 42, and the high-pressure fuel in the common rail 43 is stored, and the fuel injection valves of the injectors are respectively controlled in an openable/closable manner, thereby injecting the high-pressure fuel in the common rail 43 into the injectors of the diesel engine 1. That is, the fuel injection valve of each injector is electronically controlled, so that the injection pressure, injection time, and injection period (injection amount) of the fuel can be controlled with high accuracy. Accordingly, the nitride oxides (NOx) discharged from the diesel engine 1 can be reduced.

Figure 14:
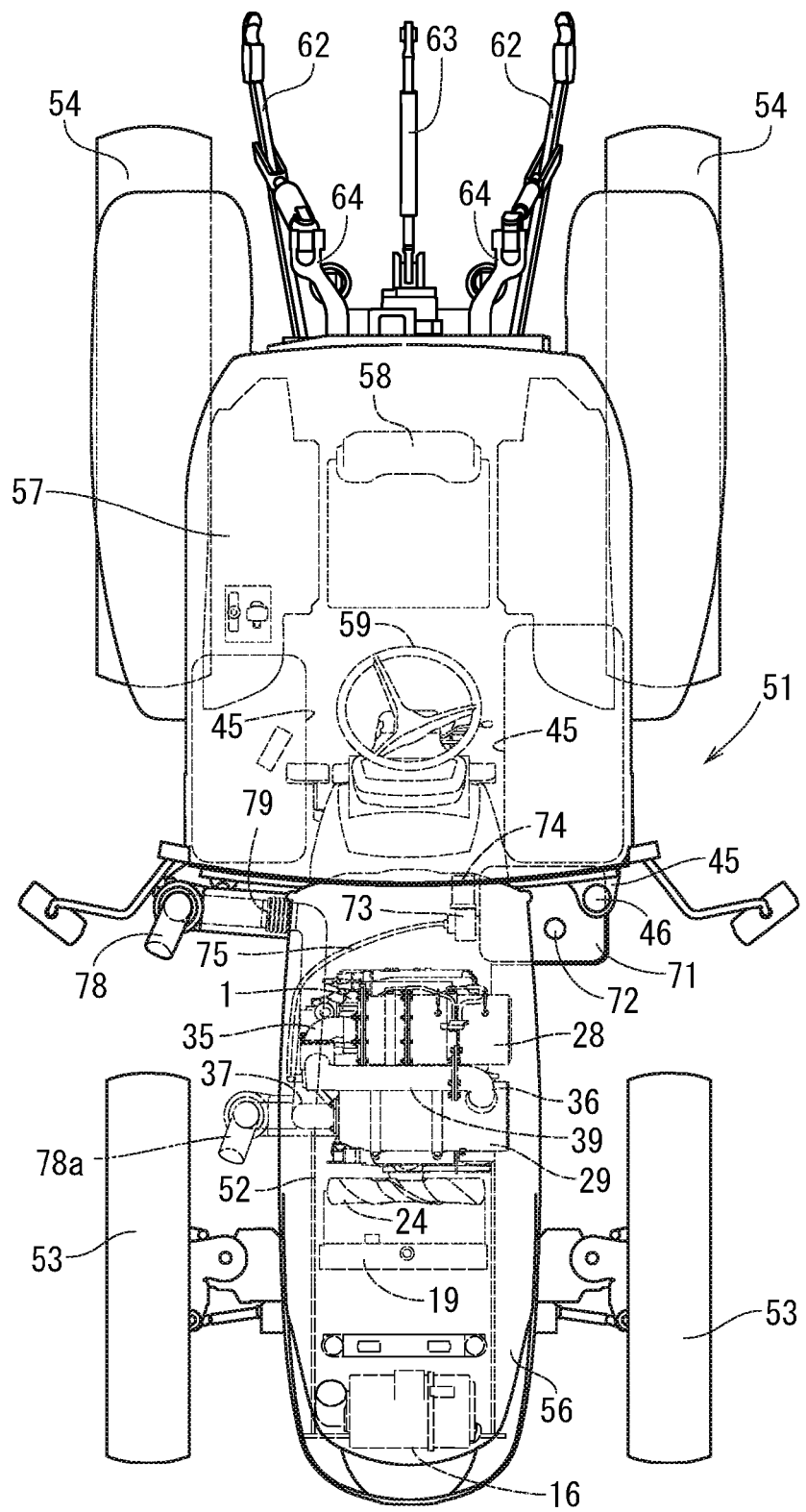
FIG. 14 is a plan view of the tractor.

Next, a tractor 51 on which the diesel engine 1 is mounted will be described referring to FIGS. 13 and 14. The tractor 51 as a work vehicle illustrated in FIGS. 13 and 14 is configured to be equipped with a tilling machine not illustrated and perform tillage so as to till farm fields. FIG. 13 is a side view of a tractor for farm work, and FIG. 14 is a plan view of the tractor. It is noted that, in the description below, a left side with respect to the advance direction of the tractor is merely referred to as "left side", and a right side with respect to the advance direction of the tractor is merely referred to as "right side".

As illustrated in FIGS. 13 and 14, the tractor 51 for farm work as a work vehicle is configured such that a travelling vehicle body 52 is supported by a pair of right and left front wheels 53 and a pair of right and left rear wheels 54, and the diesel engine 1 is mounted on the front portion of the travelling vehicle body 52, and the rear wheels 54 and the front wheels 53 are driven by the diesel engine 1, which allows the tractor 51 to travel forward and backward. The upper surface side and the right and left lateral surface sides of the diesel engine 1 are covered by an openable/closable hood 56.

Also, a cabin 57 that an operator rides on is installed in the rear of the hood 56 on the upper surface of the travelling vehicle body 52. A maneuvering seat 58 that the operator takes, and maneuvering instruments such as a maneuvering handle 59 as a steering means are provided in the interior of the cabin 57. Also, a pair of right and left steps 60 that the operator ascends or descends is provided on the right and left external lateral sections of the cabin 57, and the fuel tank 45 for supplying the fuel to the diesel engine 1 is provided on the inner side with respect to the steps 60 and on the lower side with respect to the bottom portion of the cabin 57.

Also, the travelling vehicle body 52 includes a mission case 61 for shifting the output from the diesel engine 1 and transmitting the output to the rear wheels 54 (front wheels 53). The tilling machine not illustrated or the like is coupled with the rear portion of the mission case 61 in such a manner as to be capable of being hoisted and lowered via a lower link 62, a top link 63, a lift arm 64, and the like. Furthermore, a PTO shaft 65 for driving the tilling machine and the like is provided on the rear lateral surface of the mission case 61. It is noted that the travelling vehicle body 52 of the tractor 51 is constituted of the diesel engine 1, the mission case 61, and a clutch case 66 that couples the diesel engine 1 with the mission case 61.

Furthermore, the mounting structure of the first case 28 and the second case 29 will be described referring to FIGS. 1 to 12 and 15 to 17. As illustrated in FIGS. 9 to 12 and 15 to 17, a front portion supporting leg body 82 that fastens a lower end side with bolts 81 to a right side corner section on the front surface of the cylinder head 2, a lateral portion supporting leg body 84 that fastens a lower end side with bolts 83 to a front side corner section on the left side surface of the cylinder head 2, and a rear portion supporting leg body 86 that fastens a lower end side with bolts 85 to a rear surface of the cylinder head 2 are included, and each of the supporting leg bodies 82, 84, and 86 is vertically installed in the cylinder head 2. A rectangular supporting stand 87 as an upper surface cover body formed by sheet metal processing is included, and the lateral surface and the upper surface side of the supporting stand 87 are fastened with bolts 88 to the upper end side of the supporting leg bodies 82, 84, and 86. Also, a tabular positioning body 89 is welded and fixed on the upper surface of the supporting stand 87 installed opposite to the exhaust gas outlet pipe 7, and part of the tabular lower surface of the positioning body 89 is brought in surface contact with part of a flat exhaust gas outlet surface 7a of the exhaust gas outlet pipe 7 opened upwardly, and the positioning body 89 is fastened with bolts 90 to the exhaust gas outlet pipe 7. It is configured that the surface contact of the positioning body 89 with the exhaust gas outlet pipe 7 allows the upper surface of the supporting stand 87 to be approximately horizontal to the diesel engine 1.

As illustrated in FIGS. 11 and 12, and 15 to 17, a pair of left case fixing body 95 and right case fixing body 96, and four fastening bands 97 are included as a clamping body for arranging the first case 28 and the second case 29 in parallel.

The first case 28 is adhered with the right and left fastening bands 97 to rear side placement portions of the left case fixing body 95 and the right case fixing body 96, and the second case 29 is adhered with the right and left fastening bands 97 to front side placement portions of the left case fixing body 95 and the right case fixing body 96. Accordingly, the first case 28 and the second case 29, each of which is formed in an oblong cylindrical shape elongated in the right-and-left direction, are arranged in parallel to the upper surface side of the diesel engine 1, so that the first case 28 is positioned on the rear side of the upper surface of the diesel engine 1, and the second case 29 is positioned on the front side of the upper surface of the diesel engine 1.

As illustrated in FIGS. 9 to 12, and 17, as an exhaust gas purification unit, the exhaust gas purification device 27 is configured such that a front and back supporting frame bodies 98 are fastened with bolts 99 to the front-and-back end portions of the left case fixing body 95 and the right case fixing body 96 in such a manner that a mounting position (supporting posture) can be adjusted, and the left and right case fixing bodies 95 and 96 and the front and back supporting frame bodies 98 are coupled in a rectangular frame shape, and the first case 28 and the second case 29 are adhered to the left case fixing body 95, the right case fixing body 96, and the front and back supporting frame bodies 98 via the fastening bands 97. It is noted that the internal diameter size of the bolt through-hole of the supporting frame bodies 98 is formed larger, compared with the external diameter size of the bolts 99, and the bolts 99 are inserted into the bolt through-holes of the supporting frame bodies 98 in a freely fittable manner, and it is configured such that when the case fixing bodies 95 and 96 are adhered to the supporting frame bodies 98, while the coupling posture of the supporting frame bodies 98 with respect to the case fixing bodies 95 and 96 is supported in a predetermined posture, the case fixing bodies 95 and 96 are threadedly engaged with the bolts 99, and the supporting frame bodies 98 are fastened with the bolts 99 to the case fixing bodies 95 and 96.

Also, right and left hanging members 91 are fastened with bolts 92 to the front end side of the left case fixing body 95 and the rear end side of the right case fixing body 96, and the right and left hanging members 91 are arranged at diagonal positions of a rectangular frame of the left and right case fixing bodies 95 and 96 and the front and back supporting frame bodies 98. In contrast, front and rear temporal fixing bolt bodies 93 are vertically installed on the upper surface of the supporting stand 87 disposed approximately horizontally, and the front and rear temporal fixing bolt bodies 93 are arranged at diagonal positions of the right and left hanging members 91 and at diagonal positions on the opposite side. That is, the right and left hanging members 91 and the front and rear temporal fixing bolt bodies 93 are allocated and arranged at vertical angle portions of the rectangular frame of the left and right case fixing bodies 95 and 96 and the front and back supporting frame bodies 98.

Next, the assembly procedure of assembling the exhaust gas purification device 27 (the exhaust purification unit) in the diesel engine 1 will be described. As illustrated in FIGS. 9 to 12, first, in assembling the exhaust gas purification device (the exhaust purification unit) 27, a pair of supporting frame bodies 98 made of sheet metal, whose end surface is formed in an L shape, are fastened with the bolts 99 to both end portions of the left case fixing body (clamping body) 95 and the right case fixing body (clamping body) 96. When the bolts 99 are tightened, looseness between the bolt hole of each supporting frame body 98 and the bolt 99 is utilized in such a manner that the height of the upper surface of the left case fixing body 95 is flush with the height of the upper surface of the right case fixing body 96, and the bolts 99 are tightened while the coupling positions of the case fixing bodies 95 and 96 and the supporting frame bodies 98 are adjusted, and the case fixing bodies 95 and 96 and the supporting frame bodies 98 are coupled in a rectangular frame shape.

Subsequently, the first case 28 and the second case 29 are placed in a predetermined direction (parallel) on upward-directed concave supporting portions on the upper surface side of the case fixing bodies 95 and 96, and the DPF outlet-side flange body 41 is fastened with bolts to the DPF outlet pipe 35, and other end side of the urea mixing pipe 39 is fastened with bolts to the SCR inlet pipe 36 via the SCR inlet-side flange body 40, and the first case 28, the second case 29, and the urea mixing pipe 39 are integrally combined. Then, two fastening bands 97 are respectively mounted in a half wound form on each upper surface side of the first case 28 and the second case 29, and the lower end side of each fastening band 97 is fastened with bolts to each of the case fixing bodies 95 and 96, and the hanging members 91 are fastened with the bolts 92 to each of the case fixing bodies 95 and 96, thereby completing the assembly of the exhaust gas purification device 27. It is noted that when the SCR inlet-side flange body 40 is fastened with bolts, a sensor bracket 112 is also fastened with bolts to the SCR inlet-side flange body 40, and a differential pressure sensor 111 is mounted on the sensor bracket 112.

On the other hand, in the neighborhood of a final assembly process of an assembly line (engine assembly site) of the diesel engine 1, respective lower end sides of the front portion supporting leg body 82, the lateral portion supporting leg body 84, and the rear portion supporting leg body 86 are fastened with the bolts 81, 83, and 85 to the cylinder head 2 of the diesel engine 1 for which the assembly work is approximately completed, and each of the supporting leg bodies 82, 84, and 86 is vertically installed in the cylinder head 2. Subsequently, the supporting stand 87 is placed on the upper end side of each of the supporting leg bodies 82, 84, and 86, and the lower surface of the positioning body 89 is brought in surface contact with the exhaust gas outlet surface 7a of the exhaust gas outlet pipe 7, and the supporting stand 87 is fastened with the bolts 88 to each of the supporting leg bodies 82, 84, and 86 in a state where the upper surface of the supporting stand 87 is supported approximately horizontally, and the supporting stand 87 is fixed in a horizontal posture on the upper surface side of the diesel engine 1.

Furthermore, at a work site in the neighborhood of the final assembly process of the diesel engine 1, the exhaust gas purification device 27, for which the assembly is completed as described above, is suspended on a loading-and-unloading device (hoist or chain block) not illustrated via the hanging members 91 and transferred to the upper surface side of the diesel engine 1 in which the supporting stand 87 is assembled as described above, and the front and back supporting frame bodies 98 are placed from the upper side on the approximately horizontal upper surface of the supporting stand 87 via the front and rear temporal fixing bolt bodies 93, and the front and back supporting frame bodies 98 are fastened with bolts 100 to the supporting stand 87, and the exhaust gas purification device 27 (the first case 28 and the second case 29) is united on the upper surface side of the diesel engine 1, thereby completing the assembly work in which the exhaust gas purification device 27 is assembled into the diesel engine 1.

Also, the urea mixing pipe 39 is arranged between the first case 28 and the second case 29, in parallel to the first case 28 and the second case 29. The first case 28, the second case 29, and the urea mixing pipe 39 are supported at a high position with respect to the cooling air path (shroud 101 illustrated in FIG. 1) of the cooling fan 24 via the upper surface of the supporting stand 87, and the front side of the urea mixing pipe 39 is blocked with the second case 29. Urea water supplied in the urea mixing pipe 39 is prevented from being crystallized, which is attributed to the reduction of the exhaust gas temperature in the urea mixing pipe 39 that is caused by the cooling wind of the cooling fan 24. Also, it is configured such that the urea water supplied in the urea mixing pipe 39 is mixed into the exhaust gas leading from the first case 28 to the second case 29 as ammonia.

As illustrated in FIGS. 1 to 12, regarding the engine device of the work vehicle that includes the first case 28 that removes the particulate matter in the exhaust gas of the diesel engine 1 and the second case 29 that removes the nitride oxides in the exhaust gas of the diesel engine 1 and that connects the first case 28 to the second case 29 via the urea mixing pipe 39, the engine device includes the case fixing bodies 95 and 96 for adhering to the first case 28 and the second case 29, and the hanging members 91 are adhered to the case fixing bodies 95 and 96. Accordingly, in a state where the first case 28 and the second case 29 are integrally assembled by means of the case fixing bodies 95 and 96 as the exhaust gas purification device (the exhaust purification unit) 27, the exhaust purification unit 27 can be hanged and supported by the loading-and-unloading device and the like via the hanging members 91. Regarding the assembly and disassembly work in which the exhaust gas purification device 27 is attached or detached on the upper surface side of the diesel engine 1, the exhaust gas purification device 27, which is a heavy weight component, can be easily handled.

As illustrated in FIGS. 1 to 12, the urea mixing pipe 39 is coupled between the first case 28 and the second case 29 that are integrally adhered by means of the case fixing bodies 95 and 96, thereby forming the exhaust gas purification device 27 as the exhaust purification unit, and a pair of hanging members 91 are arranged in such a manner as to face each other on the outer circumferential side of the diagonal position in a plane view, out of the outer circumferential side of the exhaust gas purification device 27. Accordingly, in the neighborhood of the final assembly process in the assembly process of the diesel engine 1, the exhaust gas purification device 27 can be easily assembled into the diesel engine 1, and the exhaust gas purification device 27 can be easily detached from the diesel engine 1 during maintenance work, repair work of the diesel engine 1, or the like.

As illustrated in FIGS. 1 to 12, the lower surface side of the supporting stand 87 is coupled with the upper surface side of the diesel engine 1 via the plurality of supporting leg bodies 82, 84, and 86, and the supporting stand 87 is arranged on the upper surface side of the diesel engine 1, and the case fixing bodies 95 and 96 are adhered to the approximately horizontal upper surface side of the supporting stand 87 in a detachable manner. Accordingly, while interference with accessory components and the like on the upper surface side of the diesel engine 1 can be easily reduced, the assembly workability of the diesel engine 1 or the maintenance workability of the diesel engine 1 can be easily improved.

As illustrated in FIGS. 1 to 12, regarding structure in which the cooling fan 24 is provided on one side of the diesel engine 1, the height of the approximately horizontal upper surface of the supporting stand 87 is formed higher than the height of the upper portion of the cooling fan 24. Accordingly, the wind from the cooling fan 24 is transferred to the lower surface side of the supporting stand 87, thereby appropriately maintaining the air cooling efficiency of the diesel engine 1, and further the temperature of the exhaust gas purification device 27 as the exhaust purification unit can be prevented from reducing due to the wind from the cooling fan 24, and the exhaust gas purification device 27 is kept at a predetermined temperature or higher, thereby improving the efficiency of exhaust purification.

As illustrated in FIGS. 1 to 12, regarding the engine device of the work vehicle that includes the first case 28 that removes the particulate matter in the exhaust gas of the diesel engine 1 and the second case 29 that removes the nitride oxides in the exhaust gas of the diesel engine 1 and that connects the first case 28 to the second case 29 via the urea mixing pipe 39, the first case 28 and the second case 29 are integrally adhered by means of the case fixing bodies 95 and 96, the fastening bands 97, and the supporting frame bodies 98 as the clamping means, thereby forming the exhaust purification unit 27, and it is configured such that the exhaust gas purification device 27 as the exhaust purification unit is detachably supported in the diesel engine via the case fixing bodies 95 and 96, the fastening bands 97, and the supporting frame bodies 98. Accordingly, the diesel engine 1 and the exhaust gas purification device 27 can be integrally constituted in the same vibration structure, which eliminates the vibration-proof coupling for the exhaust gas linking portions of the first case 28 and the second case 29, and the like, and it is configured such that the costs of the exhaust gas discharging paths in the diesel engine 1 and the exhaust gas purification device 27 can be reduced. Also, the exhaust gas purification device 27 is assembled in advance at a site that is different from the assembly work site of the diesel engine 1, and the exhaust gas purification device 27 can be placed on the diesel engine 1 in the neighborhood of the final process in the assembly work of the diesel engine 1, thereby improving the assembly workability of the diesel engine 1.

As illustrated in FIGS. 1 to 12, it is configured such that the supporting stand 87 is approximately horizontally adhered on the upper surface side of the diesel engine 1, and the case fixing bodies 95 and 96 are adhered on the upper surface side of the supporting stand 87 via the supporting frame bodies 98, and the first case 28 and the second case 29 are supported in a sideways posture on the upper surface side of the diesel engine 1 via the case fixing bodies 95 and 96 and the fastening bands 97, and the urea mixing pipe 39 is supported between the first case 28 and the second case 29 on the upper surface side of the first case 28 and the second case 29. Accordingly, the exhaust gas purification device 27 can be easily assembled and disassembled according to the combination and separation of the supporting stand 87 and the supporting frame bodies 98, and the first case 28 and the second case 29 can be reduced in bulk and supported so as to be compact in size on the upper surface side of the diesel engine 1. Also, a mounting interval between the first case 28 and the second case 29 can be maintained constant via the case fixing bodies 95 and 96 and the fastening bands 97, and exhaust gas pipe structure such as the urea mixing pipe 39 between the cases 28 and 29 can be simplified.

As illustrated in FIGS. 9 to 12, it is configured such that the lower end side of the plurality of supporting leg bodies 82, 84, and 86 is adhered to the outer circumferential surface of the cylinder head 2 of the diesel engine 1, and the approximately horizontal supporting stand 87 is detachably coupled on the upper end side of the plurality of supporting leg bodies 82, 84, and 86, and the exhaust gas purification device 27 is placed on the upper surface side of the diesel engine 1 via the supporting stand 87. Accordingly, the coupling portions of the plurality of supporting leg bodies 82, 84 and 86 and the supporting stand 87 are detached, and the supporting stand 87 is removed, and the upper surface side of the diesel engine 1 is opened wide, and maintenance work on the upper surface side of the diesel engine 1 can be easily executed, and the supporting stand 87 can be firmly coupled with the cylinder head 2 via the plurality of supporting leg bodies 82, 84, and 86, and the exhaust gas purification device 27 can be supported with high rigidity on the upper surface side of the diesel engine 1.

As illustrated in FIGS. 1 to 7, it is configured such that the exhaust gas purification device 27 is supported within a width of the diesel engine 1 in the core-line direction of the output shaft 4 via the supporting stand 87, and the direction intersecting with the core line of the output shaft 4 of the diesel engine 1 corresponds to the transfer direction of the exhaust gas in the first case 28 or the second case 29. Accordingly, the exhaust gas inlet of the first case 28 is directed on the side of the exhaust manifold 6 of the diesel engine 1, so that the exhaust gas purification device 27 can be supported in a posture in which the exhaust gas outlet of the second case 29 is directed on the side of the intake manifold 3 of the diesel engine 1. The exhaust gas path leading from the exhaust manifold 6 of the diesel engine 1 to the exhaust gas outlet of the second case 29 can be formed so as to be short, and the exhaust gas purification device 27 can be placed in a compact way on the upper surface side of the diesel engine 1.

On the other hand, as illustrated in FIGS. 13 and 14, with respect to the front surface of the cabin 57, a tailpipe 78 is vertically installed on the front surface of the corner section on the right side of the cabin 57, and the lower end side of the tailpipe 78 is extended to the interior of the hood 56, and the lower end side of the tailpipe 78 is connected to the SCR outlet pipe 37 via a corrugated-pipe-shaped flexible pipe 79, and the exhaust gas purified in the second case 29 is discharged from the tailpipe 78 to the upward direction of the cabin 57. Mechanical vibration transmitted from the side of the diesel engine 1 to the side of the tailpipe 78 is reduced according to the connection of the flexible pipe 79. Also, with respect to the front surface of the cabin 57, a urea water tank 71 is installed on the left side portion of the hood 56 on the side opposite to the right side portion where the tail pipe 78 is arranged. That is, the tailpipe 78 is arranged at the right side portion of the rear portion of the hood 56, whereas the urea water tank 71 is allocated and arranged at the left side portion of the rear portion of the hood 56. It is noted that, as illustrated by a virtual line in FIGS. 13 and 14, in the structure in which the tailpipe 78 for adhering to the side of the diesel engine 1 is included, the tailpipe 78 is integrally coupled with the SCR outlet pipe 37, thereby omitting the flexible pipe 79.

Furthermore, the urea water tank 71 is mounted on the travelling vehicle body 52 (the bottom portion frame of the cabin 57 and the like) of the rear portion on the left side of the hood 56. An oil-feeding port 46 of the fuel tank 45 and a water-feeding port 72 of the urea water tank 71 are adjacently provided on the front-surface lower portion on the left side of the cabin 57. The tailpipe 78 is arranged on the front surface on the right side of the cabin 57, on which the operator is less likely to get on/off, while the oil-feeding port 46 and the water-feeding port 72 are arranged on the front surface on the left side of the cabin 57, on which the operator is more likely to get on/off. It is noted that the cabin 57 is configured in such a manner that the operator can take or leave the maneuvering seat 58 from any of the right side or the left side.

Also, as illustrated in FIGS. 3 to 5, and 14, a urea water injection pump 73 that pressure-feeds the urea aqueous solution in the urea water tank 71, an electric motor 74 that drives the urea water injection pump 73, and a urea water injection nozzle 76 that connects the urea water injection pump 73 via a urea water injection pipe 75 are included. The urea water injection nozzle 76 is mounted on the urea mixing pipe 39 via an injection pedestal 77, and the urea aqueous solution is sprayed from the urea water injection nozzle 76 into the interior of the urea mixing pipe 39.

With the aforementioned constitution, carbon monoxide (CO) or hydrocarbon (HC) in the exhaust gas from the diesel engine 1 is reduced by the oxidation catalyst 30 and the soot filter 31 in the first case 28. Subsequently, the urea water from the urea water injection nozzle 76 is mixed with the exhaust gas from the diesel engine 1 in the interior of the urea mixing pipe 39. Then, the nitride oxides (NOx) in the exhaust gas mixed with the urea water as ammonia is reduced by the SCR catalyst 32 and the oxidation catalyst 33 in the second case 29 and discharged from the tailpipe 78 to the outside of the device.

As illustrated in FIGS. 1 to 12, and 15, regarding the engine device of the work vehicle that includes the first case 28 that removes the particulate matter in the exhaust gas of the diesel engine 1 and the second case 29 that removes the nitride oxides in the exhaust gas of the diesel engine 1 and that connects the first case 28 to the second case 29 via the urea mixing pipe 39, the engine device includes the supporting leg bodies 82, 84, and 86 that are installed in such a manner as to protrude from the diesel engine 1, and the supporting stand 87 adhered to the supporting leg bodies 82, 84, and 86, and it is configured such that the first case 28 and the second case 29 are mounted on the plane surface of the supporting stand 87. Accordingly, the supporting stand 87 can be easily adhered to the diesel engine 1 via the supporting leg bodies 82, 84, and 86 in a retrofitting work (in the neighborhood of the final assembly process of the diesel engine 1), and the first case 28 and the second case 29 can be supported in an appropriate posture on the supporting stand 87 of the diesel engine 1, and the workability of attaching or detaching the first case 28 and the second case 29 can be improved.

As illustrated in FIGS. 1 to 12, and 15, with respect to the outer side surface of the diesel engine 1, the plane surface of the supporting stand 87 (the bottom surface of the positioning body 89) is brought in surface contact with the horizontal surface (the exhaust gas outlet surface 7a) of the exhaust gas outlet portion (the exhaust gas outlet pipe 7), and the supporting stand 87 is joined with the outer side surface of the diesel engine 1 via the horizontal surface (the exhaust gas outlet surface 7a) on the outside of the diesel engine 1 and the plane surface (the bottom surface of the positioning body 89) of the supporting stand 87, and it is configured such that when the supporting stand 87 is fixed on the supporting leg bodies 82, 84, and 86, the upper surface side of the supporting stand 87 is disposed approximately horizontally. Accordingly, while the mounting angle of the supporting stand 87 can be easily determined with the coupling between the exhaust gas outlet pipe 7 (the exhaust gas outlet portion) and the supporting stand 87, the supporting stand 87 is constituted in sheet metal structure having high rigidity, thereby easily securing the mounting intensity. For example, the assembly workability, for which the mounting angle of the supporting stand 87 with respect to the diesel engine 1 is horizontally formed, and the like can be improved.

As illustrated in FIGS. 1 to 12, and 15, it is configured such that the positioning body 89 is integrally adhered to the supporting stand 87, and the positioning body 89 is brought in surface contact with the opening surface (the exhaust gas outlet surface 7a) of the exhaust gas outlet portion (the exhaust gas outlet pipe 7) of the diesel engine 1, and the supporting stand 87 is joined with the side of the diesel engine 1 via the positioning body 89, and the upper surface side of the supporting stand 87 is disposed approximately horizontally. Accordingly, after the supporting stand 87 is formed by press work or the like, the supporting stand 87 and the positioning body 89 are coupled with welding work or the like, and the lower surface of the positioning body 89 can be formed in parallel to the upper surface of the supporting stand 87 with high precision. The upper surface side of the supporting stand 87 can be formed approximately horizontally with the surface contact between the side of the diesel engine 1 and the positioning body 89, without preparing a specific coupling jig for the supporting stand 87. The positioning body 89 is provided as the coupling jig for the supporting stand 87, so that the attachment and detachment work of the supporting stand 87 can be easily executed at a repairing site of the diesel engine 1 and the like, where the coupling jig for the supporting stand 87 has not been prepared.

As illustrated in FIGS. 1 to 12, and 15, regarding the structure in which the first case 28 and the second case 29 are integrally constituted as the exhaust purification unit (the exhaust gas purification device 27), it is configured such that the exhaust purification unit (the exhaust gas purification device 27) is integrally attached or detached on the flat upper surface side of the supporting stand 87 whose lower surface side is adhered to the supporting leg bodies 82, 84, and 86. Accordingly, the first case 28 and the second case 29 can be attached or detached as a single component, and the assembly and disassembly workability of the first case 28 and the second case 29, the maintenance workability of the diesel engine 1, or the like can be improved.

As illustrated in FIGS. 1 to 8, regarding the engine device of the work vehicle that includes the first case 28 that removes the particulate matter in the exhaust gas of the diesel engine 1 and the second case 29 that removes the nitride oxides in the exhaust gas of the diesel engine 1 and that connects the first case 28 to the second case 29 via the urea mixing pipe 39, the diesel engine 1, the first case 28, and the second case 29 are integrally adhered, and the diesel engine 1, the first case 28, and the second case 29 are integrally constituted in a swingable manner. Accordingly, the diesel engine 1, the first case 28, and the second case 29 can be constituted in the same vibration structure, and it is not necessary to apply the vibration-proof coupling to the exhaust path between the diesel engine 1 and the first case 28 and the exhaust path between the first case 28 and the second case 29, so that the exhaust gas path structure between the diesel engine 1 and the second case 29 can be constituted in such a manner as to reduce costs. That is, it is not necessary to connect the vibration-proof members, for example, such as the corrugated flexible pipe or a heat-resistant rubber hose in the exhaust gas path between the first case 28 and the second case 29, so that the exhaust gas path structure between the diesel engine 1 and the second case 29 can be constituted in such a manner as to reduce costs.

As illustrated in FIGS. 1 to 10, the plurality of supporting leg bodies 82, 84, and 86 are vertically installed in the cylinder head 2 of the diesel engine 1, and the supporting stand 87 is coupled with the upper end sides of the plurality of supporting leg bodies 82, 84, and 86, and the first case 28 and the second case 29 are adhered on the upper surface side of the diesel engine 1 via the approximately horizontal supporting stand 87. Accordingly, the supporting stand 87 can be easily separated from the accessory components of the diesel engine 1. Also, the first case 28 and the second case 29 are integrally mounted with respect to the diesel engine 1, thereby simplifying the exhaust gas pipes of the cases 28 and 29, and the first case 28 and the second case 29 can be adhered with high rigidity to the cylinder head 2. In addition, the machining errors of the mounting components such as the supporting stand 87 can be alleviated by adjusting the coupling portions between the plurality of supporting leg bodies 82, 84, and 86 and the supporting stand 87, and an inclination angle in mounting the supporting stand 87 can be easily corrected, and the first case 28 and the second case 29 can be supported in a predetermined posture. The assembly workability, in which the first case 28 and the second case 29 are assembled into the diesel engine 1, can be easily improved.

As illustrated in FIGS. 1 to 8, the DPF inlet pipe 34 of the first case 28 is arranged on the side where the exhaust manifold 6 of the diesel engine 1 is installed, and the first case 28 is mounted in such a manner that the exhaust gas in the first case 28 can be transferred in the direction intersecting with the core line of the output shaft of the diesel engine 1, and the second case 29 is juxtaposed on the lateral section on the installation side of the cooling fan 24 of the diesel engine 1 on the lateral section of the first case 28. Accordingly, the first case 28 and the second case 29 are in close proximity to each other on the upper surface side of the diesel engine 1 and can be arranged in a compact way, whereas the second case 29 is interposed between the cooling fan 24 and the first case 28, thereby suppressing the reduction in temperature of the first case 28 due to the wind from the cooling fan 24. Also, the urea mixing pipe 39 that supplies the exhaust gas from the first case 28 to the second case 29 is supported between the first case 28 and the second case 29, so that the second case 29 is interposed between the cooling fan 24 and the urea mixing pipe 39, and the reduction in temperature of the urea mixing pipe 39 due to the wind from the cooling fan 24 can be suppressed.

As illustrated in FIGS. 1 to 8, 13, and 14, regarding the work vehicle in which the operating cabin 57 is arranged in rear of the hood 56 in which the diesel engine 1 is internally installed, the urea water tank 71 for exhaust gas purification is installed between the front portion of the operating cabin 57 and the rear portion of the diesel engine 1. Accordingly, the urea water tank 71 can be heated with the waste heat of the diesel engine 1 and the like, and the urea aqueous solution having a predetermined temperature or higher can be maintained in the urea water tank 71, and the reduction in the capacity of the exhaust gas purification of the second case 29 can be prevented in cold districts and the like. The water-feeding port 72 of the urea water tank 71 can be adjacently arranged on the operator's boarding and alighting portion of the operating cabin 57, and water-feeding work of the urea aqueous solution into the urea water tank 71 can be easily executed at the operator's boarding and alighting sites, and the workability of replenishing the urea aqueous solution for the exhaust gas purification can be improved.

As illustrated in FIGS. 1 to 12, and 17, regarding the engine device of the work vehicle that includes the first case 28 that removes the particulate matter in the exhaust gas of the diesel engine 1 and the second case 29 that removes the nitride oxides in the exhaust gas of the diesel engine 1 and that connects the first case 28 to the second case 29 via the urea mixing pipe 39, the engine device includes the plurality of case fixing bodies 95 and 96 for adhering to the first case 28 and the second case 29 and the supporting frame bodies 98 for adhering to the plurality of case fixing bodies 95 and 96, and the case fixing bodies 95 and 96 and the supporting frame bodies 98 are coupled in such a manner that the mounting angle (mounting position) can be adjusted, and the posture of the exhaust gas inlet portion 34 of the first case 28 is configured to be capable of being adjusted with respect to the mounting surface of the diesel engine 1, so that when the first case 28 and the second case 29 are assembled into the diesel engine 1 as a single unit, the mounting angles of the case fixing bodies 95 and 96 and the supporting frame bodies 98 are adjusted, and the coupling surface of the DPF inlet pipe 34 as the exhaust gas inlet portion of the first case 28 can be easily joined with the exhaust gas outlet surface 7a of the diesel engine 1. The mounting positioning work of the first case 28 and the second case 29 can be simplified. That is, the workability of attaching or detaching the first case 28 and the second case 29 can be improved, and the assembly workability or the maintenance workability of the diesel engine 1 can be simplified.

As illustrated in FIGS. 1 to 12, the exhaust gas purification device 27 as the exhaust purification unit is formed with the cases 28 and 29, the case fixing bodies 95 and 96, and the supporting frame bodies 98, and the lower end sides of the plurality of supporting leg bodies 82, 84, and 86 are adhered to the outer side surface of the cylinder head 2 of the diesel engine 1, and the supporting frame bodies 98 are coupled with the upper end sides of the plurality of supporting leg bodies 82, 84, and 86. Accordingly, the maintenance work on the upper surface side of the diesel engine 1 and the like can be easily executed through the attachment or detachment of the exhaust gas purification device 27. The supporting frame bodies 98 are firmly coupled with the cylinder head 2 via the plurality of supporting leg bodies 82, 84, and 86, and while the exhaust gas purification device 27 can be supported with high rigidity on the upper surface side of the diesel engine 1 and the like, interference with the accessory components of the diesel engine 1 can be easily reduced.

As illustrated in FIGS. 1 to 12, the supporting stand 87 is arranged approximately horizontally on the upper surface side of the diesel engine 1 via the plurality of supporting leg bodies 82, 84, and 86, and the supporting frame bodies 98 are adhered on the upper surface side of the supporting stand 87. Accordingly, during the maintenance work or repair work of the diesel engine 1, the first case 28 and the second case 29 can be easily detached from the diesel engine 1, and the maintenance work and the like on the upper surface side of the diesel engine 1 can be simplified.

As illustrated in FIGS. 1 to 12, and 15, it is configured such that part of the lower surface side of the supporting stand 87 is brought in surface contact with part of the exhaust gas outlet surface 7a of the diesel engine 1, and the supporting stand 87 is fixed on the diesel engine 1 in a horizontal posture with the exhaust gas outlet surface 7a of the diesel engine 1 as a reference. Accordingly, the supporting stand 87 having high rigidity structure can be constituted with low costs by means of sheet metal processing, and the positioning work at the time of assembly, in which the supporting frame bodies 98 are assembled on the upper surface side of the supporting stand 87, can be easily simplified, and the supporting stand 87 can be easily coupled with the diesel engine 1 in a predetermined supporting posture.

Subsequently, as illustrated in FIGS. 1, 2, and 5, in the interior of the first case 28, the differential pressure sensor 111 for detecting a difference between the exhaust gas pressure on the exhaust gas intake side (upstream side) and the exhaust gas pressure on the exhaust gas discharge side (downstream side) of the soot filter 31 is included. One end side of the sensor bracket 112 is fastened with bolts to the SCR inlet-side flange body 40, and the other end side of the sensor bracket 112 is provided in such a manner as to protrude from the SCR inlet-side flange body 40 to the upper surface side of the first case 28, and the differential pressure sensor 111 is adhered to the other end side of the sensor bracket 112. The differential pressure sensor 111 is arranged on the upper lateral section of the first case 28 via the sensor bracket 112. It is noted that one end sides of an upstream-side sensor pipe 113 and a downstream-side sensor pipe 114, each of which is made of synthetic rubber, are respectively connected to the differential pressure sensor 111. In the first case 28, the other end sides of the upstream-side sensor pipe 113 and the downstream-side sensor pipe 114 are respectively connected to the upstream side and downstream side of the soot filter 31.

Also, an upstream-side gas temperature sensor 115 for detecting an exhaust temperature on the exhaust gas intake side of the diesel oxidation catalyst 30, and a downstream-side gas temperature sensor 116 for detecting an exhaust temperature on the exhaust gas discharge side of the diesel oxidation catalyst 30 are included, and a difference (differential pressure of exhaust gas) between exhaust gas pressure on the inflow side of the soot filter 31 and exhaust gas pressure on the outflow side of the soot filter 31 is detected by the differential pressure sensor 111, and an exhaust gas temperature of the diesel oxidation catalyst 30 portion on the exhaust gas intake side of the soot filter 31 is detected by each of sensors 115 and 116. That is, the residual amount of particulate matter in the exhaust gas captured by the soot filter 31 is proportional to the differential pressure of the exhaust gas, and therefore, when the amount of particulate matter remaining in the soot filter 31 increases to a predetermined amount or more, soot filter regeneration control (for example, fuel injection control or intake control of the diesel engine 1 wherein the exhaust gas temperature is raised), in which the amount of particulate matter in the soot filter 31 is reduced, is executed based on the detection results of the differential pressure sensor 111.

Figure 18:
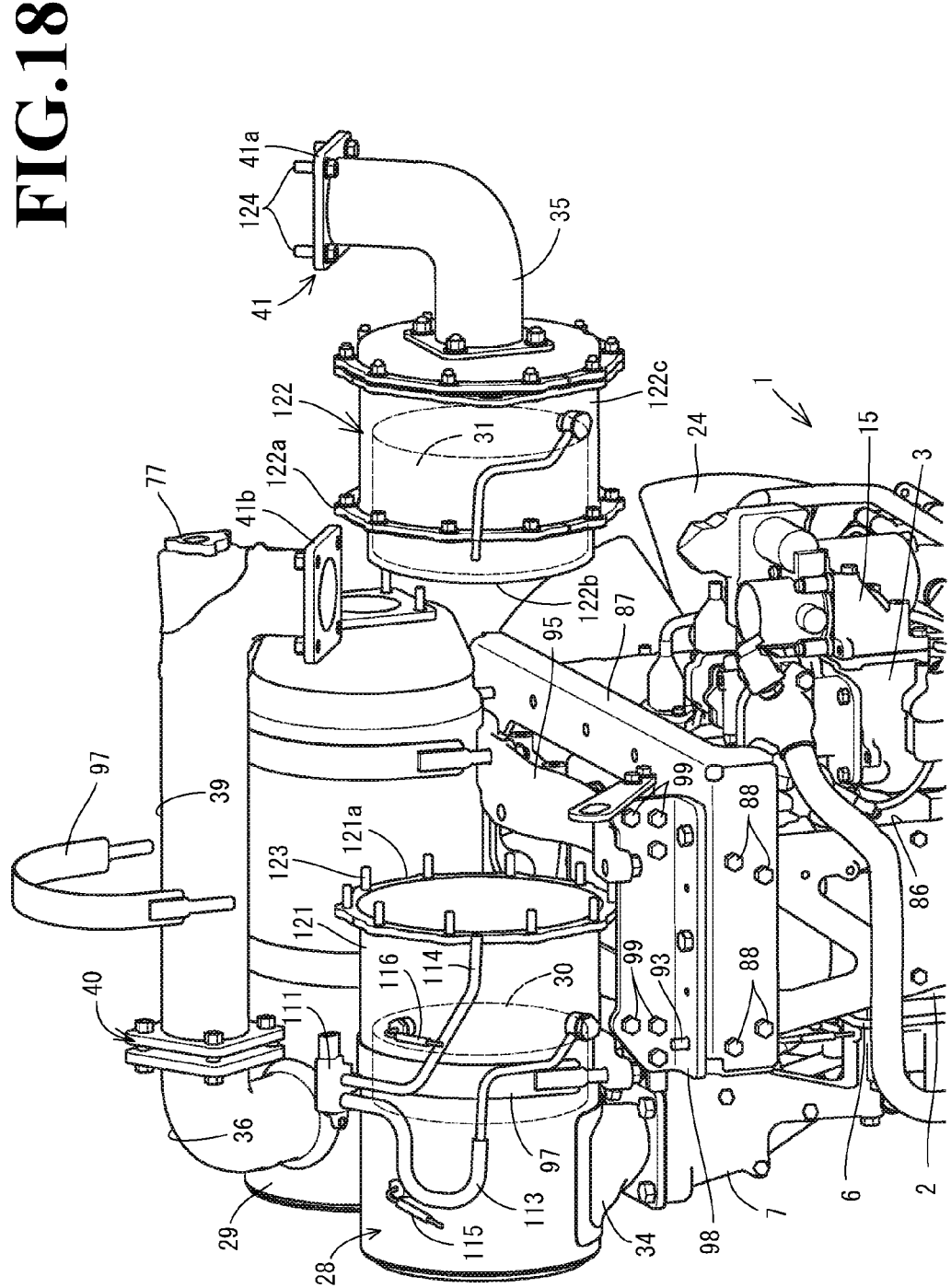
FIG. 18 is a perspective rear view in which part of a first case is disassembled.
Figure 19:
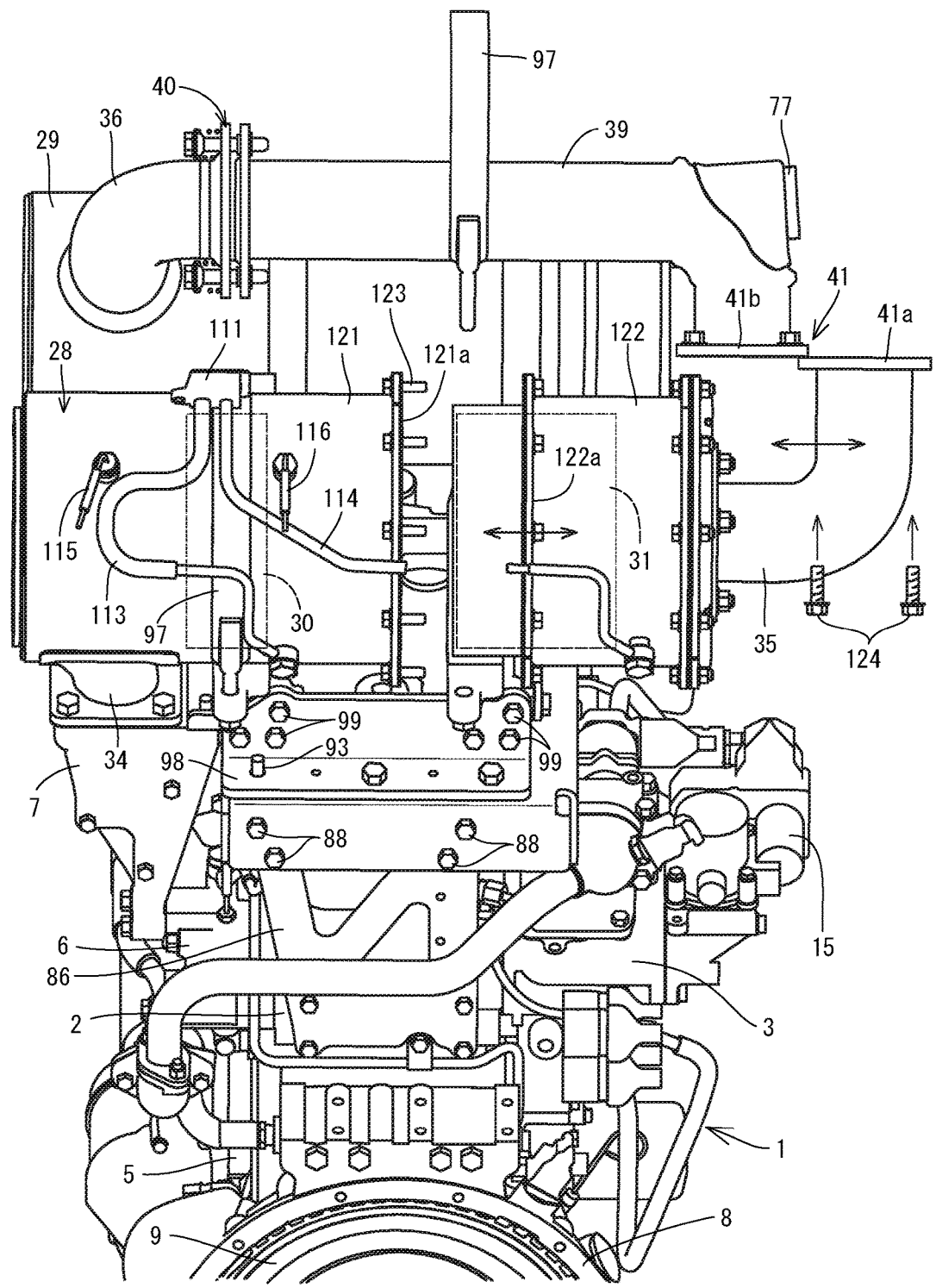
FIG. 19 is an explanatory view during detachment in which part of the first case is disassembled.

Subsequently, the assembly and disassembly structure of the first case 28 will be described referring to FIGS. 18 and 19. As illustrated in FIGS. 18 and 19, the first case 28 is formed of an exhaust intake side case 121 in which the DPF inlet pipe 34 is provided, and an exhaust discharge side case 122 in which the DPF outlet pipe 35 is provided. It is configured that the oxidation catalyst 30 is internally installed in the exhaust intake side case 121, and the soot filter 31 is internally installed in an inner tube 122b of the exhaust discharge side case 122, and the exhaust gas intake side of the inner tube 122b is internally installed in an outer tube 122c of the exhaust discharge side case 122, and the exhaust gas discharge side of the inner tube 122b is protruded from the outer tube 122c.

Also, the exhaust gas discharge side of the inner tube 122b is inserted into the exhaust intake side case 121 in an insertable and extractable manner, and a case flange body 121a of the exhaust intake side case 121 and a case flange body 122a of the outer tube 122c are fastened with bolts 123 in a separable manner, and the exhaust intake side case 121 and the exhaust discharge side case 122 are coupled with each other in a detachable manner. In contrast, the DPF outlet pipe 35 as an exhaust outlet pipe is provided in the exhaust discharge side case 122 (the outer tube 122c), and the exhaust gas outlet side of the DPF outlet pipe 35 is extended in the radial direction (the direction intersecting with the cylindrical axial line of the first case 28) intersecting with the transfer direction of the exhaust gas in the first case 28. Furthermore, the DPF outlet-side flange body 41 for coupling the urea mixing pipe 39 with the DPF outlet pipe 35 is formed of an outlet pipe flange 41a of the exhaust gas outlet-side end portion of the DPF outlet pipe 35 and a mixing pipe flange 41b of the exhaust gas inlet-side end portion of the urea mixing pipe 39, and the outlet pipe flange 41a is positioned on the outer lateral section of the cylindrical outer circumferential surface of the exhaust discharge side case 122 (the outer tube 122c).

That is, on the outside of the exhaust discharge side case 122, the DPF outlet pipe 35 is extended on the outside in the direction intersecting with the transfer direction of the exhaust gas, and the coupling portion (the DPF outlet-side flange body 41) of the urea mixing pipe 39 and the DPF outlet pipe 35 is disposed at a position deviated from the separation locus of the exhaust discharge side case 122, separated in the transfer direction of the exhaust gas. It is configured that the mixing pipe flange 41b is fastened with bolts 124 to the outlet pipe flange 41a, and one end side of the urea mixing pipe 39 is coupled with the DPF outlet pipe 35, and the other end side of the urea mixing pipe 39 is coupled with the SCR inlet pipe 36 via the SCR inlet-side flange body 40, and the DPF outlet pipe 35, the urea mixing pipe 39, and the SCR inlet pipe 36 are integrally fixed.

With the aforementioned constitution, when the residual amount (the detection values of the differential pressure sensor 111 and the like) of particulate matter in the soot filter 31 increases to or over a range where the regeneration control can be performed, the bolts 123 are removed, and the fastening of the case flange bodies 121a and 122a is released, and when the bolts 124 are removed, and the fastening of the outlet pipe flange 41a and the mixing pipe flange 41b is released, the exhaust discharge side case 122 can be separated from the exhaust intake side case 121. The exhaust discharge side case 122 is alienated from the exhaust intake side case 121 in the direction of the cylindrical axial line of the first case 28 (the transfer direction of the exhaust gas), and the inner tube 122b is pulled out from the exhaust intake side case 121, thereby disassembling the first case 28 in a detachable manner. Next, the maintenance work of the first case 28, in which the soot filter 31 is taken out from the inner tube 122b, and the particulate matter in the soot filter 31 is artificially removed, is carried out.

It is noted that when the bolts 123 are removed, and the fastening of the case flange bodies 121a and 122a is released, the exhaust intake side case 121 is supported by the exhaust gas outlet pipe 7 via the DPF inlet pipe 34, and when the bolts 124 are removed, and the fastening of the outlet pipe flange 41a and the mixing pipe flange 41b is released, the urea mixing pipe 39 is supported by the second case 29 via the SCR inlet-side flange body 40. Accordingly, in the maintenance (filter regeneration) work of the soot filter 31, it is only necessary to remove the exhaust discharge side case 122, but it is not required to remove the exhaust intake side case 121 or the urea mixing pipe 39, so that the maintenance man-hour of the soot filter 31 can be reduced, compared with the structure required for the disassembly of the exhaust intake side case 121 or the urea mixing pipe 39.

As illustrated in FIGS. 9 to 12, regarding the engine device that includes the first case 28 that removes the particulate matter in the exhaust gas of the diesel engine 1 and the second case 29 that removes the nitride oxides in the exhaust gas of the diesel engine 1 and that connects the first case 28 to the second case 29 via the urea mixing pipe 39, the supporting stand 87 as an upper surface cover body is adhered to the upper portion of the diesel engine 1 via the front portion supporting leg body 82, the lateral portion supporting leg body 84, and the rear portion supporting leg body 86 as the supporting leg bodies, and the upper portion of the diesel engine 1 is covered with the supporting stand 87 while any one or both of the first case 28 and the second case 29 are placed on the upper surface side of the supporting stand 87. Accordingly, the upper surface side of the diesel engine 1 can be protected with the supporting stand 87, and during the disassembly work of detaching the first case 28 or the second case 29, the accessory components of the diesel engine 1 can be easily prevented from being damaged by an operator with tools, and the radiant heat of the first case 28 or the second case 29 can be blocked with the supporting stand 87, and the accessory components on the upper surface side of the diesel engine 1 can be easily prevented from being damaged due to the radiant heat of the first case 28 or the second case 29.

As illustrated in FIGS. 2 to 4, 9 to 12, and 16, the first case 28, the second case 29, and the urea mixing pipe 39 are adhered in parallel to the case fixing bodies 95 and 96 and the supporting frame body 98 as the unit frame bodies, thereby forming the exhaust gas purification device 27 as the exhaust purification unit, and the exhaust gas purification device 27 is detachably placed on the upper surface side of the supporting stand 87. Accordingly, the exhaust gas purification device 27 can be mounted on the diesel engine 1 at a final assembly process in which the assembly work of the diesel engine 1 is completed, at the assembly plant of the diesel engine 1 and the like, and while the assembly workability of the diesel engine 1 and the like can be improved, the exhaust gas purification device 27 is detached, and the upper surface side of the diesel engine 1 can be widely opened, and the maintenance workability on the upper surface side of the diesel engine 1 and the like can be improved.

As illustrated in FIGS. 1 to 7, 18, and 19, regarding the engine device of the work vehicle that includes the first case 28 that removes the particulate matter in the exhaust gas of the engine 1 and the second case 29 that removes the nitride oxides in the exhaust gas of the engine 1 and that connects the first case 28 to the second case 29 via the urea mixing pipe 39, the first case 28 is formed in such a manner as to be divided into the exhaust intake side case 121 and the exhaust discharge side case 122, and the exhaust discharge side case 122 is configured to be separable in a state where the exhaust intake side case 121 is supported on the side of the engine 1. Accordingly, during the maintenance work in the interior of the first case 28, it is not required to remove the whole of the first case 28, and the number of detachable components that are necessitated for the maintenance work in the interior of the exhaust discharge side case 122 (the first case) can be easily reduced, and the soot filter 31 internally installed in the exhaust discharge side case 122 and the like can be easily detached, and the cleaning man-hour of the interior of the exhaust discharge side case 122 or the soot filter 31, or the like can be reduced.

As illustrated in FIGS. 1 to 7, 18, and 19, the DPF outlet pipe 35 as an exhaust outlet pipe that connects the urea mixing pipe 39 to the first case 28 is included, and on the outside of the exhaust discharge side case 122, the DPF outlet pipe 35 is extended on the outside in the direction intersecting with the transfer direction of the exhaust gas, and the coupling portion (the DPF outlet-side flange body 41) of the urea mixing pipe 39 and the DPF outlet pipe 35 is disposed at a position deviated from the separation locus of the exhaust discharge side case 122, which is separated in the transfer direction of the exhaust gas. Accordingly, the fastening bolts of the coupling portion of the urea mixing pipe 39 and the DPF outlet pipe 35, or the like is detached, and the coupling of the exhaust intake side case 121 and the exhaust discharge side case 122 is released, so that the exhaust discharge side case 122 is slid in the transfer direction of the exhaust gas in the first case 28, thereby easily separating the exhaust discharge side case 122 from the exhaust intake side case 121.

As illustrated in FIGS. 1 to 7, 18, and 19, it is configured such that the case fixing bodies 95 and 96 and the fastening bands 97 as a clamping body for adhering to the exhaust intake side case 121 and the second case 29, and the case fixing bodies 95 and 96 and the fastening bands 97 as a clamping body for adhering to the exhaust discharge side case 122 and the second case 29 are included, and the first case 28 and the second case 29 are integrally adhered by means of the case fixing bodies 95 and 96 and the fastening bands 97, thereby forming the exhaust gas purification device 27 as the exhaust purification unit. Accordingly, the exhaust discharge side case 122 can be easily detached by removing the fastening bands 97 that fasten the exhaust discharge side case 122 and the second case 29. During the maintenance of the interior of the exhaust discharge side case 122, the attachment or detachment work of the fastening band 97 that fastens the exhaust intake side case 121 and the second case 29 is eliminated, so that maintenance (the cleaning of the soot filter) workability in the interior of the exhaust discharge side case 122 can be improved.

As illustrated in FIGS. 1, and 9 to 12, it is configured such that the case fixing bodies 95 and 96 and the fastening bands 97 with which the first case 28 and the second case 29 are integrally adhered, and the supporting stand 87 for mounting the case fixing bodies 95 and 96 are included, and the plurality of supporting leg bodies 82, 84 and 86 are vertically installed on the upper surface side of the diesel engine 1, and the supporting stand 87 is coupled with the exhaust manifold 6 of the diesel engine 1 and the plurality of supporting leg bodies 82, 84 and 86. Accordingly, the machining errors of the mounting components such as the supporting stand 87 can be alleviated by adjusting the coupling portions between the supporting leg bodies 82, 84, and 86 and the supporting stand 87, and an inclination angle in mounting the supporting stand 87 can be easily corrected, and the first case 28 and the second case 29 can be supported in a predetermined posture, and the supporting stand 87 is separated away from the accessory components of the diesel engine 1, thereby supporting the first case 28 and the second case 29 in such a manner as to eliminate mutual interference. The assembly workability, in which the first case 28 and the second case 29 are assembled into the diesel engine 1, can be easily improved.

Figure 20:
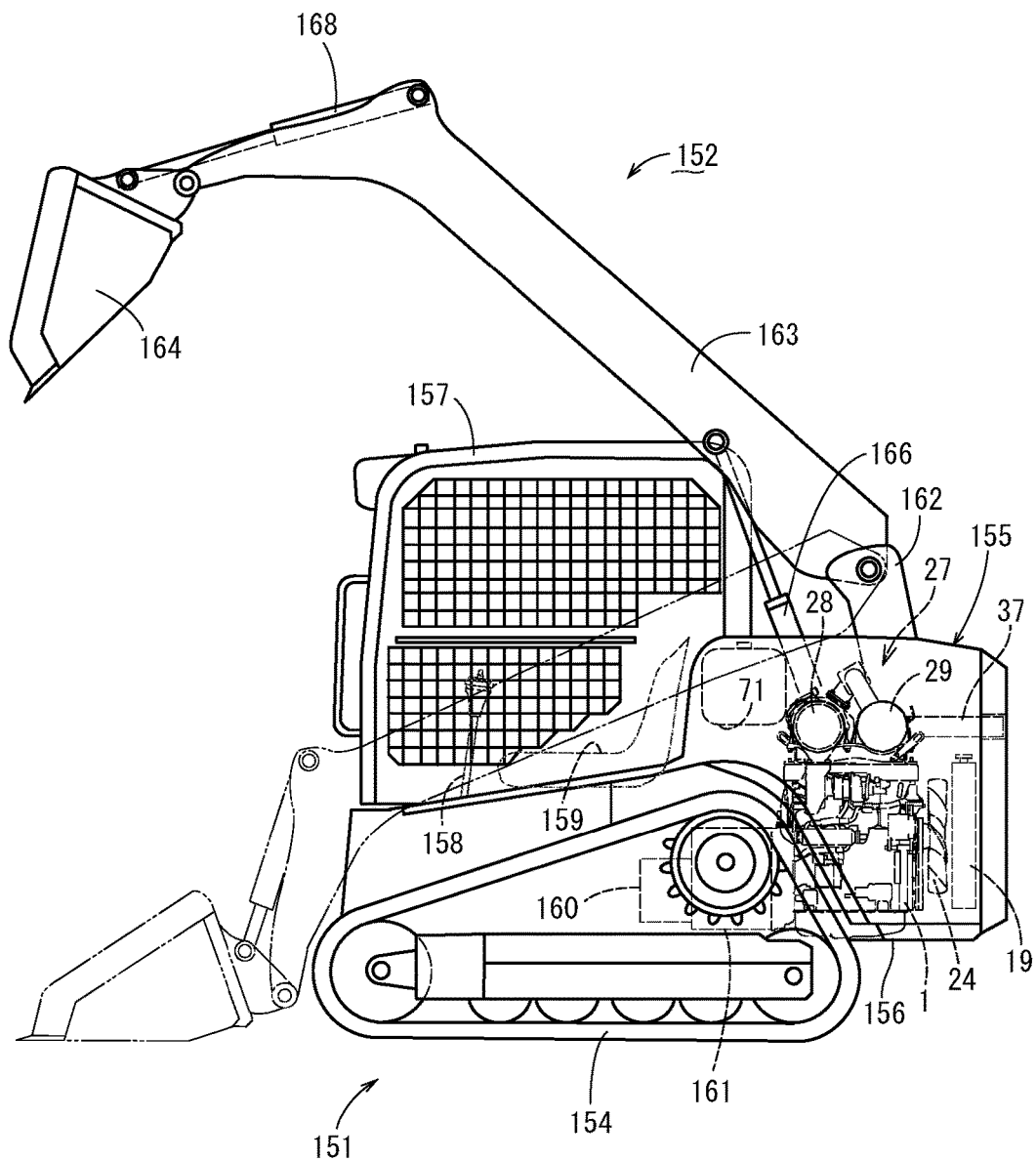
FIG. 20 is a side view of a work vehicle in which the diesel engine is mounted.
Figure 21:
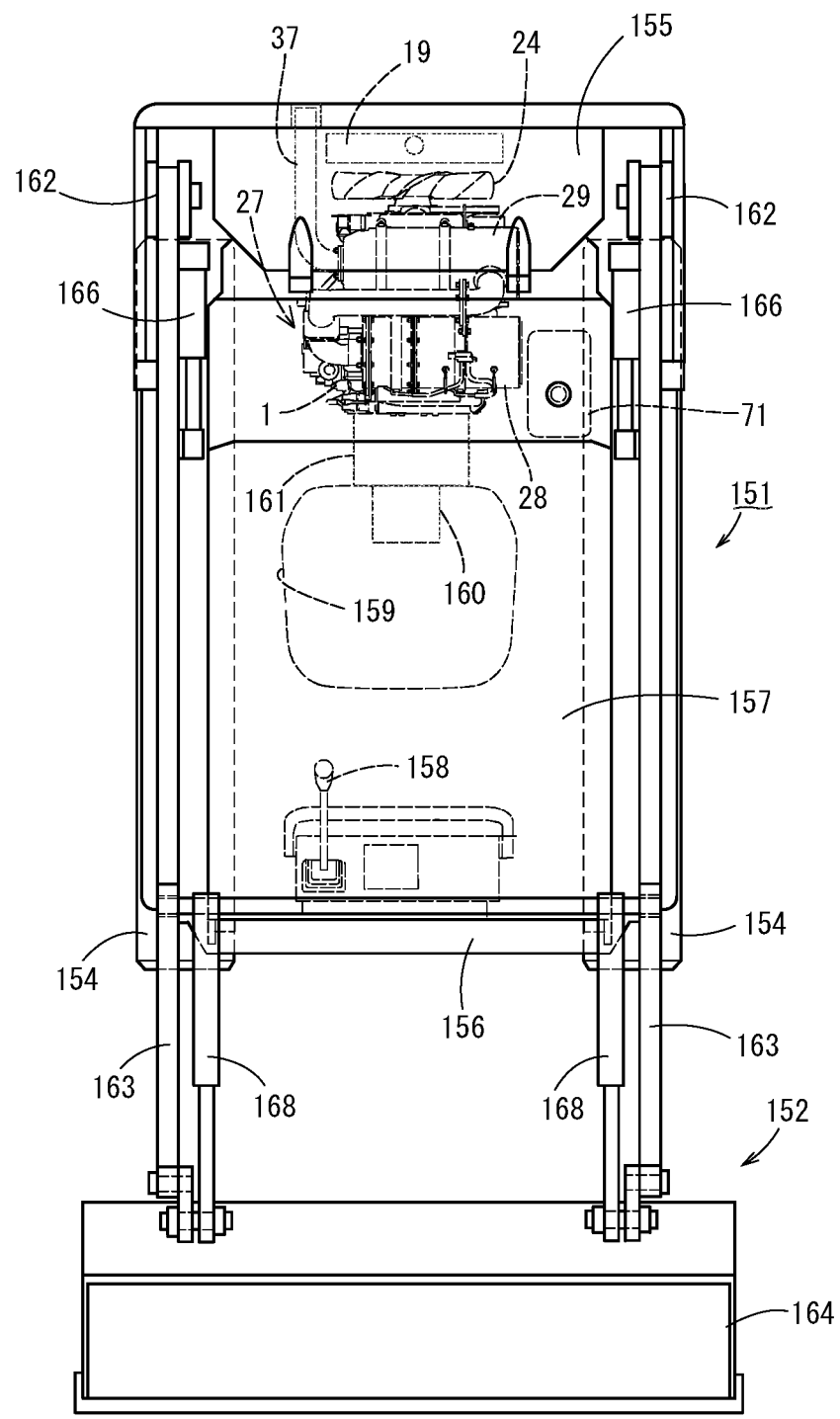
FIG. 21 is a plan view of the work vehicle.

Next, a skid-steer loader 151 in which the diesel engine 1 is mounted will be described referring to FIGS. 20 and 21. The skid-steer loader 151 as the work vehicle illustrated in FIGS. 20 and 21 is configured to be equipped with a loader device 152 described later and perform loading work. The skid-steer loader 151 is equipped with right and left travelling crawlers 154. Also, a hood 155 that is openable and closable is arranged above the travelling crawlers 54 of the skid-steer loader 151. The diesel engine 1 is stored in the hood 155. In the interior of the hood 155, the first case 28 and the second case 29 are placed and fixed on the upper surface portion of the diesel engine 1.

The diesel engine 1 is supported by a travelling vehicle body 156 included in the skid-steer loader 151 via a vibration-proof member and the like. A cabin 157 in which an operator gets on is arranged in front of the hood 155, and a maneuvering handle 158, a maneuvering seat 159, and the like are provided in the interior of the cabin 157. Also, a loading work hydraulic pressure pump device 160 that is driven by the diesel engine 1 and a travelling mission device 161 for driving the right and left travelling crawlers 154 are provided. The motive power from the diesel engine 1 is transmitted to the right and left travelling crawlers 154 via the travelling mission device 161. An operator who takes the maneuvering seat 159 can perform the driving operation of the skid-steer loader 151 and the like via an operating portion such as the maneuvering handle 158.

Also, the loader device 152 includes loader posts 162 arranged on both right and left sides of the travelling vehicle body 156, a pair of right and left lift arms 163 coupled with the upper end of each loader post 162 in an oscillatory manner up and down, and buckets 164 coupled with the tip end portions of the right and left lift arms 163 in an oscillatory manner up and down.

A lift cylinder 166 for oscillating the lift arm 163 up and down is provided between the each loader post 162 and the corresponding lift arm 163. A bucket cylinder 168 for oscillating the bucket 164 up and down is provided between the right and left lift arms 163 and the buckets 164. In this case, it is configured such that the operator on the maneuvering seat 159 operates a loader lever (not illustrated), and the hydraulic pressure force of the loading work hydraulic pressure pump device 160 is controlled, and lift cylinders 166 or bucket cylinders 168 operates in a stretchable, contractible manner, and the lift arms 163 or the buckets 164 are oscillated up and down, thereby executing the loading work. It is noted that the urea water tank 71 is internally installed in the upper portion of the front lateral section of the hood 155. Also, the radiator 19 arranged opposite to the cooling fan 24 is internally installed in the rear portion of the hood 155.

Figure 22:
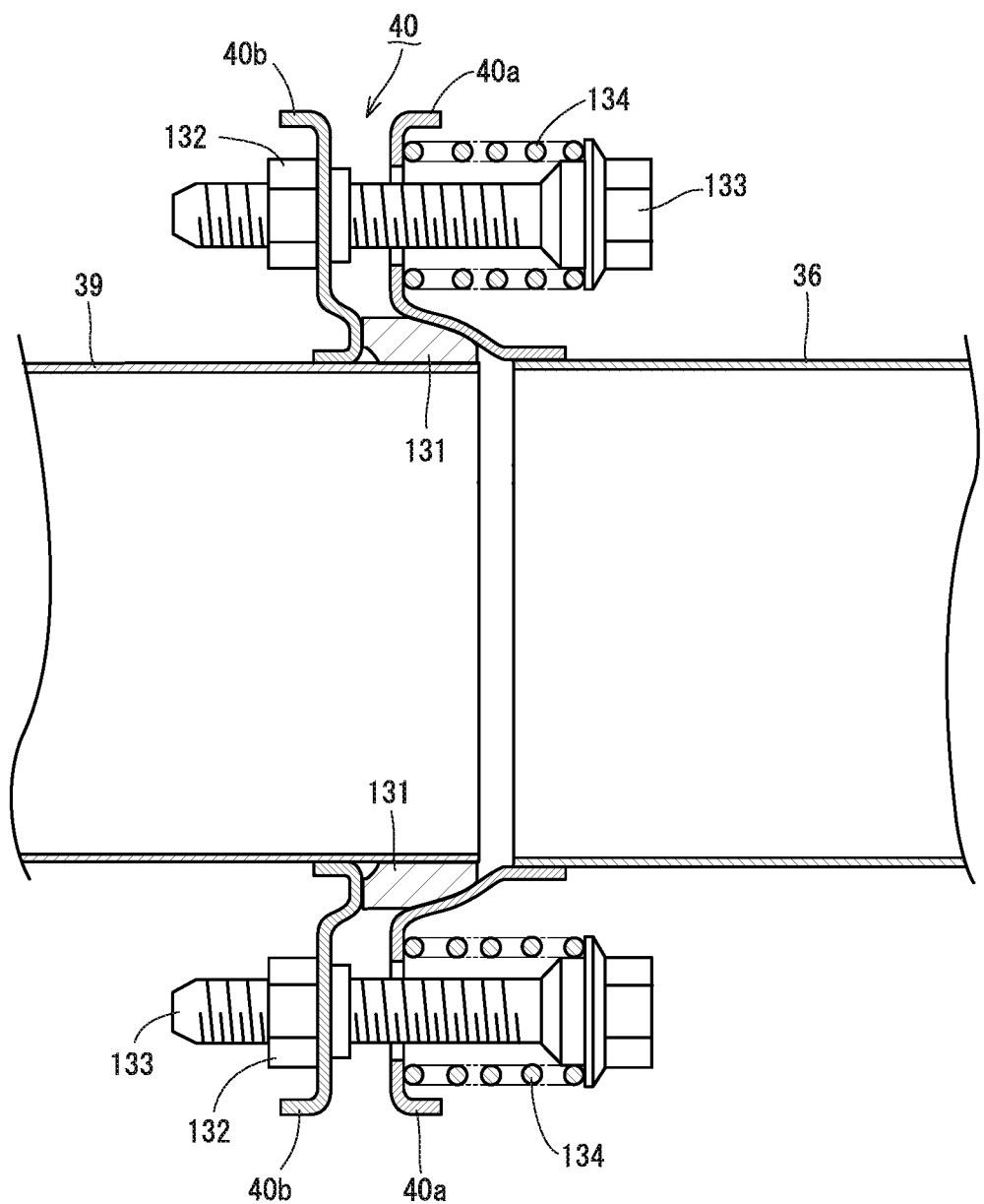
FIG. 22 is a cross-sectional explanatory view of a coupling portion between a second case and a joining pipe.

Next, structure in which the SCR inlet pipe 36 of the second case 29 and the end portion of the urea mixing pipe 39 as the joining pipe are connected with the SCR inlet-side flange body 40 will be described referring to FIGS. 3 to 5, 18, 19, and 22. As illustrated in FIGS. 3 to 5, 18, and 19, the internal diameter side of an inlet pipe joining flange 40*a* formed in a thin-plate, ring shape is welded and fixed on the inlet-side end portion of the SCR inlet pipe 36. As illustrated in FIG. 22, the external diameter side of the inlet pipe joining flange 40*a* protrudes from the mounting portion of the inlet pipe joining flange 40*a* in the exhaust gas inlet direction. Also, illustrated in FIGS. 3 to 5, 18, and 19, a thin-plate-shaped mixing pipe joining flange 40*b* projected on the outer circumferential side (the outer side of a radius) is welded and fixed on the outlet-side end portion of the urea mixing pipe 39 as the joining pipe. As illustrated in FIG. 22, the outlet side of the urea mixing pipe 39 protrudes from the mounting portion of the mixing pipe joining flange 40*b* in the exhaust gas outlet direction.

As illustrated in FIG. 22, a ring-shaped spherical joint body 131 is fitted onto the outer circumferential surface of the urea mixing pipe 39 on the downstream side of the mixing pipe joining flange 40*b*. The inlet pipe joining flange 40*a* and the mixing pipe joining flange 40*b* face each other, and the spherical surface portion of the mixing pipe joining flange 40*b* is abutted to the spherical surface portion of the spherical joint body 131, and a fastening bolt 133 is threadedly engaged with a nut 132 of the mixing pipe joining flange 40b, and an elastic spring 134 is wound on the head portion side of the fastening bolt 133, and the elastic spring 134 is pressed and abutted to the inlet pipe joining flange 40a, and the spherical surface portion of the spherical joint body 131 and the spherical surface portion of the mixing pipe joining flange 40b are pressure-bonded and supported by the force of the elastic spring 134.

With the aforementioned constitution, the inlet pipe joining flange 40a and the mixing pipe joining flange 40b are opposite to each other via the spherical joint body 131, and the SCR inlet pipe 36 and the urea mixing pipe 39 are coupled in a bendable manner in the axial direction. That is, regarding the structure in which the first case 28, the second case 29, and the urea mixing pipe 39 are arranged in parallel, the structure is such that one end portion or both end portions of the urea mixing pipe 39 are coupled with at least any one or both of the outlet side of the first case 28 and the inlet side of the second case 29 in such a manner that a coupling angle can be adjusted, and the urea mixing pipe 39 is detachably coupled on the gas outlet side of the first case 28 via the DPF outlet-side flange body 41 as the pipe joint body, and the inlet side of the second case 29 and the end portion of the urea mixing pipe 39 are coupled, in such a manner that a coupling angle can be adjusted, via the spherical joint connecting body 131 that is bendable in the axial direction of the urea mixing pipe 39.

As illustrated in FIGS. 3 to 5, 28, 19, and 22, regarding the structure in which the urea mixing pipe 39 is coupled with the gas outlet side of the first case 28 in a detachable manner via the DPF outlet-side flange body 41 as the pipe joint body, the inlet side of the second case 29 and the end portion of the urea mixing pipe 39 are coupled, in such a manner that a coupling angle can be adjusted, via the spherical joint body 131 as the spherical joint connecting body that is bendable in the axial direction of the urea mixing pipe 39. Accordingly, the extension direction of the urea mixing pipe 39 can be arbitrarily set by the bending operation of the spherical joint body 131, and the adjustment of measurement errors during the assembly of the first case 28 and the second case 29 can be simplified, and further the gas outlet side of the first case 28 can be partially attached/detached by attaching/detaching the DPF outlet-side flange body 41, and maintenance on the gas outlet side (soot filter 31 and the like) in the interior of the first case 28 can be easily executed only by partially detaching the gas outlet side of the first case 28.

Figure 23:
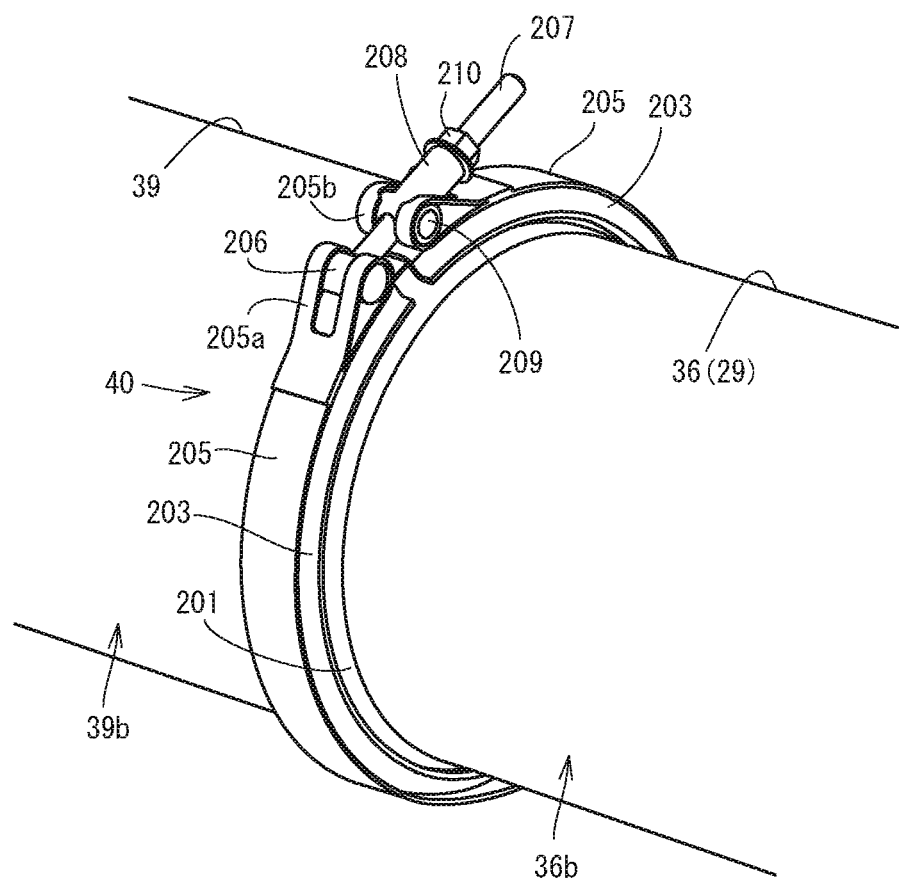
FIG. 23 is a perspective view of a coupling portion between the outlet of the second case and the joining pipe, illustrating the second embodiment.
Figure 24:
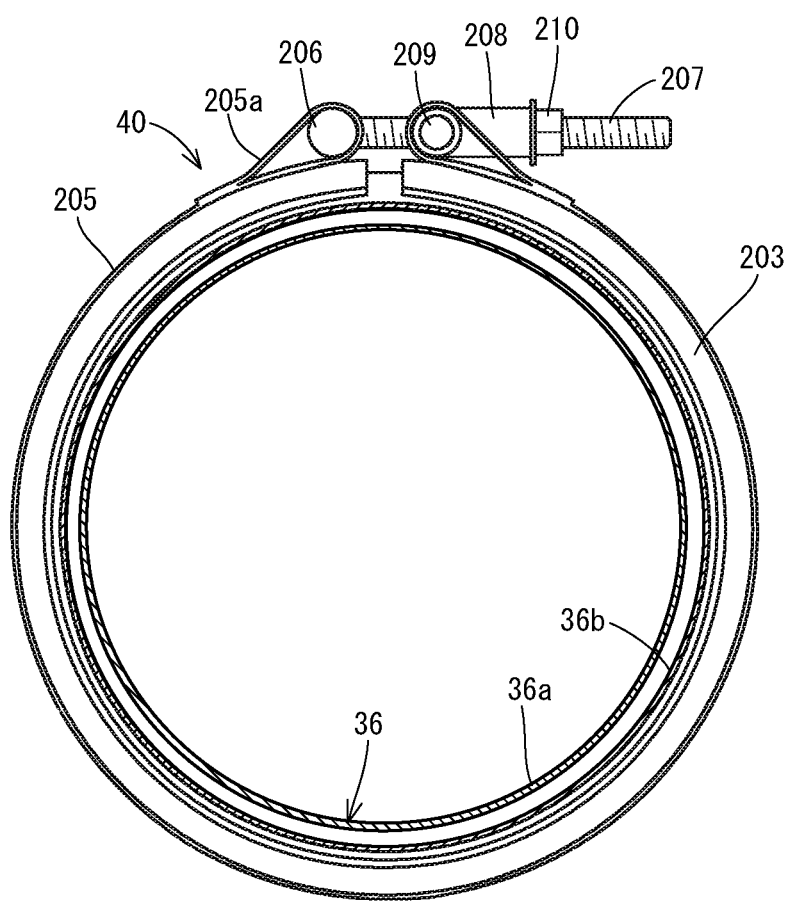
FIG. 24 is a longitudinal cross-sectional explanatory view of the coupling portion between the outlet of the second case and the joining pipe.
Figure 25:
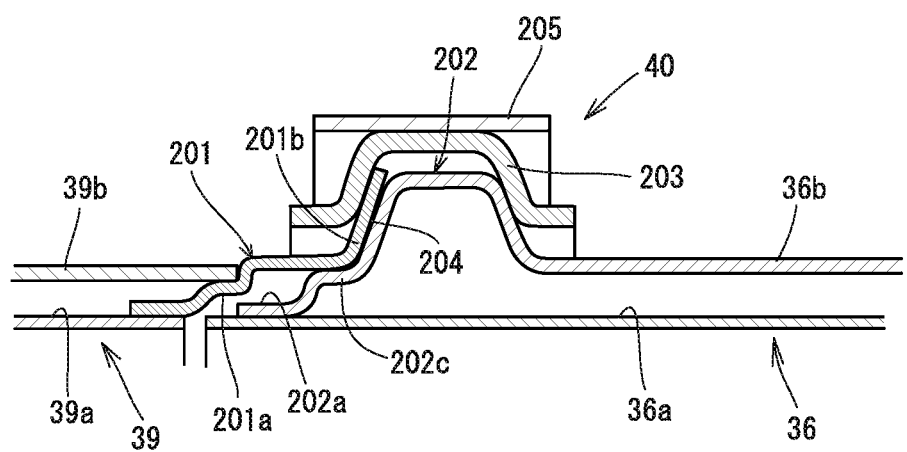
FIG. 25 is a lateral cross-sectional explanatory view of the coupling portion between the outlet of the second case and the joining pipe.
Figure 26:
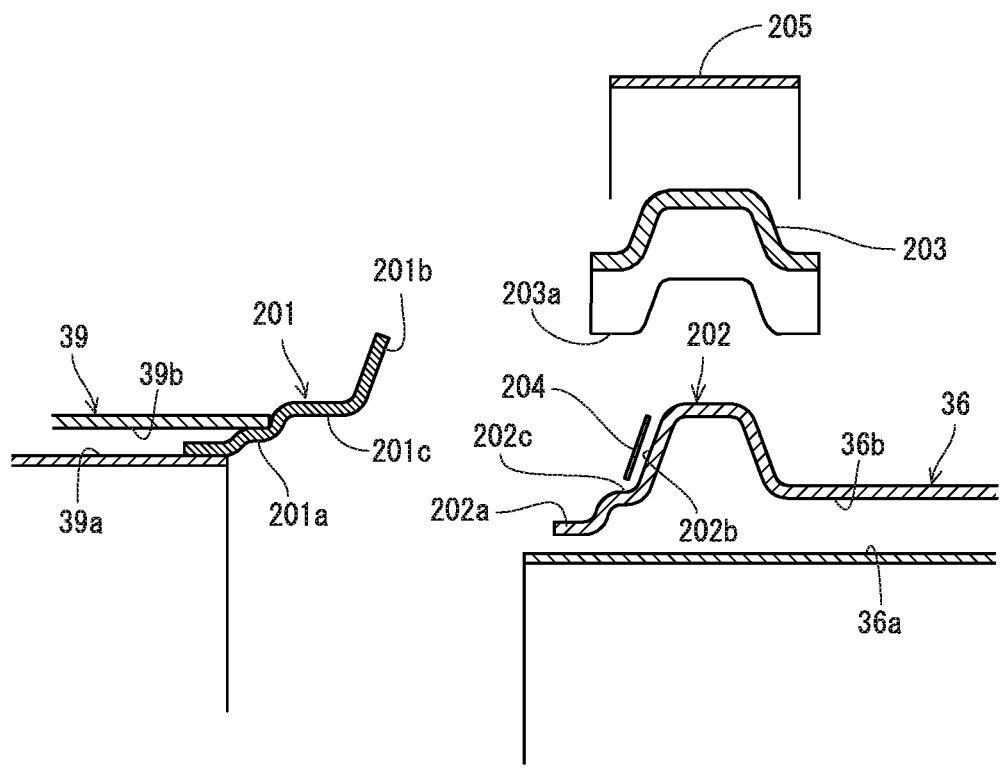
FIG. 26 is an exploded explanatory view of the coupling portion between the outlet of the second case and the joining pipe.

Next, the modified example of structure in which the second case 29 and the urea mixing pipe 39 are coupled with the SCR inlet-side flange body 40 will be described referring to FIGS. 23 to 26 illustrating the second embodiment. As illustrated in FIGS. 24 to 26, the urea mixing pipe 39 includes a mixing inner pipe 39a and a mixing outer pipe 39b, and double pipe structure is formed with the mixing inner pipe 39a and the mixing outer pipe 39b. The SCR inlet pipe 36 includes an inlet inner pipe 36a and an inlet outer pipe 36b, and double pipe structure is formed with the inlet inner pipe 36a and the inlet outer pipe 36b.

As illustrated in FIGS. 25 and 26, a mixing pipe joining flange 201 that is formed in a thin-plate, ring shape, welded, and fixed on the outer circumference of the mixing inner pipe 39a is provided. The cross sectional end surface of the mixing pipe joining flange 201 is formed in an L-shaped, dough-nut shape. The inner circumferential side of the end surface, whose cross section is formed in an L shape, of the mixing pipe joining flange 201 is welded and fixed on the outlet-side end portion of the mixing inner pipe 39a. The outer circumferential side of the end surface, whose cross section is formed in an L shape, of the mixing pipe joining flange 201 protrudes to the outer circumferential side of the mixing outer pipe 39b. An outer side support stepped portion 201a is formed on the bending intermediate portion of the end surface, whose cross section is formed in an L shape, of the mixing pipe joining flange 201. The downstream side end portion of the mixing outer pipe 39b is welded and fixed on the outer side support stepped portion 201a.

On the other hand, as illustrated in FIGS. 22 and 23, a thin-plate, ring shaped inlet pipe joining flange 202, of which the cross-sectional end surface is formed in a trapezoidal shape, is provided on the inlet side of the inlet outer pipe 36b. The inlet pipe joining flange 202 is integrally formed on the end portion of the inlet outer pipe 36b by means of press work. Also, the diameter of an upstream side trapezoidal lateral end portion 202a (the gas intake lateral end portion of the inlet pipe joining flange 202) on the side opposite to the downstream side trapezoidal end portion of the inlet pipe joining flange 202 continuously disposed on the inlet outer pipe 36b is contracted by the press work, thereby forming a small diameter, and the upstream side trapezoidal lateral end portion 202a is welded and fixed on a midway portion in the transfer direction of the exhaust gas on the outer circumferential surface of the inlet side of the inlet inner pipe 36a. That is, it is configured such that the inlet-side end portion of the inlet inner pipe 36a protrudes from the upstream side trapezoidal lateral end portion 202a in the outlet direction of the urea mixing pipe 39, and the inlet-side end portion of the inlet inner pipe 36a is inserted into downstream-side end portion of the mixing outer pipe 39b.

Furthermore, as illustrated in FIGS. 25 and 26, an outer circumferential side end portion 201b, of which the cross-sectional end surface is formed in an L shape, of the mixing pipe joining flange 201 is inclined in a tapered shape and formed in a shape along an upstream side inclined surface 202b on one trapezoidal side of the inlet pipe joining flange 202. Also, a joining support stepped portion 202c is formed on the lower end side of the inclination of the upstream side inclined surface 202b of the inlet pipe joining flange 202. It is configured such that the outer circumferential side end portion 201b of the mixing pipe joining flange 201 is abutted to the upstream side inclined surface 202b of the inlet pipe joining flange 202, and the mixing pipe joining flange 201 is combined with the inlet pipe joining flange 202 under the guidance of a flat inner circumferential surface 201c in the middle of the L-shaped cross-section of the mixing pipe joining flange 201 and the joining support stepped portion 202c.

As illustrated in FIGS. 23 to 26, a clamping body 203 for fitting the mixing pipe joining flange 201 onto the inlet pipe joining flange 202 is provided. The cross-sectional end portion, which is formed in a thin-plate, C ring shape and includes an expanding slot 203a, forms the clamping body 203 into a trapezoidal shape (see FIG. 26). It is configured such that the outer circumferential side end portion 201b of the mixing pipe joining flange 201 is abutted to the upstream side inclined surface 202b of the inlet pipe joining flange 202 via a joining packing 204, and the clamping body 203 is engaged with the outer circumferential side of respective flanges 201 and 202, thereby joining the flanges 201 and 202 to each other (see FIG. 25).

As illustrated in FIGS. 20 and 21, a tightening band body 205 for fastening the clamping body 203 engaged with the outer circumferential side of respective flanges 201 and 202 is provided. The base end side of a fastening bolt 207 is locked on a one-end-side bending portion 205a of the tightening band body 205 via a coupling shaft body 206. A holding cylindrical body 208 through which the tip end side of the fastening bolt 207 penetrates is provided. The one end portion of the holding cylindrical body 208 is locked with an other-end-side bending portion 205b of the tightening band body 205 via a coupling shaft body 209. It is configured such that a fastening nut 210 is threadedly engaged with the tip end side of the fastening bolt 207 through which the holding cylindrical body 208 penetrates, and the tightening band body 205 is held under tension by means of the fastening bolt 207 and the fastening nut 210.

As illustrated in FIGS. 23 to 26, the mixing pipe joining flange 201 and the inlet pipe joining flange 202 are respectively formed on the gas discharge side of the urea mixing pipe 39 and on the gas intake side of the SCR inlet pipe 36. The clamping body 203 is detachably fitted onto respective joining flanges 201 and 202. The clamping body 203 that serves as a V-shaped belt clamp is detachably fastened with the tightening band body 205. It is noted that the cylindrical length of the downstream side end portion of the mixing inner pipe 39a in the transfer direction of the exhaust gas is formed short, compared with the cylindrical length of the downstream side end portion of the mixing outer pipe 39b in the transfer direction of the exhaust gas. The upstream side end portion of the inlet inner pipe 36a protrudes from the upstream side end portion of the inlet outer pipe 36b (the joining flange 202). That is, the upstream side end portion of the inlet inner pipe 36a is inserted into the downstream side end portion of the mixing outer pipe 39b.

As illustrated in FIGS. 3 to 5, 28, 19, 22, and 23 to 26, regarding the engine device that includes the first case 28 that removes the particulate matter in the exhaust gas of the diesel engine 1 and the second case 29 that removes the nitride oxides in the exhaust gas of the diesel engine 1 and that connects the first case 28 to the second case 29 via the urea mixing pipe 39 as the joining pipe, the structure is such that the first case 28, the second case 29, and the urea mixing pipe 39 are arranged in parallel, and one end portion or both end portions of the urea mixing pipe 39 are coupled with at least any one or both of the outlet side of the first case 28 and the inlet side of the second case 29 in such a manner that a coupling angle can be adjusted. Accordingly, in the assembly work of the first case 28 and the second case 29, the parallelism of the first case 28 or the second case 29 with respect to the urea mixing pipe 39 or discrepancy in the direction intersected with the axial line of the urea mixing pipe 39 can be easily adjusted. The adjustment work of measurement errors during the assembly of the first case 28, the second case 29, or the urea mixing pipe 39 is simplified, thereby improving the assembly workability of the first case 28 and the second case 29.

As illustrated in FIGS. 23 to 26, regarding the structure in which the urea mixing pipe 39 is detachably coupled on the gas outlet side of the first case 28 via the DPF outlet-side flange body 41, the inlet side of the second case 29 and the end portion of the urea mixing pipe 39 are coupled, in such a manner that a coupling angle can be adjusted, via the clamping body 203 as a V-band clamp joint body that is bendable in the axial direction of the urea mixing pipe 39, so that the extension direction of the urea mixing pipe 39 can be arbitrarily set by the bending operation of the clamping body 203, and the adjustment of measurement errors during the assembly of the first case 28 and the second case 29 can be simplified, and further the gas outlet side of the first case 28 can be partially attached/detached by attaching/detaching the DPF outlet-side flange body 41, and maintenance on the gas outlet side (soot filter 31 and the like) in the interior of the first case 28 can be easily executed only by partially detaching the gas outlet side of the first case 28.

Figure 30:
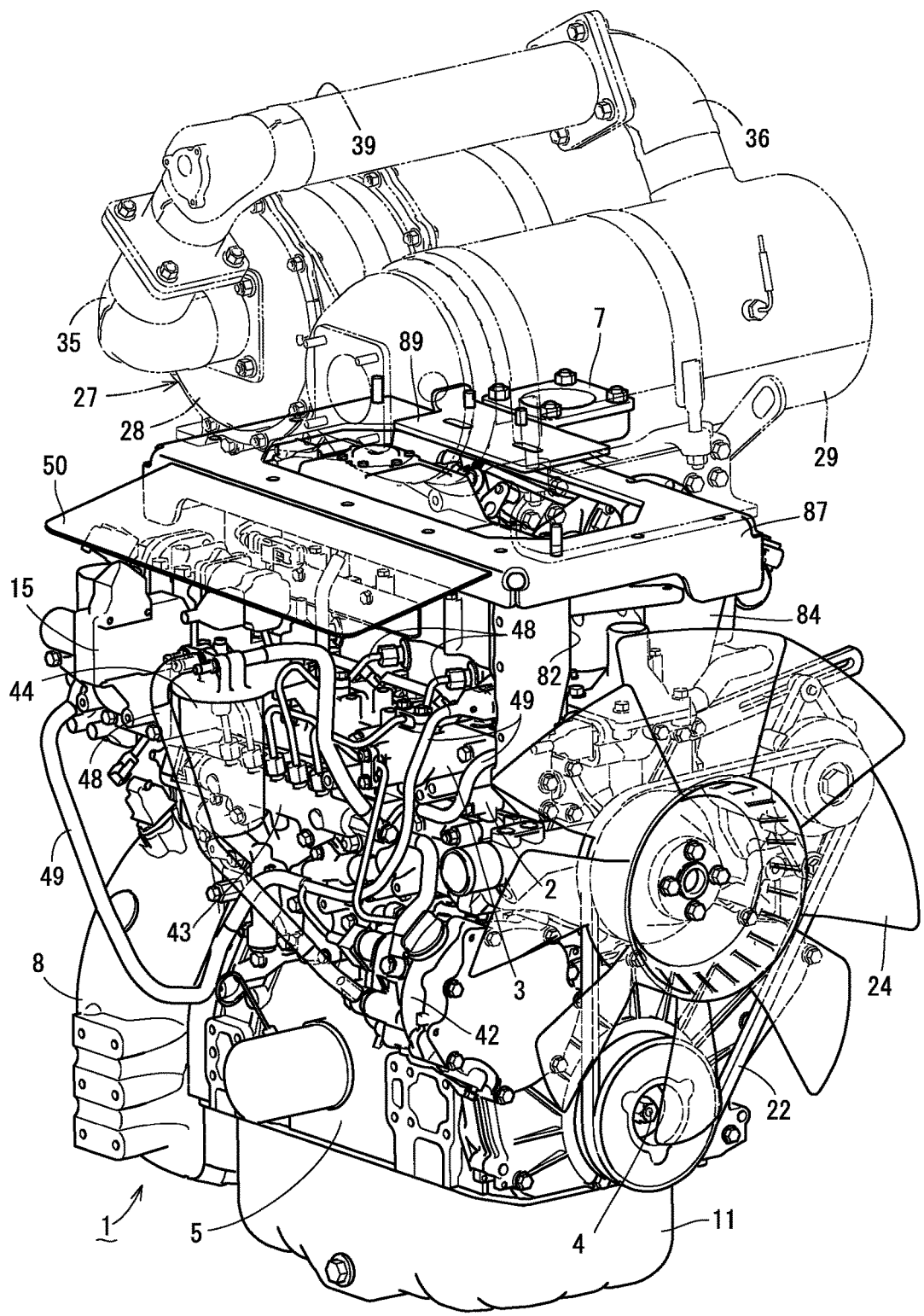
FIG. 30 is an explanatory view of the diesel engine viewed from the upper surface thereof.
Figure 31:
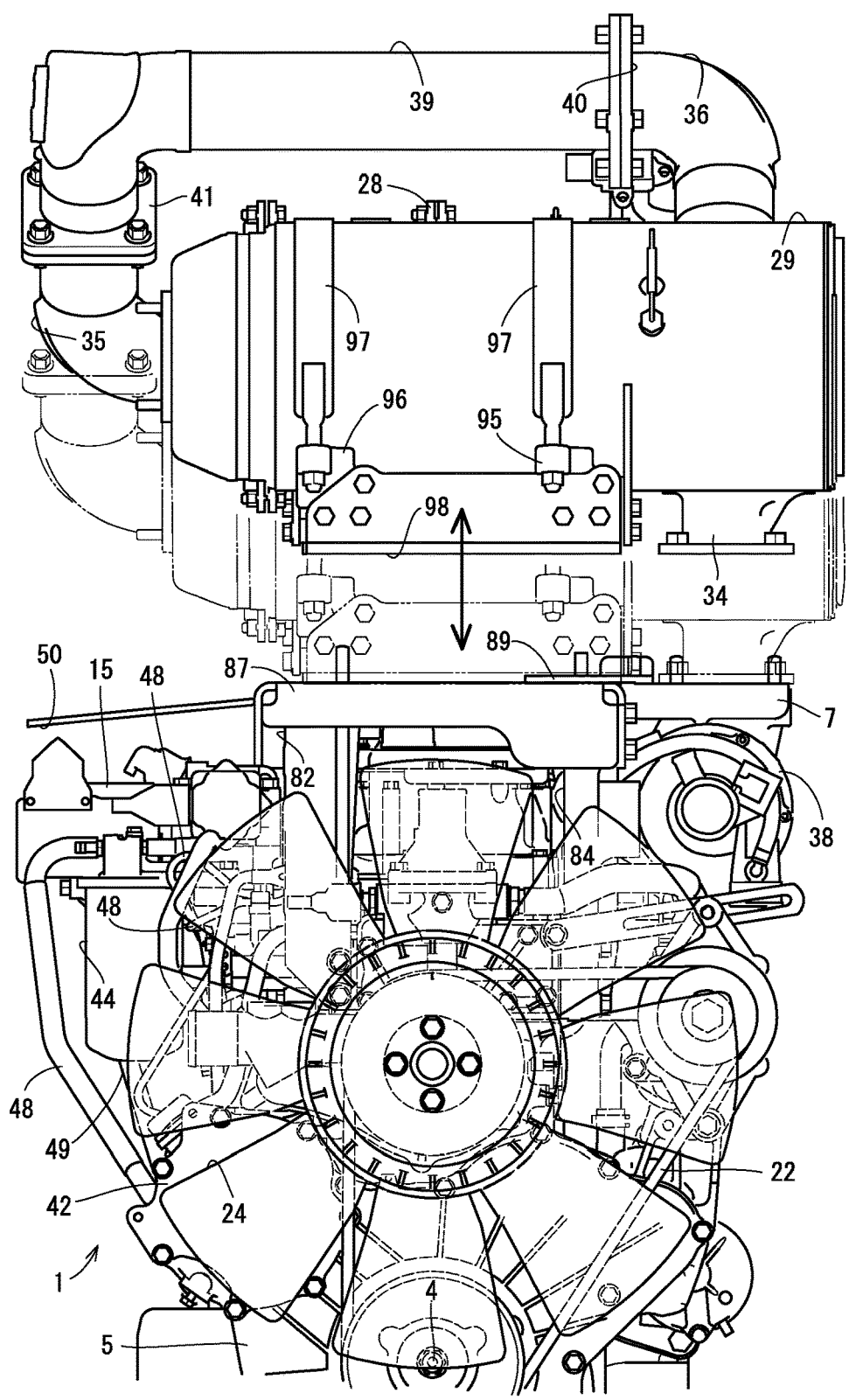
FIG. 31 is a front explanatory view of the diesel engine.

Next, the third embodiment representing protective structure on the upper surface side of the diesel engine 1 will be described referring to FIGS. 27 to 31. As illustrated in FIGS. 30 and 31, it is configured such that the supporting stand 87 as an upper surface cover body is adhered to the upper portion of the diesel engine 1 via the front portion supporting leg body 82, the lateral portion supporting leg body 84, and the rear portion supporting leg body 86, and the upper portion of the diesel engine 1 is covered with the supporting stand 87. In contrast, the first case 28, the second case 29, and the urea mixing pipe 39 are adhered in parallel to the transfer direction of the exhaust gas with the left case fixing body 95, the right case fixing body 96, and the supporting frame bodies 98 as unit frame bodies, thereby forming the exhaust gas purification device 27 as the exhaust purification unit. That is, the exhaust gas purification device 27 such as the first case 28 or the second case 29 is detachably placed on the upper surface side of the supporting stand 87.

Figure 27:
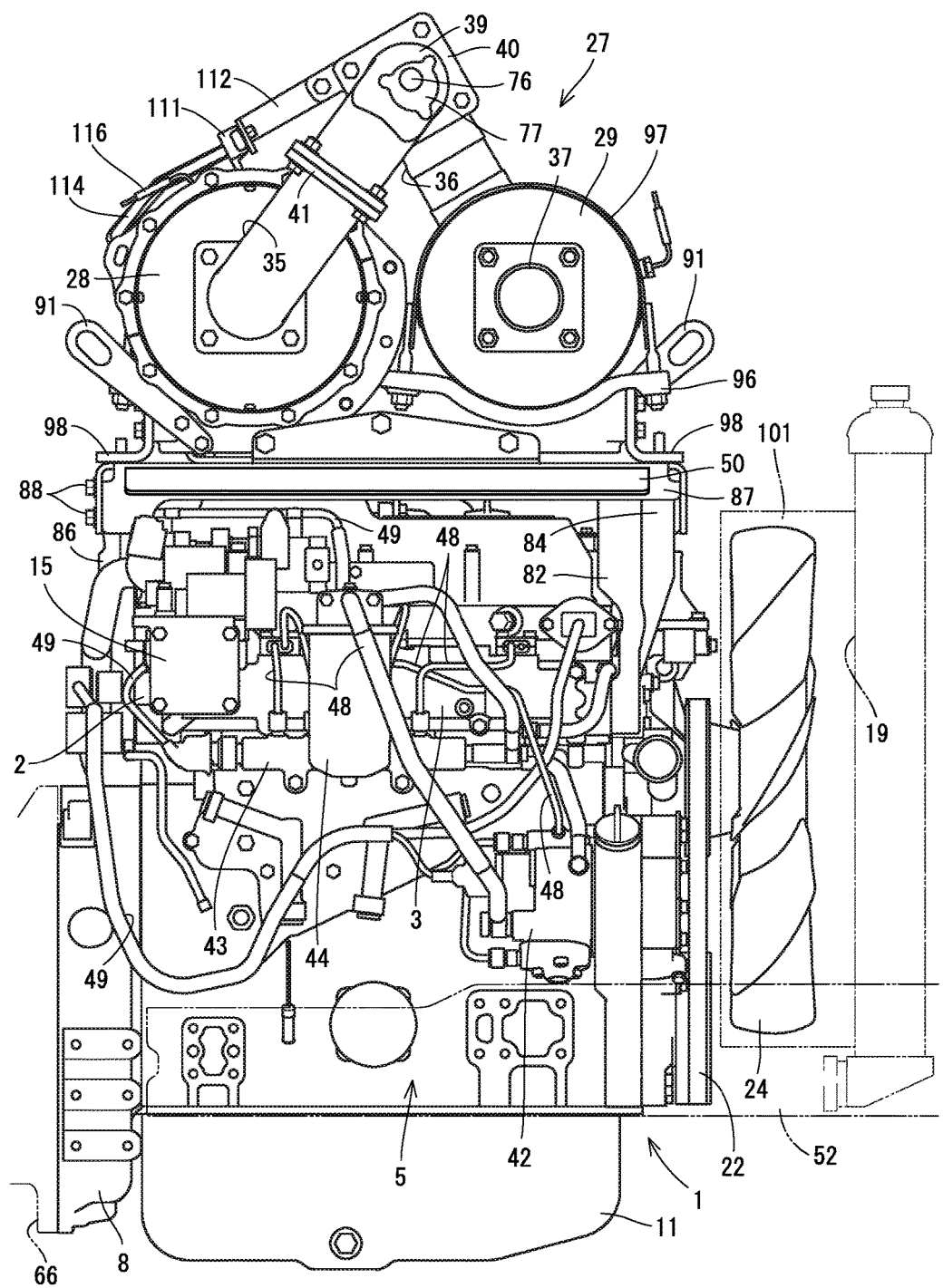
FIG. 27 is a right side view of the diesel engine illustrating the third embodiment.
Figure 28:
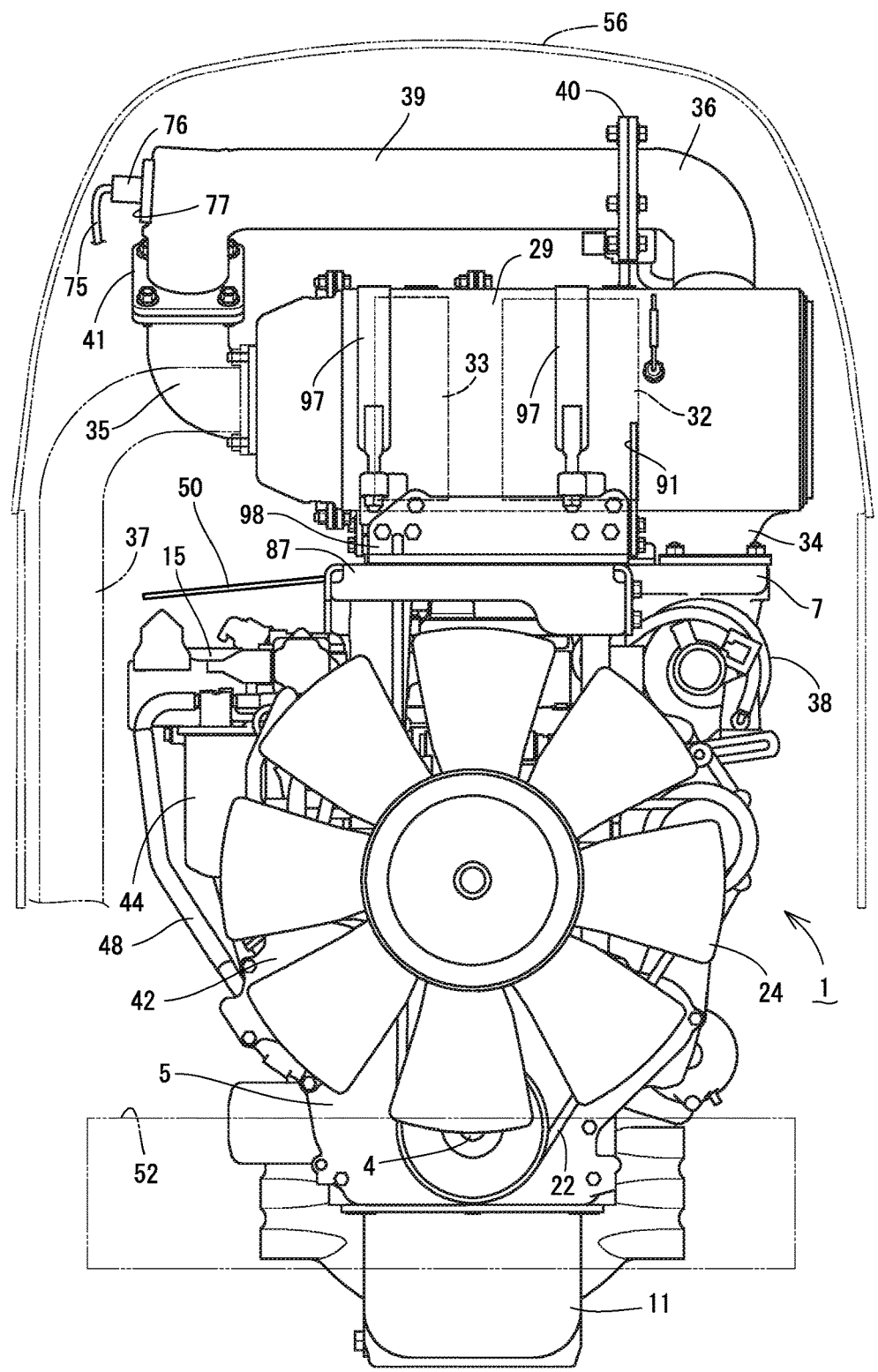
FIG. 28 is a front view of the diesel engine.
Figure 29:
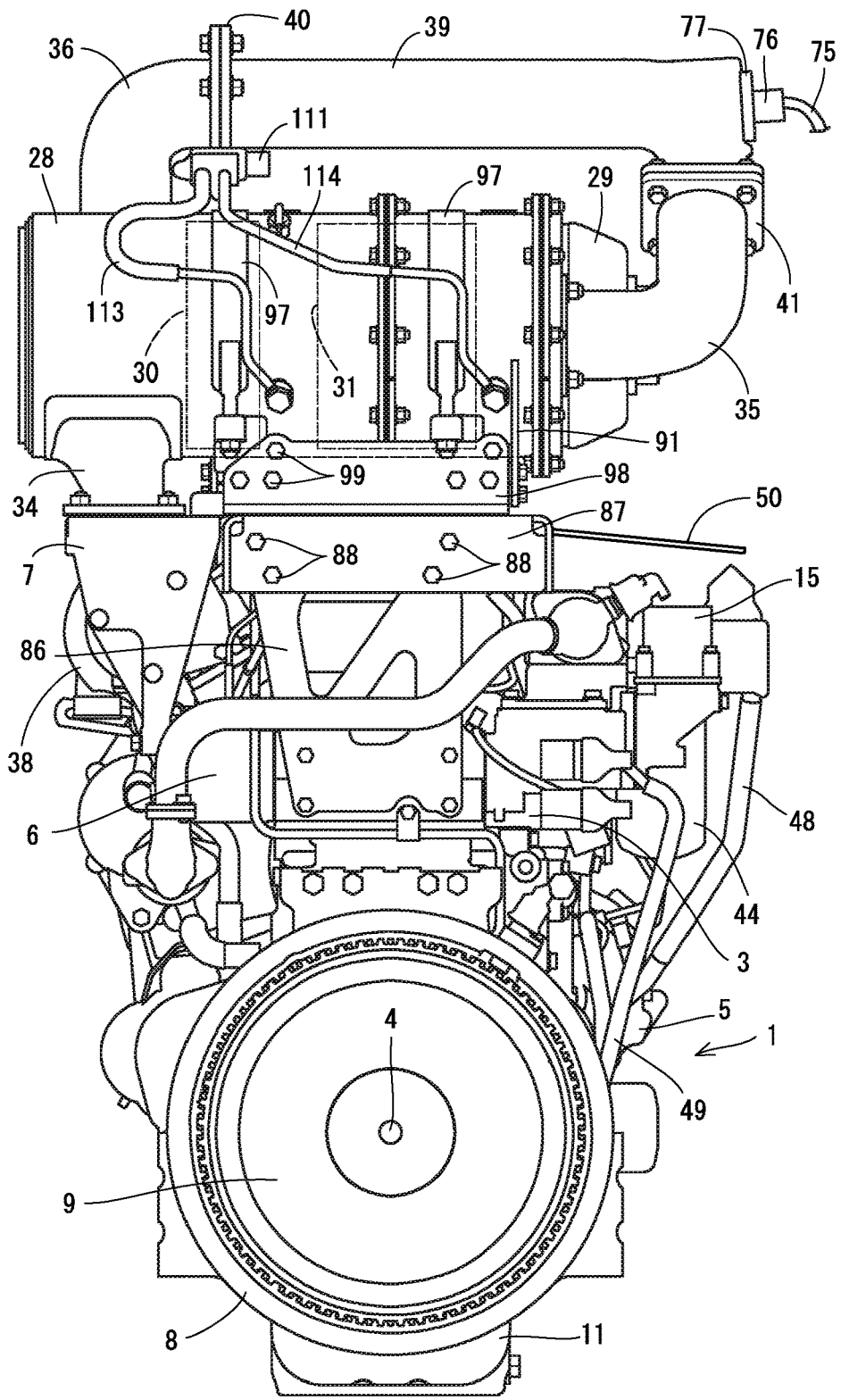
FIG. 29 is a rear view of the diesel engine.

Furthermore, as illustrated in FIGS. 27 and 30, the exhaust gas recirculation device 15, the fuel pump 42, the common rail 43, and the fuel filter 44 as the accessory components are arranged on the right-side surface portion of the diesel engine 1, and accordingly a plurality of fuel pipes 48 or engine control harnesses 49 are arranged on the right-side surface portion of the diesel engine 1, on which the common rail 43 and the like are arranged. In addition, as illustrated in FIGS. 27 to 31, it is configured such that a tabular pipe protective cover body 50 for coupling one end side with the right side surface of the supporting stand 87 is provided, and the other end side of the pipe protective cover body 50 is projectingly installed to the right outside of the diesel engine 1, on which the fuel pipes 48 or the engine control harnesses 49 are arranged, and the upper surface side of the fuel pipes 48 or the engine control harnesses 49, which is extended on the right side surface of the diesel engine 1, is covered with the pipe protective cover body 50.

As illustrated in FIGS. 27 to 31, regarding the structure in which the common rail 43 for supplying fuel to the diesel engine 1 is provided, and the fuel pipes 48 or the engine control harnesses 49 are extended on one side of the diesel engine 1, on which the common rail 43 is arranged, and the pipe protective cover body 50 for coupling one side of the supporting stand 87 is provided, and the pipe protective cover body 50 is projectingly installed and directed upward on one side of the diesel engine 1, on which the fuel pipes 48 or the engine control harnesses 49 are arranged. Accordingly, during the assembly or disassembly work of the first case 28 or the second case 29, the fuel pipes 48 or the engine control harnesses 49 on one side of the diesel engine 1 can be protected with the pipe protective cover body 50, and maintenance (cleaning of soot filter 31) workability and the like in the interior of the first case 28 can be improved.

As illustrated in FIGS. 18 and 19, the first case 28 is formed in such a manner as to be divided into the exhaust intake side case 121 and the exhaust discharge side case 122, and the exhaust discharge side case 122 is configured to be separable in a state where the exhaust intake side case 121 is supported on the side of the diesel engine 1. Accordingly, during the maintenance work in the interior of the first case 28, it is not required to remove the whole of the first case 28, and the number of detachable components that are necessitated for the maintenance work in the interior of the exhaust discharge side case 122 (the first case) can be easily reduced, and the soot filter 31 internally installed in the exhaust discharge side case 122 and the like can be easily detached, and the cleaning man-hour of the interior of the exhaust discharge side case 122 or the soot filter 31, or the like can be reduced.

Figure 32:
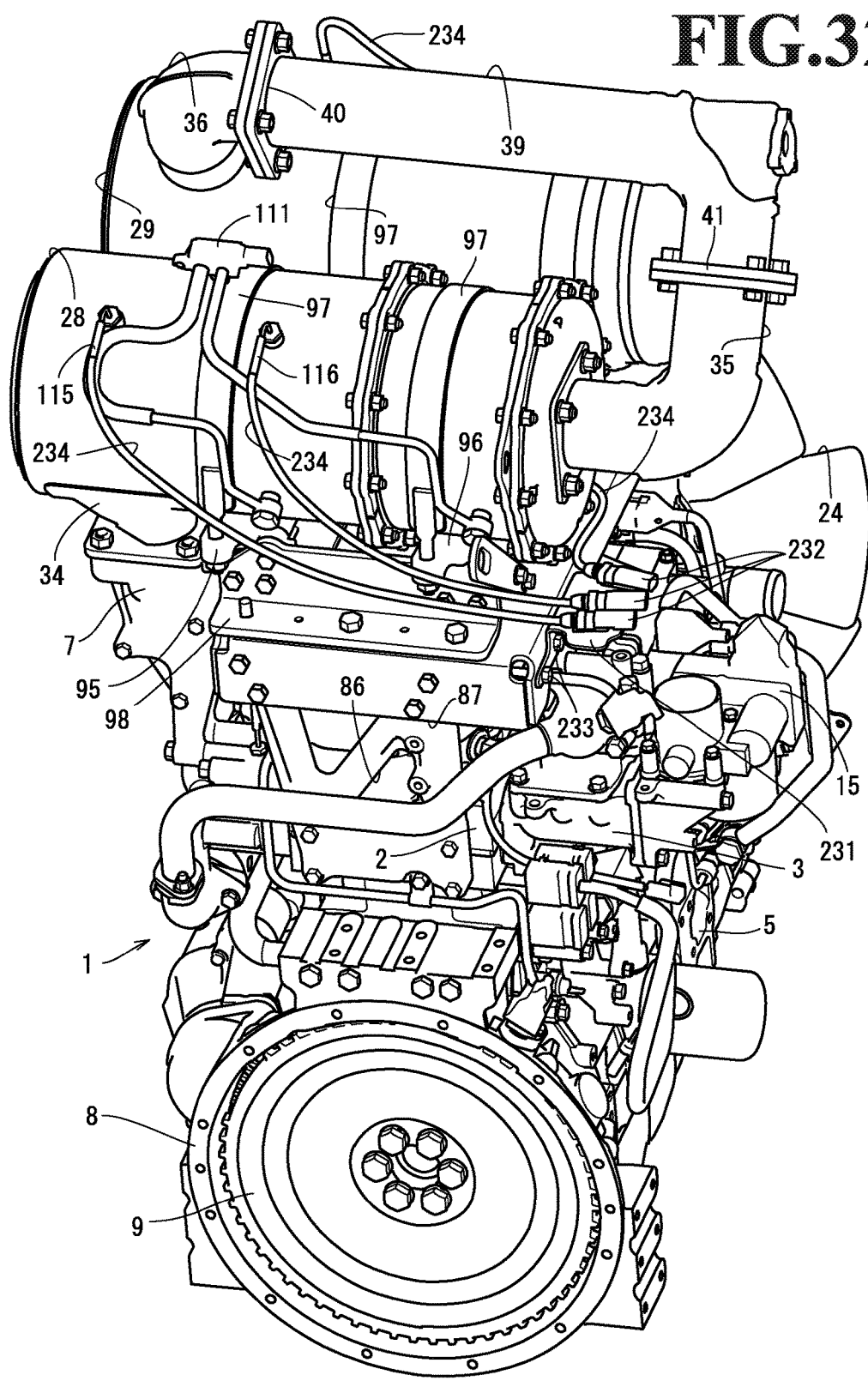
FIG. 32 is a perspective rear view of the mounting portion of a harness connector (harness) illustrating the fourth embodiment.
Figure 33:
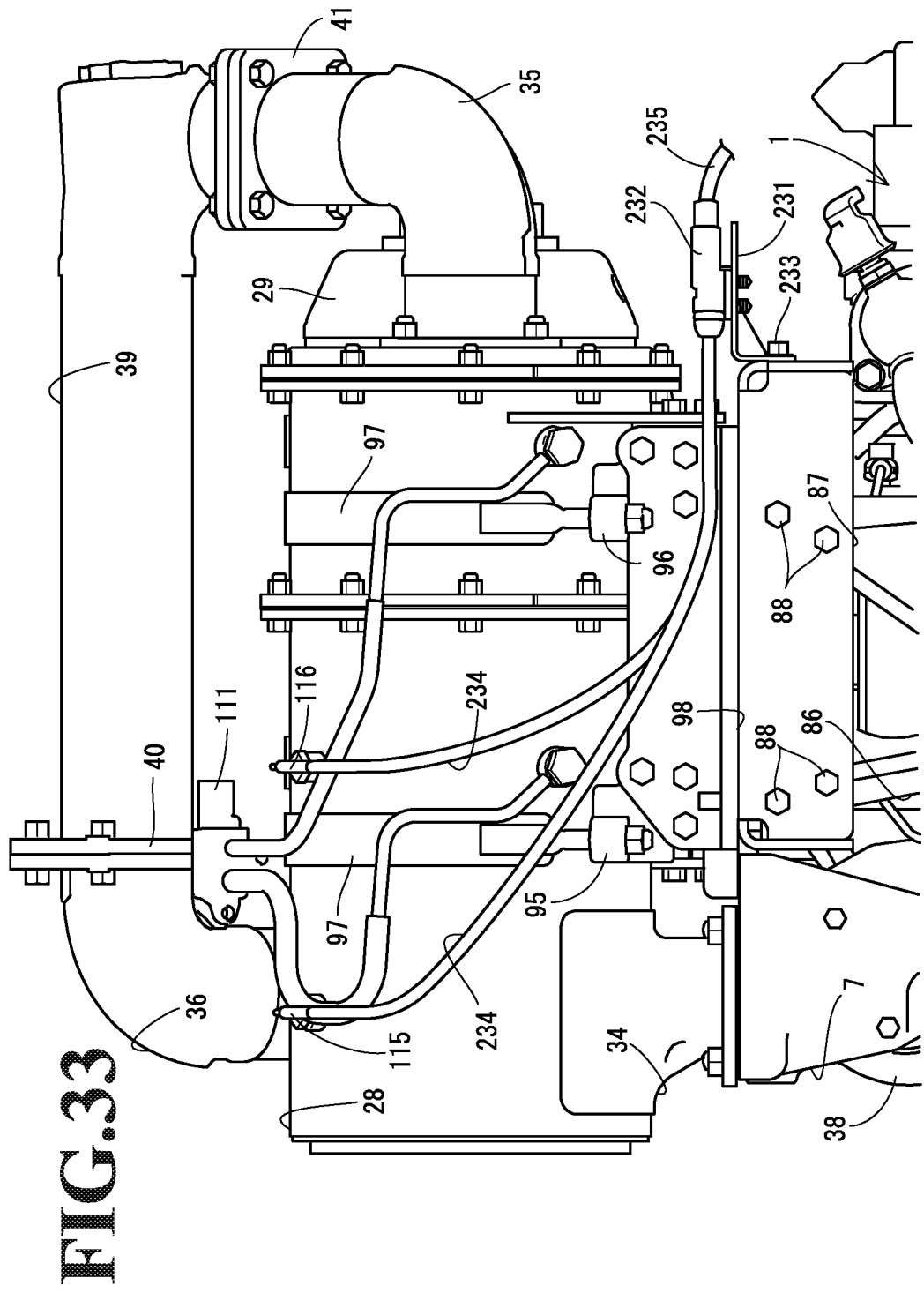
FIG. 33 is an enlarged rear view of the mounting portion of a connector bracket body.

Next, the fourth embodiment illustrating the harness mounting structure, in which each sensor portion of the first case 28 or the second case 29 is connected, will be described referring to FIGS. 32 and 33. As illustrated in FIGS. 32 and 33, a single connector bracket body 231 is provided on the supporting stand 87 on which the first case 28 or the second case 29 is arranged. A Γ-shaped vertical portion, out of the Γ-shaped connector bracket body 231, is fastened with bolt 233 to the right-side wall surface of the supporting stand 87. In contrast, the Γ-shaped horizontal portion, out of the Γ-shaped connector bracket body 231, protrudes from the right-side wall surface of the supporting stand 87 in the lateral direction on the outside of the device. A plurality of harness connectors 232 are detachably adhered on the upper surface of the Γ-shaped horizontal portion of the connector bracket body 231.

As illustrated in FIGS. 32 and 33, the harness connector 232 connected to the upstream-side gas temperature sensor 115, the harness connector 232 connected to the downstream-side gas temperature sensor 116, and the harness connector 232 connected to an SCR gas temperature sensor 117 are arranged on the connector bracket body 231. That is, the exhaust gas temperature sensors (the upstream-side gas temperature sensor 115, the downstream-side gas temperature sensor 116, and the SCR gas temperature sensor 117) provided on the first case 28 or the second case 29, or the plurality of harness connectors 232 connected to the exhaust gas pressure sensor and the like are collectively arranged on the connector bracket body 231.

Additionally, each harness connector 232 is electrically connected to the temperature sensors 115, 116, and 117 via each sensor harness 234, and an engine controller (not illustrated) is connected to each harness connector 232 via an external harness 235, and the supporting stand is mounted on the engine via the plurality of supporting leg bodies, and the connector bracket body is adhered to the lateral surface of the outside of the device of the supporting stand.

As illustrated in FIGS. 1 to 4, 32, and 33, regarding the engine device that includes the first case 28 that removes the particulate matter in the exhaust gas of the diesel engine 1 and the second case 29 that removes the nitride oxides in the exhaust gas of the diesel engine 1 and that connects the first case 28 to the second case 29 via the urea mixing pipe 39, the single connector bracket body 231 is provided on the supporting stand 87 on which the first case 28 or the second case 29 is arranged, and the exhaust gas temperature sensors (the upstream-side gas temperature sensor 115, the downstream-side gas temperature sensor 116, and the SCR gas temperature sensor 117) provided on the first case 28 or the second case 29, or the plurality of harness connectors 232 connected to the exhaust gas pressure sensor and the like are collectively arranged on the connector bracket body 231. Accordingly, the plurality of harness connectors 232 can be supported in one place en masse at a position where high temperature portions such as the diesel engine 1, the first case 28, and the second case 29 do not contact the sensor harnesses 234. The joining or detaching works of the sensor harnesses 234 during the assembly or maintenance can be simplified.

As illustrated in FIGS. 1 to 4, 32, and 33, the supporting stand 87 is mounted on the diesel engine 1 via the plurality of supporting leg bodies (the front portion supporting leg body 82, the lateral portion supporting leg body 84, and the rear portion supporting leg body 86), and the connector bracket body 231 is adhered to the lateral surface of the outside of the device of the supporting stand 87. Accordingly, the connector bracket body 231 protrudes from the supporting stand 87 to the lateral direction on the outside of the device, so that the connector bracket body 231 can be supported, and an increase in temperature of the connector bracket body 231 can be easily suppressed by use of the cooling air of the diesel engine 1. The harness connectors 232 can be easily prevented from being abnormally heated by heat transmitted from the high temperature portions such as the diesel engine 1, the first case 28, and the second case 29 to the connector bracket body 231, and the durability of the harness connectors 232 or the sensor harnesses 234 can be improved.

As illustrated in FIGS. 1 to 4, 32, and 33, regarding the structure in which the supporting stand 87 is mounted on the upper surface side of the diesel engine 1 via the plurality of supporting leg bodies (the front portion supporting leg body 82, the lateral portion supporting leg body 84, and the rear portion supporting leg body 86), the first case 28, the second case 29, and the urea mixing pipe 39 are adhered in parallel to the supporting frame bodies 98, thereby forming the exhaust gas purification device 27 as the exhaust purification unit, and the exhaust gas purification device 27 (the supporting frame bodies 98) is detachably adhered on the upper surface side of the supporting stand 87. Accordingly, the exhaust gas purification device 27 can be supported in a stable posture on the diesel engine 1, and an air duct for thermal insulation is formed between the diesel engine 1 and the exhaust gas purification device 27 (the supporting stand 87), thereby suppressing an increase in temperature of the supporting stand 87 or the harness connector 232, and the sensor harnesses 234 can be easily prevented from contacting the high temperature portions such as the diesel engine 1, the first case 28, and the second case 29.

Figure 34:
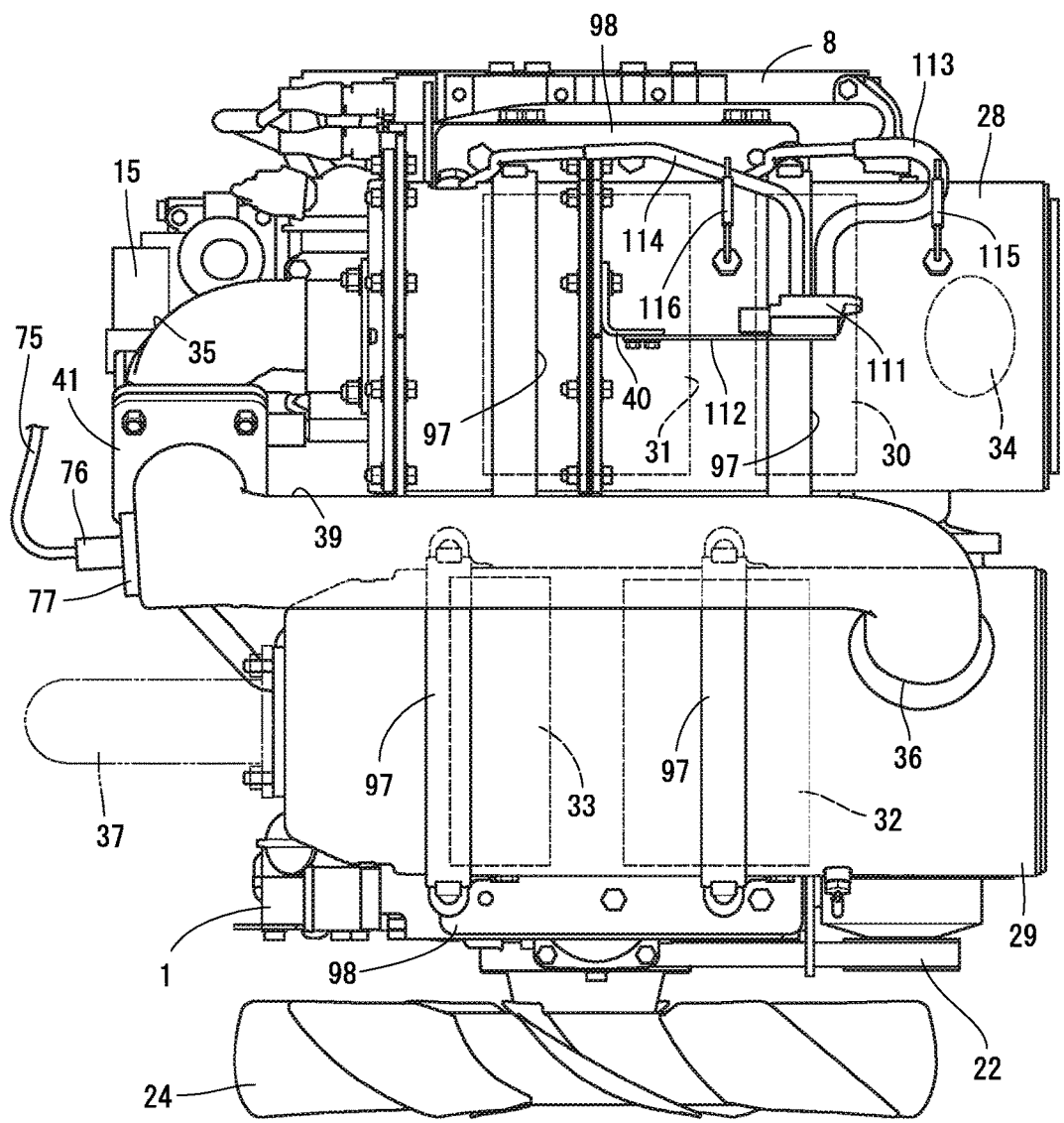
FIG. 34 is a plan view of the diesel engine illustrating the fifth embodiment.

Next, the fifth embodiment representing the coupling structure of the first case 28, the second case 29, and the urea mixing pipe 39 as the joint pipe will be described referring to FIGS. 34 to 36. As illustrated in FIG. 34, it is configured such that the SCR inlet 36 is connected to the DPF outlet pipe 35 via the urea mixing pipe 39 as the joining pipe that couples the first case 28 with the second case 29, and the exhaust gas of the first case 28 is introduced into the second case 29. Additionally, the DPF outlet pipe 35 and the urea mixing pipe 39 are detachably connected by fastening with bolts on the DPF outlet-side flange body 41. It is noted that one end side of the urea mixing pipe 39 is integrally connected to the SCR inlet 36 by welding work.

Figure 35:
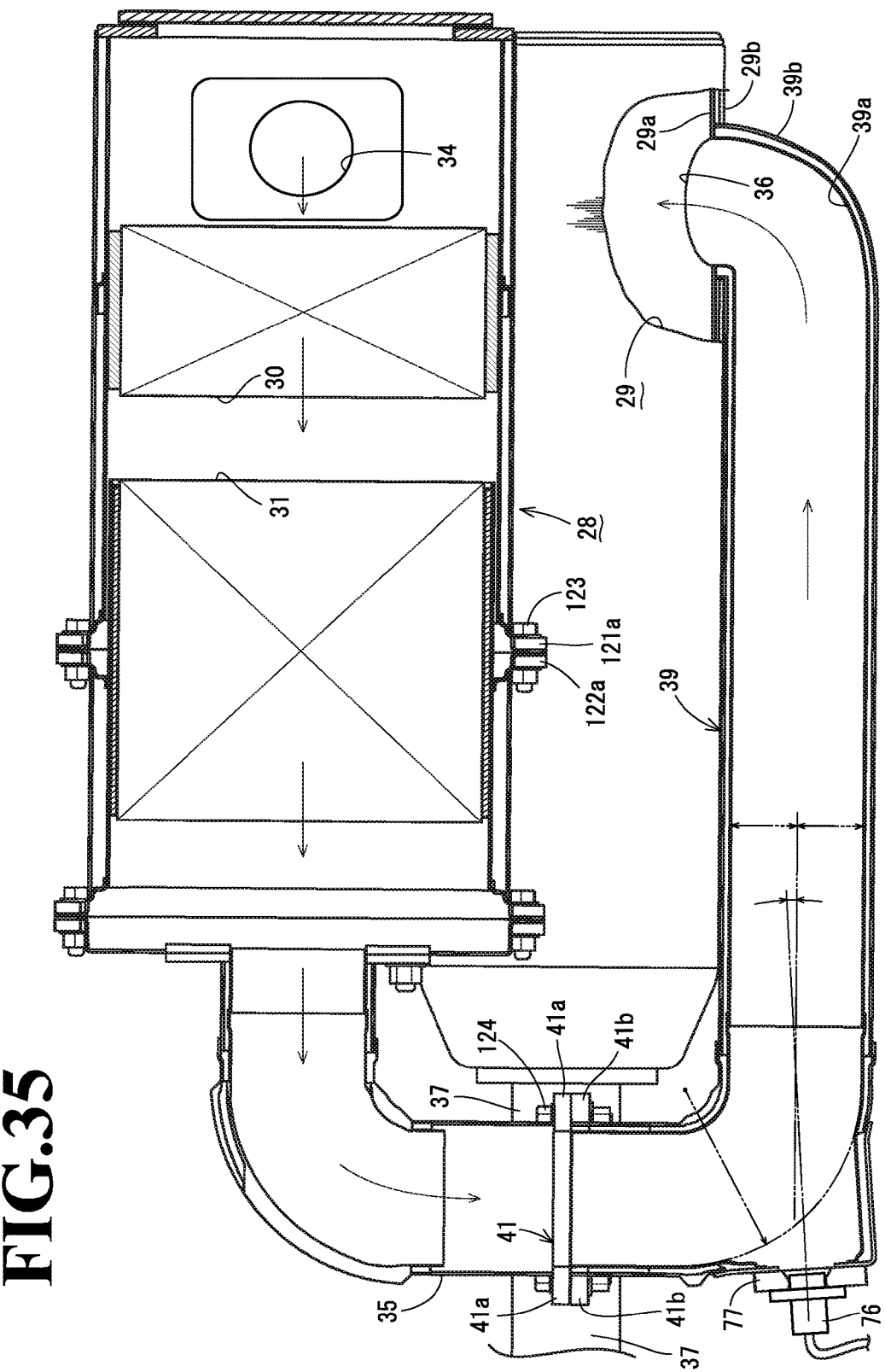
FIG. 35 is a cross-sectional view of the first case, the second case, and a urea mixing pipe.

As illustrated in FIGS. 35 and 36, the second case 29 has cylindrical double pipe structure, which is formed with an inner side case 29a and an outer side case 29b. Also, the urea mixing pipe 39 has cylindrical double pipe structure, which is formed with the mixing inner pipe 39a and the mixing outer pipe 39b. Then, one end portion of the mixing inner pipe 39a is welded and fixed on the opening edge of the SCR inlet 36 of the inner side case 29a, and one end portion of the mixing outer pipe 39b is welded and fixed on the outer circumferential surface of the inner side case 29a or the opening edge of the SCR inlet 36 of the mixing outer pipe 39b.

Figure 15:
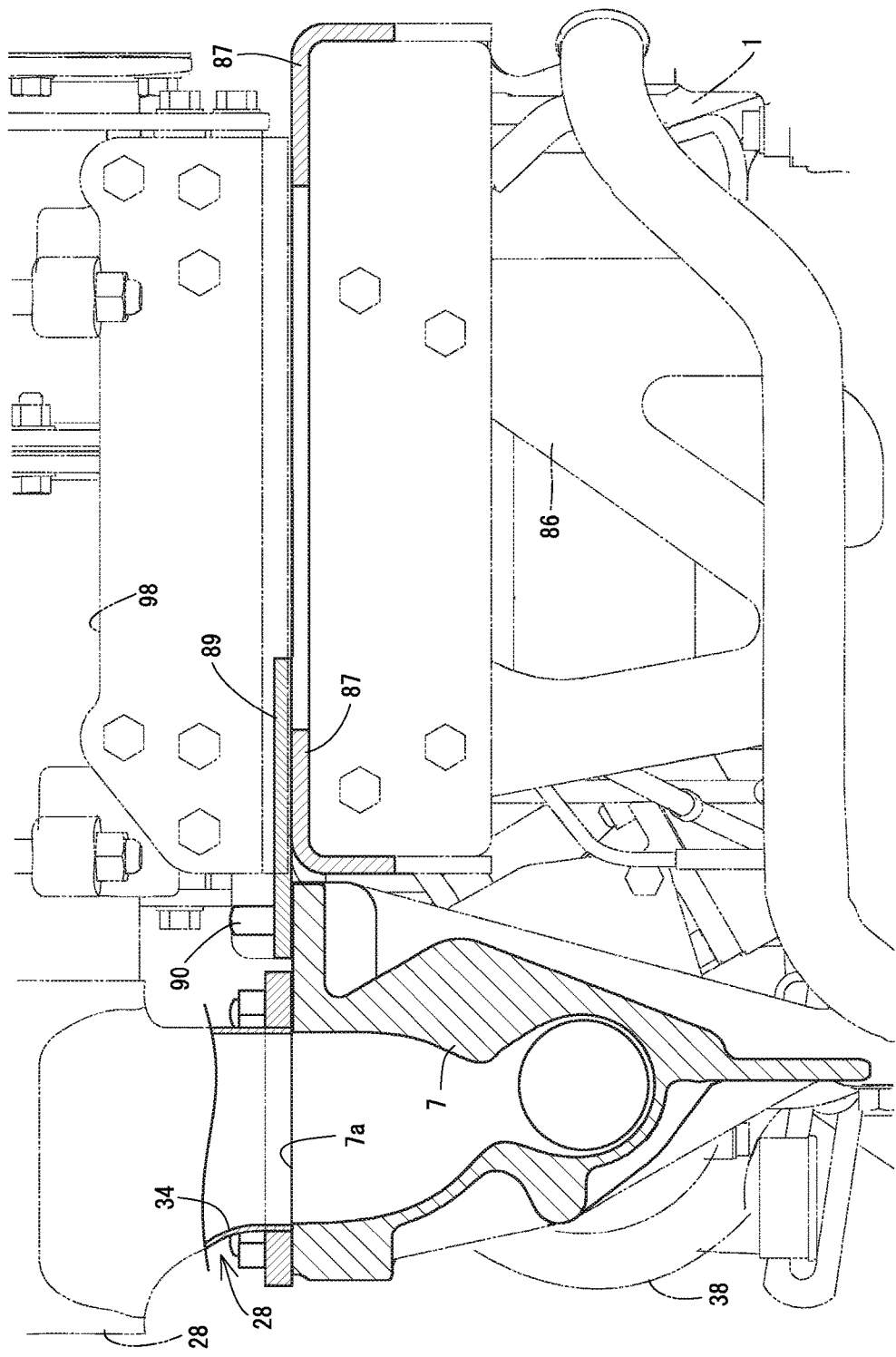
FIG. 15 is a cross-sectional rear view of a supporting stand portion of the exhaust gas purification unit body.
Figure 16:
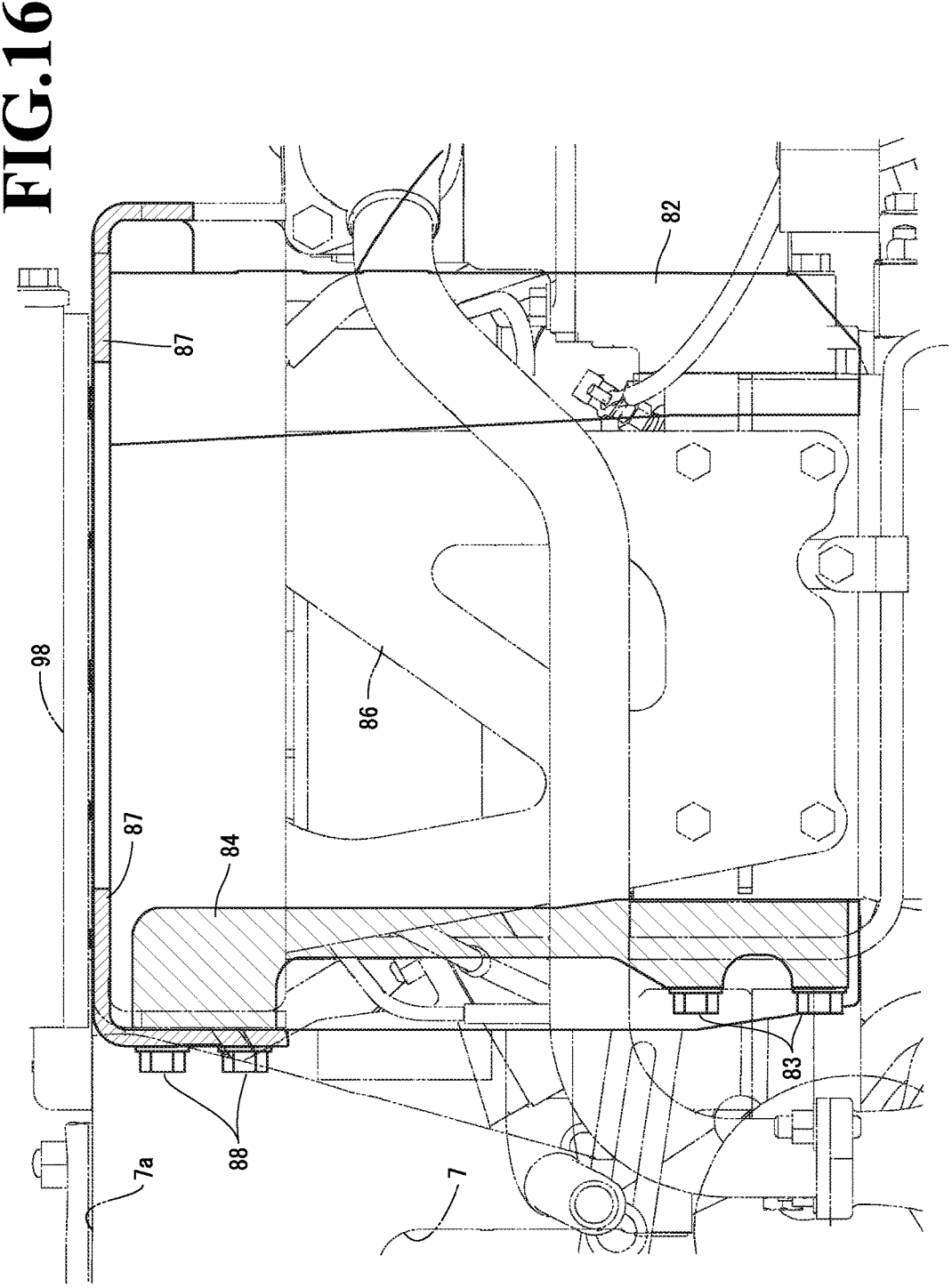
FIG. 16 is a cross-sectional rear view of a supporting leg body.
Figure 17:
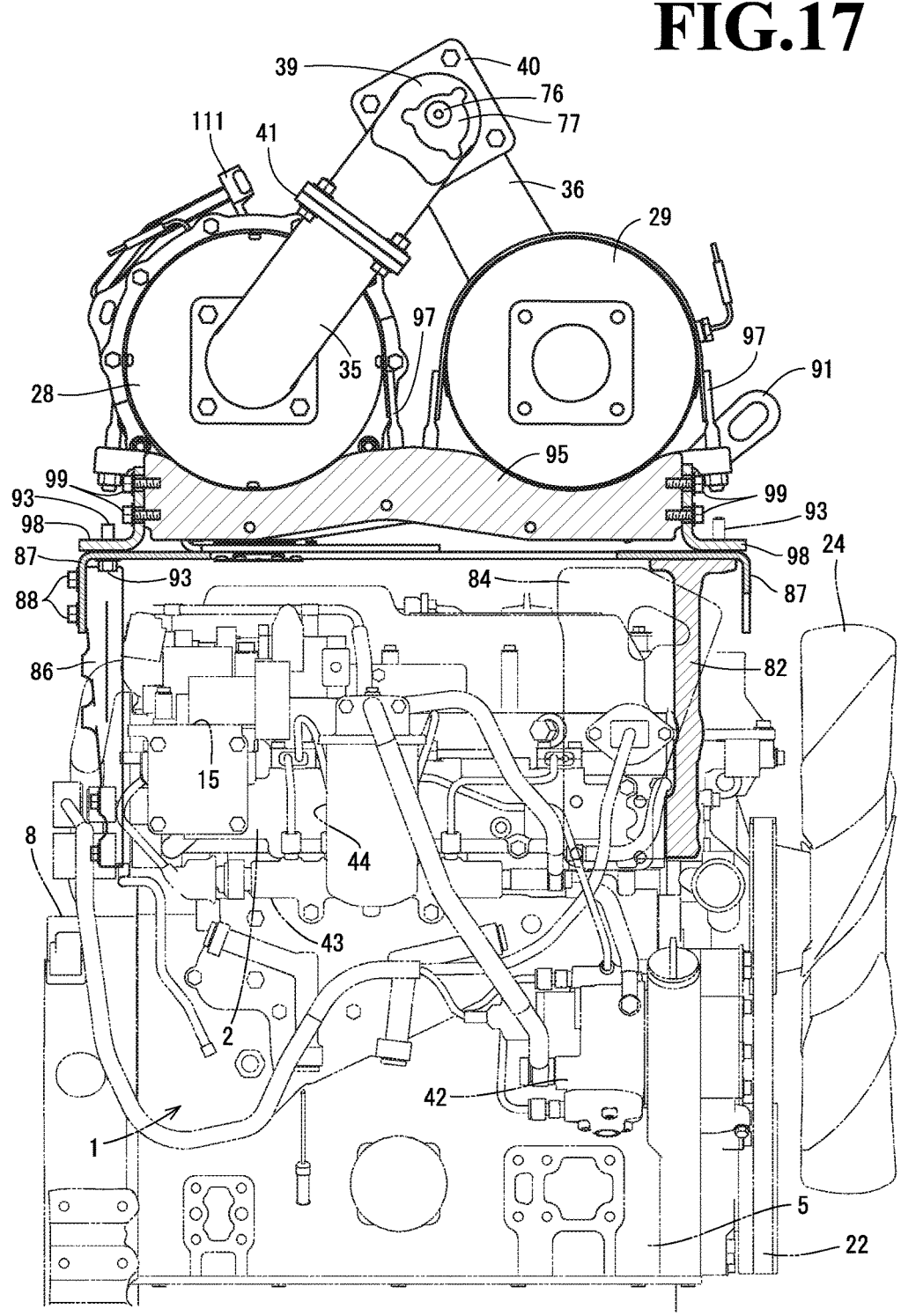
FIG. 17 is a cross-sectional rear view of a case mounting frame body portion.

That is, the outer circumferential surface of the urea mixing pipe 39 (the mixing outer pipe 39b) is joined with the outer circumferential surface of the outer side case 29b, and the urea mixing pipe 39 is integrally arranged on the outside of the second case 29, whereas the urea mixing pipe 39 is detachably coupled with the DPF outlet pipe 35 (the exhaust gas outlet) of the first case 28 via the DPF outlet-side flange body 41 as the pipe joint body, and the urea mixing pipe 39 is integrally fixed on the outside of the second case 29, and the urea water injection nozzle 76 is arranged on one end side of the urea mixing pipe 39 connected to the DPF outlet pipe 35 of the first case 28, and as illustrated in FIGS. 15 and 16, one end side of the urea mixing pipe 39 is detachably coupled with the DPF outlet pipe 35 via the DPF outlet-side flange body 41 as the pipe joint body. It is noted that the urea mixing pipe 39 is integrally arranged on the outside of the first case 28, and the urea mixing pipe 39 may be detachably coupled with t the SCR inlet 36 (the exhaust gas inlet) of the second case 29 via a pipe joint body not illustrated.

On the other hand, the structure of the urea mixing pipe 39 portion will be described referring to FIGS. 35 and 36. As illustrated in FIGS. 19 and 20, the urea mixing pipe 39 includes an elbow pipe portion 39c for connecting the DPF outlet pipe 35 and a straight pipe portion 39d formed in an oblong cylindrical shape. The injection pedestal 77 is welded and fixed on the elbow pipe portion 39c in the vicinity of a section on which the elbow pipe portion 39c and the straight pipe portion 39d are joined, and the urea water injection nozzle 76 is opened from the side of the elbow pipe portion 39c to the inner hole of the straight pipe portion 39d.

Also, as illustrated in FIGS. 35 and 36, the urea water injection direction 332 of the urea water injection nozzle 76 is inclined only at a predetermined injection inclination angle 133 (about 2 to 20 degrees, for example, about 12 degrees, about 8 degrees, about 4 degrees, and the like) on the downstream side of the exhaust gas in the elbow pipe portion 39c with respect to the cylindrical axial line 331 (the transfer direction of the exhaust gas in the straight pipe portion 39d) of the cylindrical straight pipe portion 39d, and the urea water is injected from the urea water injection nozzle 76 near to the bent inner side of the elbow pipe portion 39c with respect to the central axial line (the cylindrical axial line 331) of the straight pipe portion 39d. Additionally, a nozzle hole 76a of the urea water injection nozzle 76 is arranged at a position where the urea water injection nozzle 76 is displaced only by a predetermined size 335 in terms of positional discrepancy near to a bent outside with respect to the cylindrical axial line 331 (the central axial line) of the straight pipe portion 39d, and the urea water injection nozzle 76 is arranged on the bent outside of the elbow pipe portion 39c, and the nozzle hole 76a of the urea water injection nozzle 76 is formed in such a manner that the urea water can be injected to an inner wall surface 334a on the side of the straight pipe portion 39d, on the inner wall surface 334a in the vicinity of a boundary between the bent inner side of the elbow pipe portion 39c and the starting end side of the straight pipe portion 39d.

That is, the urea water is injected from the nozzle hole 76a of the urea water injection nozzle 76 to the side of the inner wall surface 334a on the curved internal diameter side of the elbow pipe portion 39c, on the inner wall surface 334 of the straight pipe portion 39d. The urea water injected from the nozzle hole 76a of the urea water injection nozzle 76 is dispersed in the vicinity of the cylindrical axial line 331 by the discharge pressure of the exhaust gas transferred from the elbow pipe portion 39c to the straight pipe portion 39d to the side of an inner wall surface 334b on the curved external diameter side of the elbow pipe portion 39c, on the inner wall surface 334 of the straight pipe portion 39d, and the urea water is mixed into the exhaust gas transferred to the second case 29 as ammonia by the hydrolytic degradation of the urea water.

It is noted that the inclination angle 333 (the urea water injection direction 332) of the urea water injection nozzle 76 with respect to the cylindrical axial line 331 of the straight pipe portion 39d is determined based on the internal diameters of the elbow pipe portion 39c and the straight pipe portion 39d or the flow rate of the exhaust gas in standard operations (operations based on the rated rotation of the diesel engine 1), and the like. For example, when the injection inclination angle 333 is excessively wide, the urea water is adhered to the inner wall surface 334a on the curved internal diameter side of the elbow pipe portion 39c, which causes a malfunction that the urea is likely to crystallize in the section of the inner wall surface 334a on the curved inner diameter side. In contrast, when the injection inclination angle 333 is excessively narrow, the urea water is adhered to the inner wall surface 334b on the curved external diameter side of the elbow pipe portion 39c, which causes a malfunction that the urea is likely to crystallize in the section of the inner wall surface 334b on the curved external diameter side.

Additionally, as illustrated in FIGS. 35 and 36, it is configured such that a retreat surface 334c on the curved external diameter side is formed at a position of the inner circumferential surface (the inner circumferential surface on the curved external diameter side) near to the bent outside with respect to the cylindrical axial line 331 (the central axial line) of the straight pipe portion 39d, on the inner circumferential surface of the bent outside (the curved external diameter side) of the elbow pipe portion 39c, and the nozzle hole 76a of the urea water injection nozzle 76 is arranged on the retreat surface 334c, thereby reducing the exhaust gas pressure in the vicinity of the nozzle hole 76a. It is noted that the injection pedestal 77 is adhered to the retreat surface 334c, and the urea water injection nozzle 76 is mounted, and the nozzle hole 76a of the urea water injection nozzle 76 is opened to the inner wall surface 334a of the curved internal diameter side of the elbow pipe portion 39c, on the inner wall surface 334 in the vicinity of the boundary between the bent inner side of the elbow pipe portion 39c and the starting end side of the straight pipe portion 39d.

That is, the nozzle hole 76a of the urea water injection nozzle 76 is supported on the retreat surface 334c on the curved external diameter side that is formed on the elbow pipe portion 39c, which reduces the direct action of the flow pressure of the exhaust gas transferred in the elbow pipe portion 39c, with respect to the nozzle hole 76a. Accordingly, the bend radius of the elbow pipe portion 39c is reduced, and the straight pipe portion 39d is contiguously disposed on the outer circumferential surface of the second case 29 and can be formed in a compact way, while the generation of a mass of crystal of urea in the support portion (the vicinity of the nozzle hole 76a) of the urea water injection nozzle 76 can be suppressed.

Also, a retreat inclination portion 334d is provided between the retreat surface 334c formed on the elbow pipe portion 39c and the inner wall surface 334b on the curved external diameter side, and a concave portion 334e is formed on the curved external diameter side of the elbow pipe portion 39c. It is configured such that the retreat inclination portion 334d is inclined only at a predetermined retreat inclination angle 336 (about 2 to 20 degrees, for example, about 12 degrees, about 8 degrees, about 4 degrees, and the like) with respect to the cylindrical axial line 331, and the exhaust gas in the concave portion 334e is transferred and guided by means of the retreat inclination portion 334d to the central portion of the straight pipe portion 39d. The exhaust gas (exhaust gas immediately after the urea water is injected) in the concave portion 334e is prevented from contacting the inner wall surface 334b on the curved external diameter side. It is noted that the injection inclination angle 333 and the retreat inclination angle 336 are formed in such a manner as to be of approximately equal inclination angle.

As illustrated in FIGS. 34 to 36, regarding the engine device that includes the first case 28 that removes the particulate matter in the exhaust gas of the diesel engine 1 and the second case 29 that removes the nitride oxides in the exhaust gas of the diesel engine 1 and that connects the first case 28 to the second case 29 via the urea mixing pipe 39 as the joining pipe, the urea mixing pipe 39 is integrally arranged on the outside of any one of the first case 28 or the second case 29, and the urea mixing pipe 39 is detachably coupled with the gas outlet of the first case 28 or the gas inlet of the second case 29 via the DPF outlet-side flange body 41 as the pipe joint body, so that any one of the first case 28 or the second case 29 and the urea mixing pipe 39 can be handled as one component at the assembly plant of the diesel engine 1 and the like, and the number of constituent components of the exhaust gas purification device 27 can be reduced. Also, even when a machining error occurs in the coupling portion between the exhaust gas outlet of the first case 28 or the exhaust gas inlet of the second case 29 and one end side of the urea mixing pipe 39, the machining error in the coupling portion can be easily solved, and operation time required for the adjustment of position during assembly can be easily shortened, thereby improving the assembly workability. The urea mixing pipe 39 can be installed in close proximity to the outside of any one of the first case 28 or the second case 29, so that thermal insulation effect can be expected, and the crystallization of urea in the interior of the urea mixing pipe 39 can be reduced, and the vibration-proof structure of the urea mixing pipe 39 and the like can be simplified.

As illustrated in FIGS. 35 and 36, the urea mixing pipe 39 is integrally fixed on the outside of the second case, and the urea water injection nozzle 76 is arranged on one end side of the urea mixing pipe 39 connected to the gas outlet of the first case 28, and one end side of the urea mixing pipe 39 is detachably coupled with the gas outlet of the first case 28 via the DPF outlet-side flange body 41, so that the urea mixing pipe 39 can be separated from the exhaust gas outlet side of the first case 28 with the disassembly of the DPF outlet-side flange body 41, and the interior of the urea mixing pipe 39 can be easily cleaned on the installation side of the urea water injection nozzle 76, and the crystallization of urea in the interior of the urea mixing pipe 39 can be reduced. Also, the gas outlet side of the first case 28 can be constituted in such a manner as to be partially detachable, so that the maintenance of the soot filter 31 internally installed on the gas outlet side of the first case 28 can be easily executed only by partially detaching the gas outlet side of the first case 28.

As illustrated in FIG. 35, the second case 29 has cylindrical double pipe structure, which is formed with the inner side case 29a and the outer side case 29b, and the outer circumferential surface of the urea mixing pipe 39 is joined with the outer circumferential surface of the outer side case 29b, so that the first case 28 and the second case 29 can be arranged in a small, narrow space by adhering the first case 28 to the second case 29 in close proximity to each other, and the vibration-proof structure of the urea mixing pipe 39 and the like can be eliminated, and the coupling structure of the first case 28 and the second case 29 can be simplified.

The embodiments of the present invention of the instant application relates to an engine device, such as a diesel engine mounted in an agricultural machine (a tractor and a combine harvester) or a construction machine (a bulldozer, a hydraulic excavator, and a loader), and the like, and more specifically relates to an engine device in which an exhaust gas purification device is mounted that removes particulate matter (soot and particulates) included in exhaust gas or nitride oxides (NOx) and the like included in the exhaust gas.

What is claimed is:

1. An engine device comprising:
   an engine,
   a supporting stand comprising an upper surface side,
   a supporting leg body,
   a first case configured to remove particulate matter in exhaust gas of the engine comprising a gas outlet pipe provided on a gas outlet of the first case, the gas outlet pipe having a reduced diameter compared to a diameter of the first case, and
   a second case configured to remove nitride oxides in the exhaust gas of the engine comprising a gas inlet pipe provided on a gas inlet of the second case,
   a joining pipe configured to connect the second case to the first case, and
   a pipe joint body,
   wherein the engine comprises an upper portion and wherein the supporting stand is adhered on the upper portion of the engine via the supporting leg body, and the upper portion of the engine is covered with the supporting stand,
   wherein any one or both of the first case and the second case are placed on the upper surface side of the supporting stand,
   wherein the joining pipe is integrally arranged outside of the second case, and wherein the joining pipe is detachably coupled with the gas outlet pipe of the first case via the pipe joint body and is operably connected with the gas inlet pipe of the second case, and
   wherein outside of the first case, an upstream portion of the gas outlet pipe extends in a longitudinal direction of the first case and a downstream portion of the gas outlet pipe is connected with the pipe joint body and extends in a direction that intersects the longitudinal direction of the first case, and the pipe joint body is positioned outside of a shape defined by an extension of an outer circumferential surface of the first case in the longitudinal direction of the first case.

2. The engine device according to claim 1, further comprising a common rail configured for supplying fuel to the engine, the engine device further comprising a fuel pipe, an engine control harness, and a pipe protective cover body,
   wherein the pipe protective cover body is coupled with a side of the supporting stand, and is projectingly installed on a same side as the common rail.

3. The engine device according to claim 1, wherein the first case comprises an exhaust intake side case and an exhaust discharge side case, and
   wherein the exhaust discharge side case is configured to be separable from the exhaust intake side case and the exhaust intake side case is supported on a side of the engine.

4. The engine device according to claim 1, wherein the supporting stand comprises a rectangular shape and wherein both of the first case and the second case are placed on the rectangular shaped supporting stand.

5. The engine device according to claim 1, wherein the upper surface side defines a first plane and wherein a second plane which is parallel to the first plane intersects the first case and the second case and wherein the first case and the second case are closer to the engine than the joining pipe.

6. The engine device according to claim 1, further comprising an exhaust gas temperature sensor or an exhaust gas pressure sensor provided on the first case or the second case, and further comprising a single connector bracket body on the supporting stand on which the first case or the second case is arranged, and further comprising a plurality of harness connectors configured to be connected with the exhaust gas temperature sensor or the exhaust gas pressure sensor and wherein the harness connectors are collectively arranged on the connector bracket body.

7. The engine device according to claim 6, wherein the supporting stand comprises an outer surface, and wherein the connector bracket body is adhered to the outer surface of the supporting stand.

8. The engine device according to claim 1, further comprising a urea water injection nozzle, wherein the joining pipe comprises an end side connected to the gas outlet pipe of the first case, and wherein the urea water injection nozzle is arranged on the end side of the joining pipe connected to the gas outlet pipe of the first case, and
wherein the end side of the joining pipe is detachably coupled with the gas outlet pipe of the first case via the pipe joint body.

9. The engine device according to claim 8, wherein the second case has a cylindrical double pipe structure, and wherein the second case comprises an inner side case and an outer side case, and wherein an outer circumferential surface of the joining pipe is operably connected with an outer circumferential surface of the outer side case.

10. The engine device according to claim 1, further comprising a unit frame body, wherein the first case, the second case, and the joining pipe are adhered in parallel with the unit frame body, thereby forming an exhaust purification unit, and
wherein the exhaust purification unit is detachably placed on the upper surface side of the supporting stand.

11. The engine device according to claim 10, wherein the joining pipe comprises a first end portion and a second end portion, and wherein the first case comprises a first case outlet side, and wherein the second case comprises a second case inlet side, and wherein the first end portion or the second end portion is operably connected with the first case outlet side or the second case inlet side in such a manner that a mounting angle of the joining pipe can be adjusted.

12. The engine device according to claim 11, wherein the engine device further comprises a spherical joint connecting body, and the second case inlet side and the first or the second end portion of the joining pipe are operably connected in such a manner that a mounting angle of the joining pipe can be adjusted via the spherical joint connecting body, and wherein the spherical joint connecting body is configured to be bendable in an axial direction of the joining pipe.

13. The engine device according to claim 11, wherein the engine device further comprises a V-band clamp joint body and the second case inlet side and the first or the second end portion of the joining pipe are operably connected in such a manner that a mounting angle of the joining pipe can be adjusted via the V-band clamp joint body, and wherein the V-band clamp joint body is configured to be bendable in an axial direction of the joining pipe.

* * * * *